United States Patent [19]

Guo et al.

[11] Patent Number: 5,784,301

[45] Date of Patent: Jul. 21, 1998

[54] METHOD AND APPARATUS FOR PRODUCING PAPER FIBER STRUCTURE DATA, AND METHOD AND APPARATUS FOR DRAWING BLED FIGURE

[75] Inventors: Qinglian Guo, Miyagi; Toshiyasu Kunii, Tokyo, both of Japan

[73] Assignee: Sony Corporation, Tokyo, Japan

[21] Appl. No.: 592,190

[22] Filed: Jan. 26, 1996

[30] Foreign Application Priority Data

Jan. 26, 1995 [JP] Japan ................. 7-011050

[51] Int. Cl.⁶ .................................................. G06T 1/00
[52] U.S. Cl. .................. 364/578; 395/129; 395/133; 345/141
[58] Field of Search ................. 364/578; 395/119, 395/129, 131, 133, 141; 345/133, 141; 382/258, 274

[56] References Cited

U.S. PATENT DOCUMENTS

| | | | |
|---|---|---|---|
| 4,796,020 | 1/1989 | Budrikis et al. | 340/728 |
| 5,060,169 | 10/1991 | Khosia | 395/129 |
| 5,155,813 | 10/1992 | Donoghue et al. | 340/706 |
| 5,245,432 | 9/1993 | Jaffray et al. | 358/160 |
| 5,305,433 | 4/1994 | Ohno | 395/169 |
| 5,347,620 | 9/1994 | Zimmer | 395/129 |
| 5,432,896 | 7/1995 | Hwong et al. | 395/129 |
| 5,592,597 | 1/1997 | Kiss | 395/119 |
| 5,598,182 | 1/1997 | Berend et al. | 395/133 |
| 5,611,036 | 3/1997 | Berend et al. | 395/141 |
| 5,621,868 | 4/1997 | Mizutani et al. | 395/131 |

FOREIGN PATENT DOCUMENTS

| | | |
|---|---|---|
| 2244894 | 12/1991 | United Kingdom. |
| 2256118 | 11/1992 | United Kingdom. |

Primary Examiner—Kevin J. Teska
Assistant Examiner—Tyrone V. Walker
Attorney, Agent, or Firm—Frommer Lawrence & Haug LLP; William S. Frommer

[57] ABSTRACT

Paper fiber structure data simulating the paper fiber structure required for drawing a bled figure, and a method and apparatus for drawing, based upon the paper fiber structure data, a bled figure which gives an impression as if the figure were actually drawn on a paper sheet with ink. Specifically, the paper fiber structure is modelled to form paper fiber structure data set for correspondence with respective pixels in a figure. The ink flow through the paper fiber interstices is modelled for forming picture data representing a bled figure based upon the paper fiber structure data. Based on the picture data, the picture of the bled figure is displayed on a display device.

53 Claims, 68 Drawing Sheets

| FULL CONTOUR DATA | FIRST CONTOUR DATA | A1 | A2 | A3 | ................ | Am |
|---|---|---|---|---|---|---|
| | SECOND CONTOUR DATA | B1 | B2 | B3 | ................ | Bn |

| FIRST BLURRED AREA DATA | BLURRING START LENGTH DATA | 0.00 | 0.12 | 0.31 | 0.25 | 0.14 | 0.20 | 0.00 | 0.00 |
|---|---|---|---|---|---|---|---|---|---|
| | BLURRING END LENGTH DATA | 0.00 | 0.51 | 0.60 | 0.69 | 0.42 | 0.55 | 0.00 | 0.00 |
| SECOND BLURRED AREA DATA | BLURRING START LENGTH DATA | 0.00 | 0.00 | 0.00 | 0.71 | 0.84 | 0.82 | 0.78 | 0.73 |
| | BLURRING END LENGTH DATA | 0.00 | 0.00 | 0.00 | 0.92 | 0.93 | 0.91 | 0.95 | 0.94 |

| BLURRING PARAMETERS | PARAMETER $c_1$ |
| | PARAMETER $c_2$ |
| | PARAMETER $c_3$ |
| | PARAMETER $c_4$ |
| | PARAMETER $c_5$ |
| | PARAMETER $c_6$ |
| | PARAMETER $c_7$ |

FIG.35

| SHAPE DATA | LENGTH DATA | L | | | | |
|---|---|---|---|---|---|---|
| | WIDTH DATA | $W_1$ | $W_2$ | $W_3$ | ............ | $W_w$ |
| | CURVATURE DATA | $r_1$ | $r_2$ | $r_3$ | ............ | $r_w$ |
| | CURVED POINT DATA | $r\_p, r\_n$ | | | | |

| PICTURE DATA | INK DATA | INK/NO INK DATA |
| | | INK DENSITY DATA |
| | | INK VOLUME DATA |
| LUMINANCE DATA | | |

| WRITING BRUSH DATA | INK VOLUME | $IQ_1$ | $IQ_2$ | $IQ_3$ | ---------- | $IQ_m$ |
| | INK DENSITY | $ID_1$ | $ID_2$ | $ID_3$ | ---------- | $ID_m$ |

|  | LITTLE | MUCH |
|---|---|---|
| INK VOLUME | ■ | |

FIG.47

|  | LIGHT | DENSE |
|---|---|---|
| INK DENSITY | | ■ |

FIG.48

| SPEED DISTRIBUTION DATA | v1 | v2 | v3 | ................ | vg |
|---|---|---|---|---|---|
| WRITING BRUSH PRESSURE DISTRIBUTION DATA | p1 | p2 | p3 | ................ | pg |

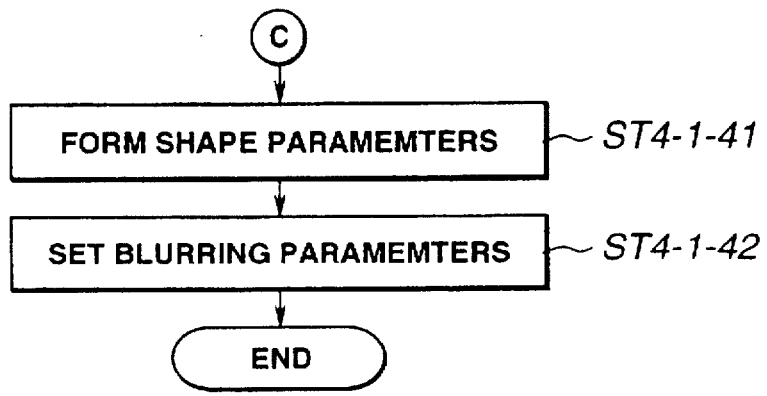
FIG.56
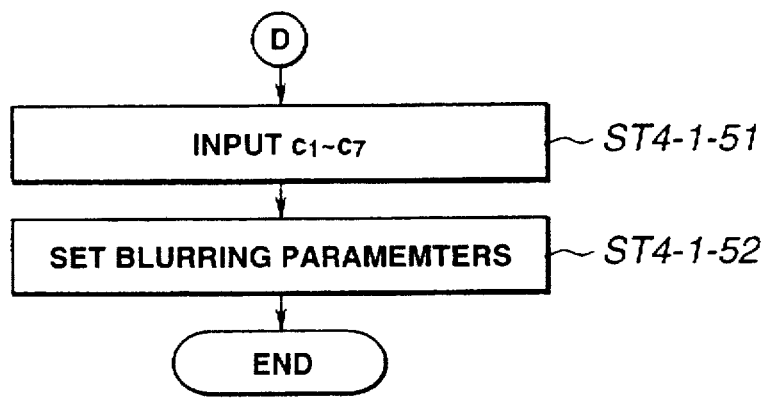
FIG.57
| SPEED DISTRIBUTION DATA | 0.31 | 0.34 | 0.32 | 0.45 | 0.56 | 0.66 | 0.74 | 0.75 | 0.77 |
|---|---|---|---|---|---|---|---|---|---|
| WRITING BRUSH DISTRIBUTION DATA | 0.67 | 0.55 | 0.32 | 0.35 | 0.58 | 0.61 | 0.46 | 0.32 | 0.11 |
FIG.58

| SPEED DISTRIBUTION DATA | 0.00 | 0.00 | 0.00 | 0.00 | 1.00 | 1.00 | 1.00 | 1.00 | 1.00 |
|---|---|---|---|---|---|---|---|---|---|
| WRITING BRUSH DISTRIBUTION DATA | 1.00 | 1.00 | 0.00 | 0.00 | 1.00 | 1.00 | 0.00 | 0.00 | 0.00 |

FIG.59

| DATA FOR WRITING BRUSH CARRYING FOR PRODUCING BLURRING | 0.00 | 0.00 | 0.30 | 0.30 | 0.50 | 0.50 | 1.00 | 1.00 | 1.00 |
|---|---|---|---|---|---|---|---|---|---|

FIG.60

| P8 | P1 | P2 |
|---|---|---|
| P7 | S8=0 \| S1=1 \| S2=0<br>S7=0 \| P \| S3=1<br>S6=0 \| S5=1 \| S4=0 | P3 |
| P6 | P5 | P4 |

FIG.93

| | | | | | | | | |
|---|---|---|---|---|---|---|---|---|
| | P8 | | P1 | | | P2 | | |
| | | | S5=1 | | | | | |
| | | S8=0 | S1=1 | S2=0 | | | | |
| | P7 | S7=0 | P | S3=1 | S7=1 | P3 | | |
| | | S6=0 | S5=1 | S4=0 | | | | |
| | | | S1=0 | | | | | |
| | P6 | | P5 | | | P4 | | |

FIG.94

| M | | | | | | | |
|---|---|---|---|---|---|---|---|
| S1 | S2 | S3 | S4 | S5 | S6 | S7 | S8 |

| CURRENT DATA NUMBER | CONTOUR PIXEL COORDINATE VALUE |
|---|---|
| | INITIAL INK VOLUME $U_0$ |
| | INITIAL INK DENSITY $V_0$ |

| CURRENT DATA NUMBER | CURRENT LEADING COORDINATE VALUE |
| --- | --- |
| | CURRENT ORIGINAL COORDINATE VALUE |
| | CONTOUR DATA NUMBER |
| | STATUS |

FIG.102

| NEXT DATA NUMBER | NEXT LEADING COORDINATE VALUE |
| --- | --- |
| | NEXT ORIGINAL COORDINATE VALUE |
| | CONTOUR DATA NUMBER |
| | STATUS |

FIG.103

| STATUS |
|---|
| NUMBER OF STEPS |
| NUMBER OF INK FLOW STOP STEPS |
| ORIGINAL COORDINATE VALUE |
| CONTOUR DATA NUMBER |
| INK VOLUME U |
| INK DENSITY V |

FIG.104

| LUMINANCE |
|---|

FIG.105

METHOD AND APPARATUS FOR PRODUCING PAPER FIBER STRUCTURE DATA, AND METHOD AND APPARATUS FOR DRAWING BLED FIGURE

BACKGROUND OF THE INVENTION

This invention relates to a method and apparatus for producing paper fiber structure data, paper fiber structure data, and a method and apparatus for drawing bled figures. More particularly, it relates to a method for drawing a figure with bleeding effects, in which paper fiber structure data simulating the paper fiber structure is prepared for displaying a picture or figure having bleeding effects (bled picture or figure) on a display device using the paper fiber structure data.

With computer graphics, drawing a figure on a screen using a computer, three-color data or luminance data are set as picture data for each pixel as minimum picture elements, for color display or monochromatic display, respectively, and a figure is represented on a display based upon picture data set from one pixel to another. The figure herein is meant to comprise characters, symbols or the like as well.

The simplest method in figure drawing by such computer graphics is to produce an area surrounded by a line or lines and draw a picture uniformly within the area surrounded by the line or lines.

However, since this method imposes limitations on picture expression, a variety of figure-drawing methods have been proposed for enabling more rich expressions.

Among these proposed figure-drawing methods, there is such a method in which a figure is drawn based upon coordinate data entered using a pointing device, such as a mouse, as a coordinate data input device, that is in meeting with movement of the pointing device, for simulating figure drawing with a writing brush. There is also such a method in which a figure is drawn in meeting with the movements of the pointing device so that the color becomes thinner with progress in figure drawing for expressing figure drawing with a writing brush and for expressing color changes caused with changes in the ink quantity contained by the writing brush. In addition, there is such a method in which figure drawing by an air brush is expressed by drawing a figure so that the color becomes thinner towards outside of the designated position while becoming denser as the figure drawing progresses.

Meanwhile, if a figure is drawn on a paper sheet using a writing brush impregnated with ink, Indian ink or water-color paint, hereinafter referred to collectively as ink, and sufficient ink is contained in the writing brush or the writing brush is moved slowly, not only a figure is drawn in a paper sheer portion traversed by the writing brush but also the ink becomes diffused around the paper sheet portion thus traversed by the writing brush, thus producing so-called bleeding.

Such bleeding is produced in different manners depending on the sorts of the paper sheets. That is, paper is composed of plural fibers, the structure of which differs with paper sorts. The manner in which the bleeding is produced depends on the fiber structure. Since the prior-art computer graphics have failed to take into account such fiber structure proper to the paper, it has not been possible to express the bleeding which depends upon the paper fiber structure.

Thus it has not been possible with the prior-art computer graphics to represent with ink a figure, in particular, characters or white-and-black pictures, drawn with a writing brush, on a paper sheet, in which bleeding plays an important role, in a manner as though the drawing were actually made with a writing brush impregnated with ink.

OBJECTS AND SUMMARY OF THE INVENTION

It is therefore an object of the present invention to provide paper fiber structure data simulating the paper fiber structure required when drawing with a computer a figure similar to a figure drawn on the paper sheet with ink, and a method and apparatus for producing such paper fiber structure data.

It is another object of the present invention to provide a method and apparatus for drawing a figure with bleeding effects similar to those produced by actual bleeding phenomenon.

In one aspect, the present invention provides a method for forming paper fiber structure data including forming fiber data representing one of fibers making up a paper sheet, arraying a plurality of the fiber data in an area made up of a plurality of pixels for forming fiber distribution data representing fiber distribution, finding, on the pixel basis, the numbers M of fibers passing through the pixels based upon said fiber distribution data, and forming the paper fiber structure data comprised of the pixel-based numbers M of fibers passing through said pixels.

In another aspect, the present invention provides an apparatus for forming paper fiber structure data including means for forming fiber data representing one of fibers making up a paper sheet, means for arraying a plurality of the fiber data in an area made up of a plurality of pixels for forming fiber distribution data representing fiber distribution, means for finding the numbers M of fibers passing through the pixels based upon the fiber distribution data formed by the fiber distribution data forming means, and means for forming the paper fiber structure data comprised of the pixel-based numbers M of fibers passing through the pixels.

In still another aspect, the present invention provides paper fiber structure data which is based upon fiber data representing paper constituting fibers arrayed in an area made up of plural pixels and which is made up of the numbers M of fibers passing through the pixels.

In still another aspect, the present invention provides a blurred figure drawing method for displaying a picture derived form pixel-based picture data including a first step of detecting pixels P on the contour of a figure yet to be blurred, a second step of detecting pixels connected to the pixel P by capillary tubes based upon the numbers of capillary tubes Si (i=1 to 8) for the pixel P detected in the first step and found by the above paper fiber structure data forming method, and a third step of setting ink presence specifying data as picture data in the pixels detected by the second step, the second and third steps being repeated with the pixel with picture data set therein in the third step being substituted for the pixel P detected in the first step and referred to in the second step.

In yet another aspect, the present invention provides a blurred figure drawing apparatus for displaying a picture derived form pixel-based picture data including means for detecting pixels P on the contour of a figure yet to be blurred, means for detecting pixels connected to the pixel P by capillary tubes based upon the numbers of capillary tubes Si (i=1 to 8) for the pixel P detected by the contour pixel detection means as found by the above paper fiber structure data forming method, and means for setting ink presence specifying data as picture data in the pixels detected by the linking pixel detection means, the operations of the linking pixel detection means and the picture data setting means being repeated with the pixel with picture data set therein by the picture data setting means being substituted for the pixel P detected by the contour pixel detection means.

According to the present invention, fiber data forming means forms fiber data representing one of the fibers making up a paper sheet, and fiber distribution data forming means forms fiber distribution data by arraying the plural fiber data formed in the fiber data forming means in an area made up of plural pixels. The fiber number calculating means calculates, on the pixel basis, the numbers of fibers M passing through the pixels based upon the fiber distribution data formed by the fiber distribution data forming means. The paper fiber structure data are formed which are comprised of the pixel-based numbers of fibers calculated by the fiber number calculating means.

By employing such paper fiber structure data, it becomes possible to take into account the quantity and the density of the ink absorbed by the paper sheet, while it also becomes possible to take into account the ink kept in the interstices of fibers making up the paper sheet or the ink flowing through the fiber interstices and hence to draw a bled figure.

Likewise, according to the present invention, the contour pixel detection means detects the contour pixels of a figure yet to be blurred, and the linking pixel detection means detects pixels linked to the pixel P by capillary tubes, based upon the numbers of capillary tubes Si (i=1 to 8) of the paper fiber structure data for the pixel P detected by the contour pixel detection means. The picture data setting means sets the ink presence specifying data as picture data in the pixel detected by the linking pixel detection means. The pixel for which picture data has been set by the picture data setting means is sent to the linking pixel detection means as the pixel P detected by the contour pixel detection means. The operations of the linking pixel detection means and the picture data setting means are repeated for drawing a bled figure.

BRIEF DESCRIPTION OF THE DRAWINGS

FIG. 35 is a diagrammatic view showing the data structure of the blurring parameters.

FIG. 47 illustrates an example of the state of ink density inputs for several points on a writing brush.

FIG. 48 illustrates another example of the state of ink density inputs for several points on a writing brush.

FIGS. 54 to 57 are flowcharts showing the continuation of the flowchart shown in FIG. 53.

FIG. 58 is a diagrammatic view showing an example of speed distribution data and writing brush pressure distribution data prior to conversion into bi-level data.

FIG. 59 is a diagrammatic view showing an example of speed distribution data and writing brush pressure distribution data subsequent to conversion into bi-level data.

FIG. 60 is a diagrammatic view showing an example of writing brush carrying data for producing blurring.

FIG. 93 is a diagrammatic view showing an example of the number of pixels and capillary tubes for illustrating the pixels connected by the capillary tube.

FIG. 94 is a diagrammatic view showing another example of the number of pixels and capillary tubes for illustrating the pixels connected by the capillary tube.

FIG. 102 is a diagrammatic view showing an illustrative data construction of current data.

FIG. 103 is a diagrammatic view showing an illustrative data construction of next data.

FIG. 104 is a diagrammatic view showing an illustrative data construction of bled picture data.

FIG. 105 is a diagrammatic view showing an illustrative data construction of luminance data.

Figure 1:
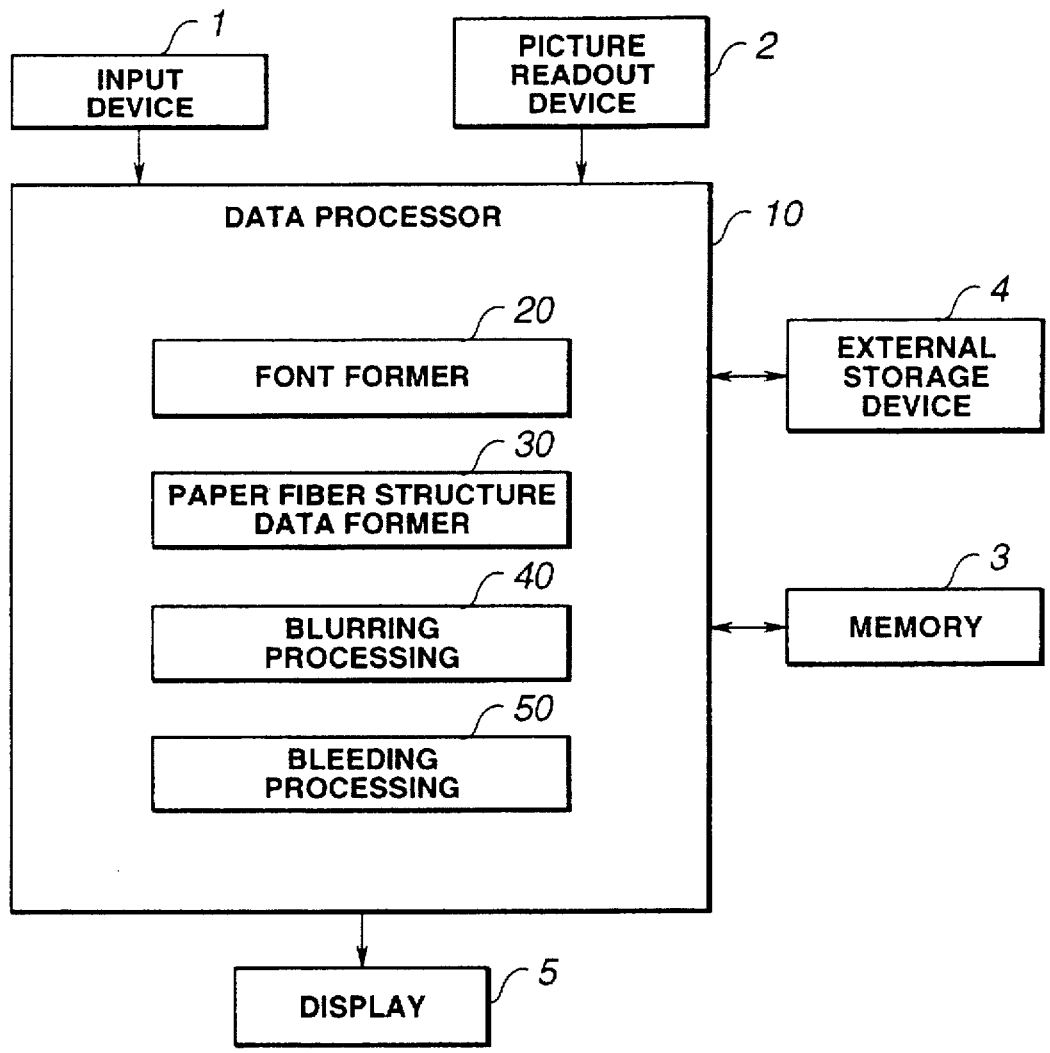
FIG. 1 is a block diagram for illustrating a typical structure of a picture display system.

DESCRIPTION OF THE PREFERRED EMBODIMENTS (1) Overall Construction of a Picture Display System Referring to the drawings, preferred embodiments of the method and apparatus for producing paper fiber structure data, paper fiber structure data, and a method and apparatus for drawing bled pictures will be explained in detail. In the following embodiments, the present invention is applied to a picture display system configured for displaying a picture made up of a set of pixels by displaying respective pixels based upon pixel-based picture data.

Referring to FIG. 1, the picture display system according to the present invention includes a data processor 10 for processing data by a central processing unit (CPU), and an input device 1 supplied with input data and configured for supplying the input data to the data processor 10. The picture display system also includes a picture readout unit 2 for generating image data of a figure and for supplying the image data to the data processor 10, and an internal storage device (memory) 3 for temporarily storing software or data required for data processing in the data processor 10 or storing data produced by the data processor 10. The picture display system also includes an external storage device 4 for recording software or data required for processing data in the data processor 10 and a display device 5 for displaying picture derived from the data processed by the data processor 10.

The data processor 10 includes a font forming processor 20 for forming fonts required for producing picture data of bled or blurred characters or symbols based upon image data supplied from the input device 1 or from the picture readout device 2, and a paper fiber structure data forming processor 30 for forming paper fiber structure data simulating the paper fiber structure. The data processor 10 also includes a blurring processing unit 40 for forming picture data of a blurred figure based upon data supplied from the input device 1, fonts formed by the font forming processor 20 and the paper fiber structure data formed by the paper fiber structure data former 30, and a bleeding processing unit 50 for forming picture data of a bled figure based upon data supplied from the input device 1 and picture data formed in the blurring processing unit 40.

The input device 1 is comprised of a pointing device, such as a mouse, or a keyboard. The user enters data, such as coordinate data, parameters or commands, to the input device 1. The input data is thence supplied to the data processor 10. A plurality of such input devices may naturally be employed in combination.

Based upon these input data, the data processor 10 forms fonts required for forming picture data of bled or blurred characters or symbols in the font processing unit 30. In addition, the data processor 10 forms picture data of a blurred figure or picture data of a bled figure in the blurring processing unit 40 or the bleeding processing unit 50, respectively.

If necessary, the data processor 10 reads out the software or data required for data processing from the external storage device 4 or writes data formed by data processing in the external storage device 4. In addition, the data processor 10 reads out the software or data required for data processing from the memory 3 or temporarily writes data formed by data processing in the memory 3.

That is, the memory 3 is configured for temporarily storing the software or data required for data processing by the data processor 10 or data formed by data processing by the data processor 10. If need be, the software or data are transmitted from the memory 3 to the data processor 10 or from the data processor 10 to the memory 3. The external storage device 4 is configured for storing the software or data required for data processing by the data processor 10, or data formed by data processing by the data processor 10. If need be, the software or data are read from the external storage device 4 to the data processor 10 or from the data processor 10 to the external storage device 4. There is no particular limitation to the recording medium employed as the external storage device 4 if it is capable of storing the software or data recorded thereon. Thus the recording medium may be enumerated by e.g., a hard disc, a flexible disc, a magneto-optical disc, an optical disc or a magnetic tape. A plurality of such recording media may naturally be employed in combination.

Examples of the software include a software for forming fonts required for forming picture data of bled or blurred characters or symbols, a software for forming paper fiber structure data simulating the paper fiber structure, a software for forming picture data of a blurred figure and a software for forming picture data of a bled figure.

Examples of the data required for data processing include existing fonts or a variety of parameters, while examples of data formed by data processing include a variety of data temporarily formed by the font forming processor 20, paper fiber structure data forming processor 30, blurring processing unit 40 or the bleeding processing unit 50, data of fonts formed by font forming by the font forming processor 20, paper fiber structure data formed by paper fiber structure data forming by the paper fiber structure data forming processor 30, picture data formed by blurring processing by the blurring processing unit 40 and picture data formed by bleeding processing by the bleeding processing unit 50.

The data processed by the data processor 10 is displayed on the display device 5. The display device 5 displays characters or symbols derived from the fonts formed by the font forming processor 20, pictures derived from paper structure data formed by the paper fiber structure data forming processor 30, pictures derived from picture data formed by the blurring processing unit 40 or pictures derived from picture data formed by the bleeding processing unit 50. There is no limitation to the display device 5 if it is capable of displaying data processed by the data processor 10. Thus the display device 5 may be exemplified by a display unit, printer or a plotter. A plurality of such display devices may naturally be employed in combination.

The picture readout device 2 is configured for reading the shape of a figure and transforming it into image data which is supplied to the data processor 10. The image data is employed for forming fonts in the font forming processor 20. That is, if it is desired to form fonts while reference is had to handwritten characters, one writes such characters on a paper sheet and image data of the characters is read into the picture readout unit 2 so as to be thence supplied to the data processor 10 for displaying a picture derived from the image data. The user enters coordinate data, using the input device 1, such as a mouse, while having reference to the displayed picture. The font forming processor 20 then forms fonts using the coordinate data supplied thereto.

The data readout device 2 is configured for reading the shape of a figure from outside and for supplying it to the data processor 10. Thus the data readout unit 2 may be omitted if there is no necessity of reading the shape of the picture from outside. There is no particular limitation to the picture readout unit 2 if it is capable of transforming the shape of the figure into image data. Thus an image scanner or a video camera, for example, may be employed as the picture readout device 2. Meanwhile, a plurality of such picture readout devices may be employed in combination.

(2) Font Forming Processor

Figure 2:
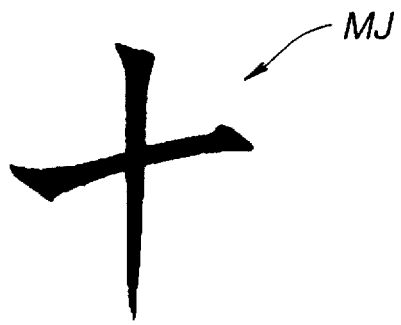
FIG. 2 shows an example of a character.

Referring to FIGS. 2 to 12, a preferred embodiment of the font forming processor 20 is explained. In the following description, a stroke means a line of a character or a symbol. That is, a character MJ "+" shown in FIG. 2 is made up of a first stroke SR1 shown in FIG. 3 and a second stroke SR2 shown in FIG. 4. (2-1) Fonts Referring to FIGS. 2 to 12, the font formed by the font forming processor 20 is explained.

When a character or a symbol is drawn on a paper sheet using a writing brush, bleeding around the character or symbol or the blurring in the character or symbol is produced depending on the manner in which the brush is carried and moved. Thus, for forming picture data realistically representing the character or the symbol as if they were actually drawn on the paper sheet with ink using the writing brush, it is necessary to scrutinize how the writing brush is moved in writing the character or the symbol.

The font formed by the font forming processor 20 based on the above considerations is a font having data concerning the stroke direction, and is made up of data of one or more strokes. The data of each stroke is comprised of first contour data made up of plural coordinate points sequentially indicating the positions on a contour RN1 extending from a starting point PS up to an end point PE of the stroke SR, and plural coordinate points sequentially indicating the positions on a contour RN2 extending from the starting point PS up to the end point PE of the stroke SR, as shown for example in FIG. 5. The first contour data is made up of coordinate points $(x_s, y_s)$ specifying the start point PS, n coordinate points $(x_{11}, y_{11})$, $(x_{12}, y_{12})$ ... $(x_{1n}, y_{1n})$ on the first contour RN1 and coordinate points $(x_e, y_e)$ specifying the end point PE. The second contour data is made up of coordinate points $(x_s, y_s)$ specifying the start point PS, n coordinate points $(x_{21}, y_{21})$, $(x_{22}, y_{22})$ ... $(x_{2n}, y_{2n})$ on the first contour RN2 and coordinate points $(x_e, y_e)$ specifying the end point PE. $T_T$ is noted that the values of n and m are integers not less than 0 and may be the same as or different from each other.

If, in the above described first contour data and the second data, coordinate points specifying the starting point PS is designated in the preparation of stroke data, the so-designated coordinate points are set as the coordinate points $(x_s, y_s)$ specifying the starting point. If no particular designation has been made, the coordinate points entered for the first time are set as the coordinate points $(x_s, y_s)$ specifying the starting point. On the other hand, if coordinate points specifying the terminating point PS are designated in the preparation of the stroke data, the so-designated coordinate points are set as the coordinate points $(x_e, y_e)$ specifying the terminating point. If no particular designation has been made, the coordinate points entered for the last time are set as the coordinate points $(x_e, y_e)$ specifying the terminating point.

With such stroke data, since the coordinate points $(x_s, y_s)$ specifying the stroke start point and the coordinate points $(x_e, y_e)$ specifying the stroke end point are set, the stroke direction is known. Thus it becomes possible to know the movement of a writing brush when writing a character or a symbol represented by a font made up of such stroke data. By preparing picture data of the character or symbol, based upon such font, a realistic expression may be achieved which will give an impression as if the character or the symbol were drawn with the writing brush.

Meanwhile, if, when the character or the symbol is drawn with ink on the paper sheet using a writing brush, the sequence in which the character or the symbol is drawn, that is the stroke sequence, is changed, the sequence in which the strokes are overlapped is changed, so that bleeding or blurring produced is also changed. Thus, if picture data is to be produced so that the character or the symbol is expressed more realistically for producing an impression as if the character or the symbol were drawn with the writing brush, it is necessary to consider the stroke sequence.

Thus, in the font formulated in the font forming processor 20, the data of the respective strokes is arrayed in the writing sequence so that the stroke sequence will be known. It is noted that, if the data sequence is designated at the time of preparation of the stroke data, the stroke data sequence is the designated data sequence. If no particular designation has been made, the stroke data sequence is the input sequence. The stroke data sequence need not be set by arraying the stroke data in the writing sequence. For example, the stroke data may be set by formulating sequence data for specifying the sequence for the respective stroke data.

Taking an example of the letter MJ, which reads "+" shown in FIG. 2, the above-described font is explained in detail.

Figure 3:
FIG. 3 illustrates a first stroke of the character shown in FIG. 2.
Figure 4:
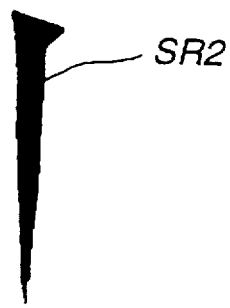
FIG. 4 illustrates a second stroke of the character shown in FIG. 2.

The letter MJ which reads "+" is made up of the first stroke SR1 shown in FIG. 3 and the second stroke SR2 shown in FIG. 4.

Figure 6:
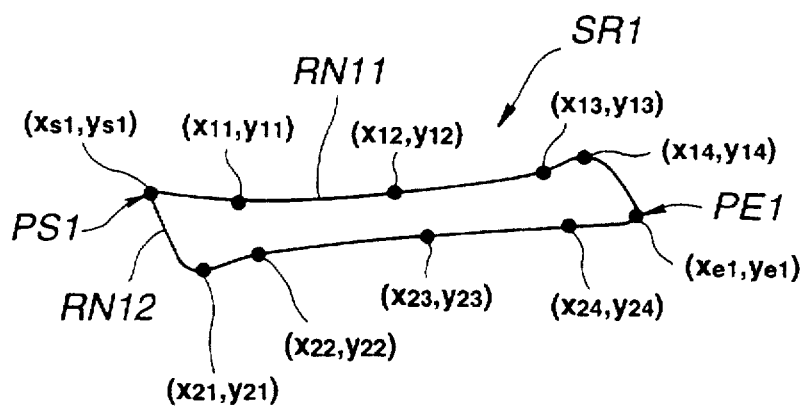
FIG. 6 shows an example of data for the stroke shown in FIG. 3.
Figure 7:
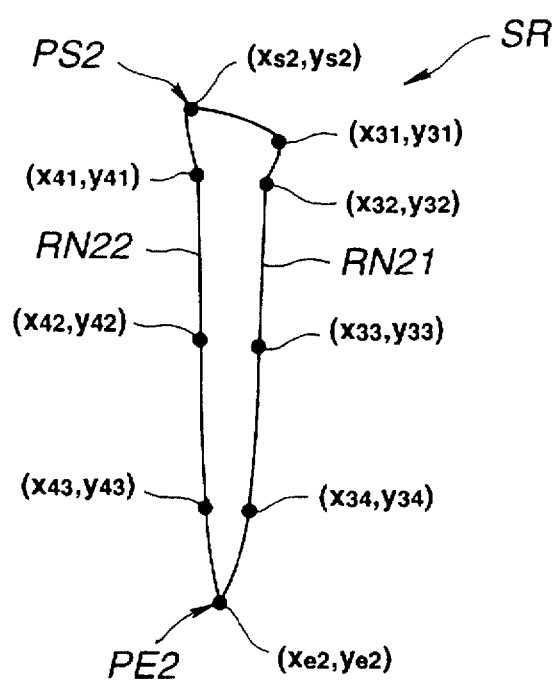
FIG. 7 shows an example of data for the stroke shown in FIG. 4.

Referring to FIG. 6, data of the first stroke SR1 is made up of first contour data comprised of a coordinate point $(x_{s1}, y_{s1})$, specifying a start point PS1 of the first stroke SR1, e.g., four points $(x_{11}, y_{11})$, $(x_{12}, y_{12})$, $(x_{13}, y_{13})$, $(x_{14}, y_{14})$, and a coordinate point $(x_{e1}, y_{e1})$ specifying an end point PE1 of the first stroke SR1, arrayed in this order, and second contour data comprised of a coordinate point $(x_{s2}, y_{s2})$, specifying a start point PS1, e.g., four points $(x_{21}, y_{21})$, $(x_{22}, y_{22})$, $(x_{23}, y_{23})$, $(x_{24}, y_{24})$, and a coordinate point $(x_{e1}, y_{e1})$, specifying the above terminal point PE1, arrayed in this order.

Similarly, data of the second stroke SR2 is made up of first contour data comprised of a coordinate point $(x_{s2}, y_{s2})$, specifying a start point PS2 of the first stroke SR2, e.g., four points $(x_{31}, y_{31})$, $(x_{32}, y_{32})$, $(x_{33}, y_{33})$, $(x_{34}, y_{34})$, and a coordinate point $(x_{e1}, y_{e1})$ specifying an end point PE1 of the second stroke SR2, arrayed in this order, and second contour data comprised of the coordinate point $(x_{s2}, y_{s2})$, specifying the above-mentioned start point PS2, e.g., three points $(x_{41}, y_{41})$, $(x_{42}, y_{42})$ and $(x_{43}, y_{43})$, and the coordinate point $(x_{e2}, y_{e2})$, specifying the above terminal point, arrayed in this order.

Since the sequence of the strokes SR1 and SR2 of the letter MJ which reads "+" is the sequence of the first stroke SR1 an the second stroke SR2, data of the first stroke SR1 and data of the second stroke SR2 are arrayed in the sequence of the data of the first stroke SR1 and the data of the second stroke SR2.

Thus the font of the letter MJ which reads "+" is comprised of data of the first stroke SR1 made up of the coordinate points $(x_{s1}, y_{s1})$, $(x_{11}, y_{11})$, $(x_{12}, y_{12})$, $(x_{13}, y_{13})$, $(x_{14}, y_{14})$ and $(x_{e1}, y_{e1})$, making up the first contour data, coordinate points $(x_{s1}, y_{s1})$, $(x_{21}, y_{21})$, $(x_{22}, y_{22})$, $(x_{23}, y_{23})$, $(x_{24}, y_{24})$ and $(x_{e1}, y_{e1})$, making up the second contour data, and data of the second stroke SR2 made up of the coordinate points $(x_{s2}, y_{s2})$, $(x_{31}, y_{31})$, $(x_{32}, y_{32})$, $(x_{33}, y_{33})$ and $(x_{e2}, y_{e2})$ making up the first contour data and the coordinate points $(x_{s2}, y_{s2})$, $(x_{41}, y_{41})$, $(x_{42}, y_{32})$, $(x_{43}, y_{43})$, $(x_{44}, y_{44})$ and $(x_{e2}, y_{e2})$ making up the second contour data. The data of the first stroke SR1 and the data of the second stroke SR2 are arrayed in this order.

Although both a set of the coordinate points specifying the starting point and another set of the coordinate points specifying the terminal point are set in the above-described font, at least one of these sets of the coordinate points suffices in order to comprehend the stroke direction. Thus it is possible to set only the coordinate point specifying the stroke start point or only the coordinate point specifying the stroke end point as the stroke data.

With the above-described font, the stroke data are constructed by the first contour data containing the coordinate point specifying the starting point and the coordinate point specifying the end point and the second contour data containing the coordinate point specifying the starting point and the coordinate point specifying the end point. However, the stroke data may also be constructed by first contour data made up only of coordinate points on the first contour excluding the coordinate point specifying the starting point and the coordinate point specifying the end point and second contour data made up only of coordinate points on the second contour excluding the coordinate point specifying the starting point and the coordinate point specifying the end point.

Although the stroke data for the above font are made up only of the coordinate points, the stroke data may also have vector data, such as in the case of the conventional outline font, in addition to these coordinate points.

(2-2) Construction of Font Forming Processor

An illustrative construction of the font forming processor 20 for preparing the above font is now explained.

Figure 8:
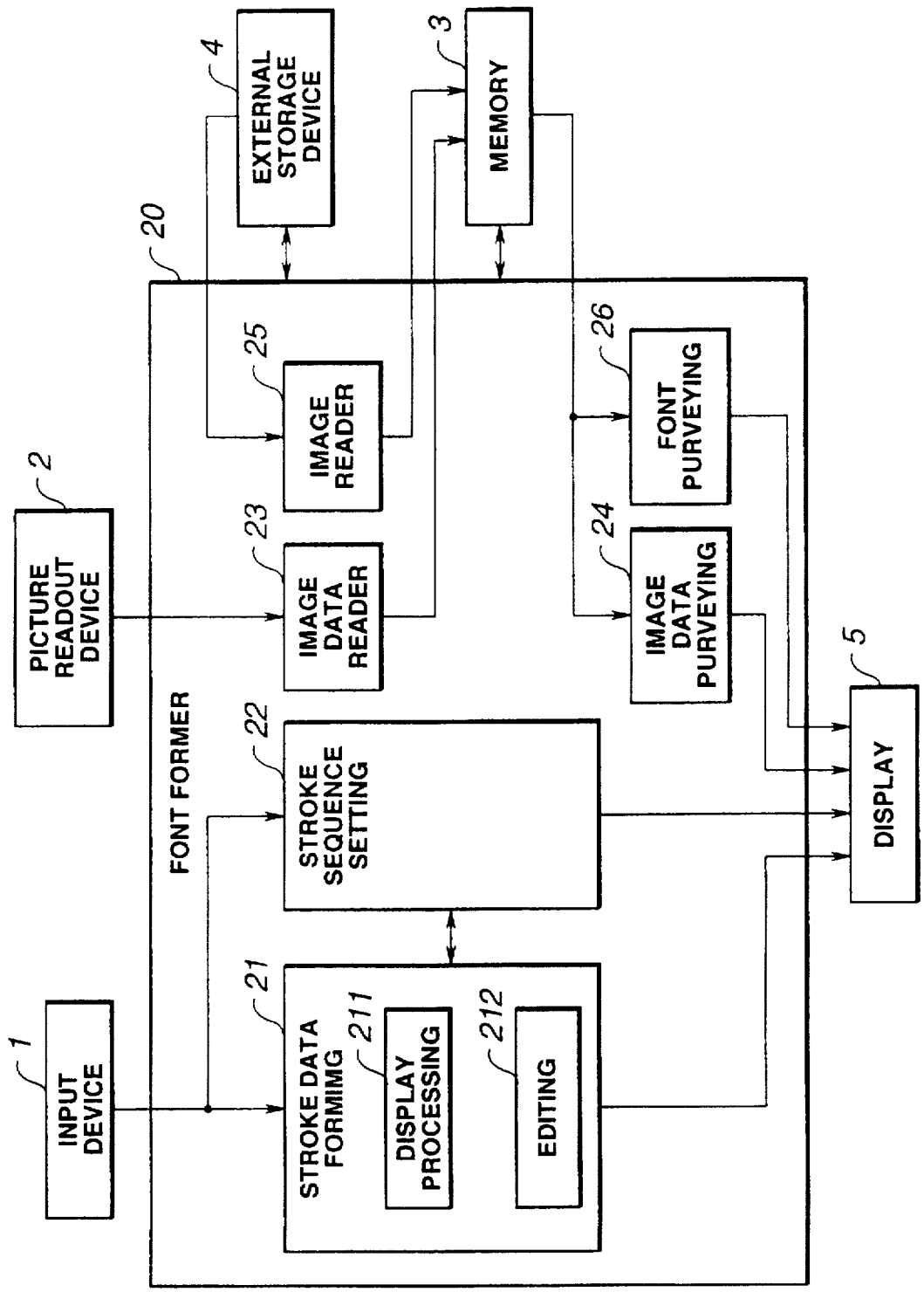
FIG. 8 is a block diagram showing an illustrative font forming processor.

Referring to FIG. 8, the font forming processor 20 includes a stroke data forming unit 21 for forming stroke data in accordance with plural coordinate points entered by the input device 1, and a stroke sequence setting unit 22 for setting the sequence of data of plural strikes formed by the stroke data forming unit 21. The font forming processor 20 also includes an image data readout unit 23 for reading image data of the character or symbol from the picture readout unit 2 for writing in the memory 3 and an image data purveying unit 24 for reading out the image data from the memory 3 for supplying the image data thus read out to the display unit 5. The font former similarly includes a font readout unit 25 for reading out an existing font from the external storage device 4 for writing the read-out font in the memory 3 and a font purveying unit 26 for reading out the font from the memory 3 for supplying the read-out font to the display device 5.

The stroke data forming unit 21 forms, based upon plural coordinate points entered from the input device 1, the above-mentioned stroke data, that is first contour data made up of the coordinate point $(x_s, y_s)$ specifying the starting point of the stroke SR, n coordinate points $(x_{11}, y_{11})$, $(x_{12}, y_{12})$, ..., $(x_{1n}, y_{1n})$ on a first contour RN1 and the coordinate point $(x_e, y_e)$ specifying the end point of the stroke SR, and second contour data made up of the coordinate point $(x_s, y_s)$ specifying the starting point of the stroke SR, n coordinate points $(x_{21}, y_{21})$, $(x_{22}, y_{22})$, ..., $(x_{2n}, y_{1n})$ on a second contour RN2 and the coordinate point $(x_e, y_e)$ specifying the end point of the stroke SR. Since each character or symbol is constituted by one or more strokes, the stroke data forming unit 21 forms data of one or more strokes for each font.

If supplied from the input device 1 with data designating the coordinate point specifying the starting point, the stroke data forming unit 21 forms stroke data with the designated coordinate points as the coordinate point specifying the starting point. If not supplied from the input device 1 with data designating the coordinate point specifying the starting point, the stroke data forming unit 21 forms stroke data with the first-entered coordinate point as the coordinate point specifying the starting point. Similarly, if supplied from the input device 1 with data designating the coordinate point specifying the end point, the stroke data forming unit 21 forms stroke data with the designated coordinate point as the coordinate point specifying the end point. If not supplied from the input device 1 with data designating the coordinate points specifying the end point, the stroke data forming unit 21 forms stroke data with the last-entered coordinate point as the coordinate point specifying the end point.

For ease in entering the coordinate points on the stoke contour by the input device 1, the stroke data forming unit 21 includes display processing unit 211 for displaying the matter concerning the coordinate points and an editing processing unit 212 for editing the coordinate points.

For ease in understanding the relative position of the coordinate points entered by the inputting device 1, that is in understanding the shape represented by the stroke data, the display processing unit 211 displays points corresponding to coordinate points entered by the input device 1 on the display device 5. Also, for ease in understanding the sequence of the coordinate points entered by the input device 1, the display processing unit 211 displays a line interconnecting the coordinate points in accordance with the sequence of the coordinate points entered by the input device 1 on the display device 5.

Figure 9:
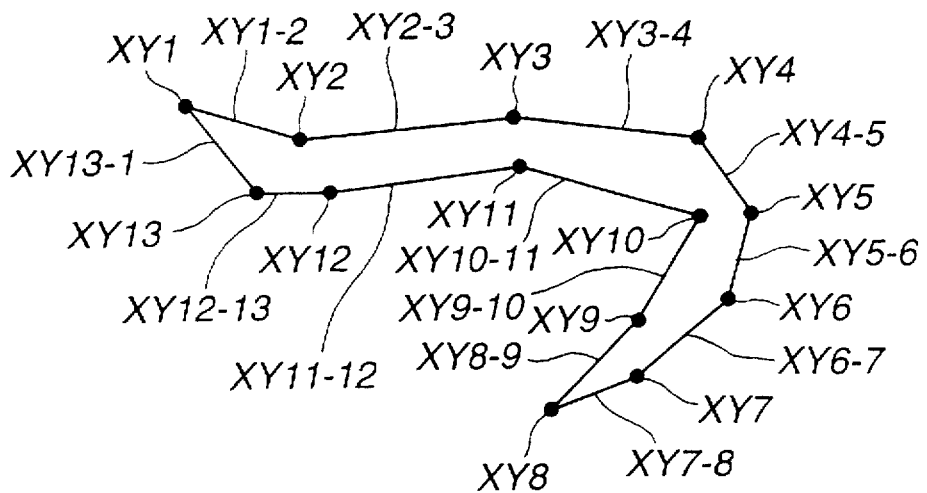
FIG. 9 illustrates an example of input coordinate points and straight lines interconnecting these coordinate points.

Specifically, the display processing unit 211 displays points XY1, XY2, XY3, XY4, XY5, XY6, XY7, XY8, XY9, XY10, XY11, XY12, XY13, corresponding to coordinate points entered by the input device 1, on the display device 5, while displaying straight lines XY1–2, XY2–3, XY3–4, XY4–5, XY5–6, XY7–8, XY8–9 XY9–10, XY10–11, XY11–12, XY12–13, XY13–1, interconnecting these coordinate points, as shown for example in FIG. 9. The display processing unit 211 displays the coordinate points entered by the input device 1 and the straight lines interconnecting these coordinate points on the display unit 5 in order to permit the user to comprehend easily the sequence of the input coordinate points.

Figure 10:
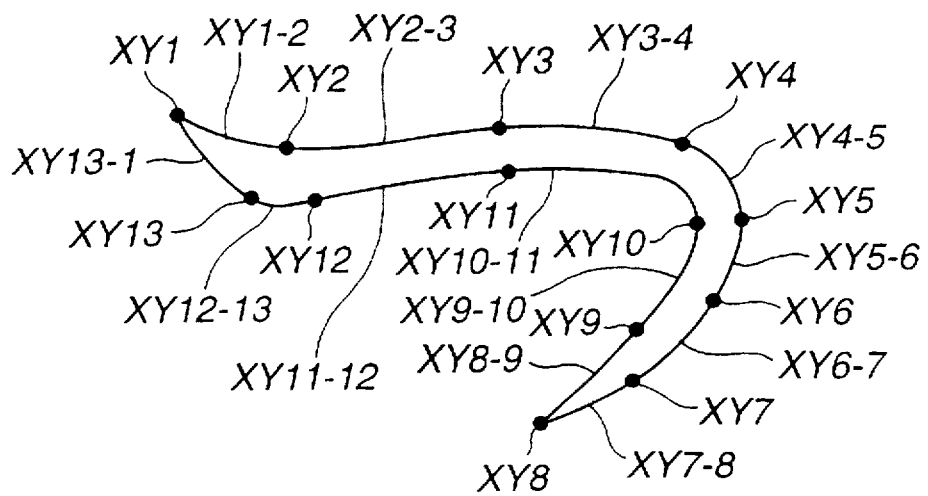
FIG. 10 illustrates an example of input coordinate points and curved lines interconnecting these coordinate points.

Alternatively, the display processing unit 211 displays points XY1, XY2, XY3, XY4, XY5, XY6, XY7, XY8, XY9, XY10, XY11, XY12, XY13, corresponding to coordinate points entered by the input device 1, on the display device 5, while displaying smooth curves XY1–2, XY2–3, XY3–4, XY4–5, XY5–6, XY6–7, XY7–8, XY8–9 XY9–10, XY10–11, XY11–12, XY12–13, XY13–1, interconnecting these coordinate points, on the display device 5, as shown for example in FIG. 10. Thus the display processing unit 211 displays smooth curves interconnecting the coordinate points entered by the input device 1 using a technique of interconnecting the respective coordinate points by curves such as splined curves or Bezier curves such as is used in the conventional outline fonts. This permits the user to know the shape of the stroke when the stroke data is complemented, as will be explained subsequently.

When displaying the points corresponding to the entered coordinate points or the lines interconnecting the entered coordinate points on the display unit 5, the display processing unit 211 displays the coordinate points specifying the starting point of the stroke, the coordinate points specifying the end point of the stroke and the remaining coordinate points so as to permit facilitated visual discrimination between these different coordinate points. Specifically, the point corresponding to the coordinate point $(x_s, y_s)$ specifying the stroke start point, the point corresponding to the coordinate point $(x_e, y_s)$ specifying the stroke end point and the remaining coordinate points $(x_{11}, y_{11})$, $(x_{12}, y_{12})$, ..., $(x_{1n}, y_{1n})$, $(x_{21}, y_{21})$, $(x_{22}, y_{22})$, ..., $(x_{2m}, y_{1m})$ with different colors and/or luminance.

Although the display processing unit 211 displays dots and lines on the display device 5 only for data of a single stroke, it as also possible for the display processing unit 211 to display data of plural strokes simultaneously on the display device 5. That is, the display processing unit 211 displays only data for a single stroke on the display device 5 or data of plural strokes simultaneously on the display device 5 in accordance with the instructions entered by the input device 1.

The editing processing unit 212 is responsive to commands from the input device 1 to add coordinate data to the stroke data, move coordinate points of the stroke data one by one or collectively, or to delete the coordinate points from the stroke data one by one or collectively. If, by the operation of the display processing unit 211, dots and lines of data of plural strokes are displayed on the display unit 5, the editing processing unit 212 is responsive to commands form the input device 1 to select data of one of the strokes to effect processing on the data of the selected stroke.

The stroke sequence setting unit 22 then arrays the data of one or more strokes formed by the stroke data forming unit 21 in accordance with the stroke data sequence for setting the sequence of the stroke data.

If supplied by the input device 1 with the stroke data sequence designating data from the input device 1, the stroke sequence setting unit 22 re-arrays the stroke data in the designated sequence for setting the stroke data sequence. If not supplied by the input device 1 with the stroke data sequence designating data from the input device 1, the stroke sequence setting unit 22 arrays the stroke data in the sequence in which the stroke data is formed in the stroke data forming unit 21 for setting the sequence of the stroke data.

It is unnecessary for the stroke sequence setting unit 22 to set the sequence of the respective strokes by arraying the data of the respective strokes according to the correct sequence. For example, sequence data for specifying the data of the respective strokes may naturally be formed for setting the sequence of the respective strokes.

By forming data of one or more strokes by the stroke data forming unit 21 and setting the data sequence of the respective strokes by the stroke sequence setting unit 22, the fonts may be formed which are comprised of data of one or more strokes and in which the data sequence of the respective strokes has been set.

If, when the coordinate points on the stroke contour are entered by the input device 1, the character or symbol corresponding to the desired font is displayed on the display unit 5, the coordinate points can be entered extremely easily. That is, the coordinate points can be entered extremely easily if the coordinate points are entered by designating the points on the contour of the displayed character or symbol while the operator has reference to the character or symbol displayed on the display unit 5.

The image data readout unit 23, image data purveying unit 24, image front readout unit 25 and the font purveying unit 26 are configured for inputting the coordinate points while the letter or symbol corresponding to the desired font is displayed on the display unit 5.

That is, the image data readout unit 23 reads out image data of the character or symbol corresponding to the desired font supplied from the picture readout device 2 for writing in the memory 3. The image data purveying unit 24 reads out the image data from the memory 3 to transmit the read out data to the display unit 5. Since the character or symbol corresponding to the desired font is displayed in this manner on the display unit 5, the user is able to input the coordinate points while having reference to the character or font displayed on the display unit 5.

On the other hand, the font readout unit 25 reads out the font of the character or symbol corresponding to the desired font supplied from the external storage device 4, and writes the read-out font in the memory 3. The font purveying unit 26 reads out the font from the memory 3 and purveys the read-out font to the display unit 5. Since the character or symbol corresponding to the desired font is displayed on the display unit 5, the user is able to input the coordinate points while having reference to the character or font displayed on the display unit 5. The font prerecorded in the external storage device 4 may be any font provided an image of the character or symbol corresponding to the font can be displayed on the display unit 5. Examples of the fonts include conventional bit map fonts, outline fonts or fonts pre-formed by the font forming processor 20.

Figure 11:
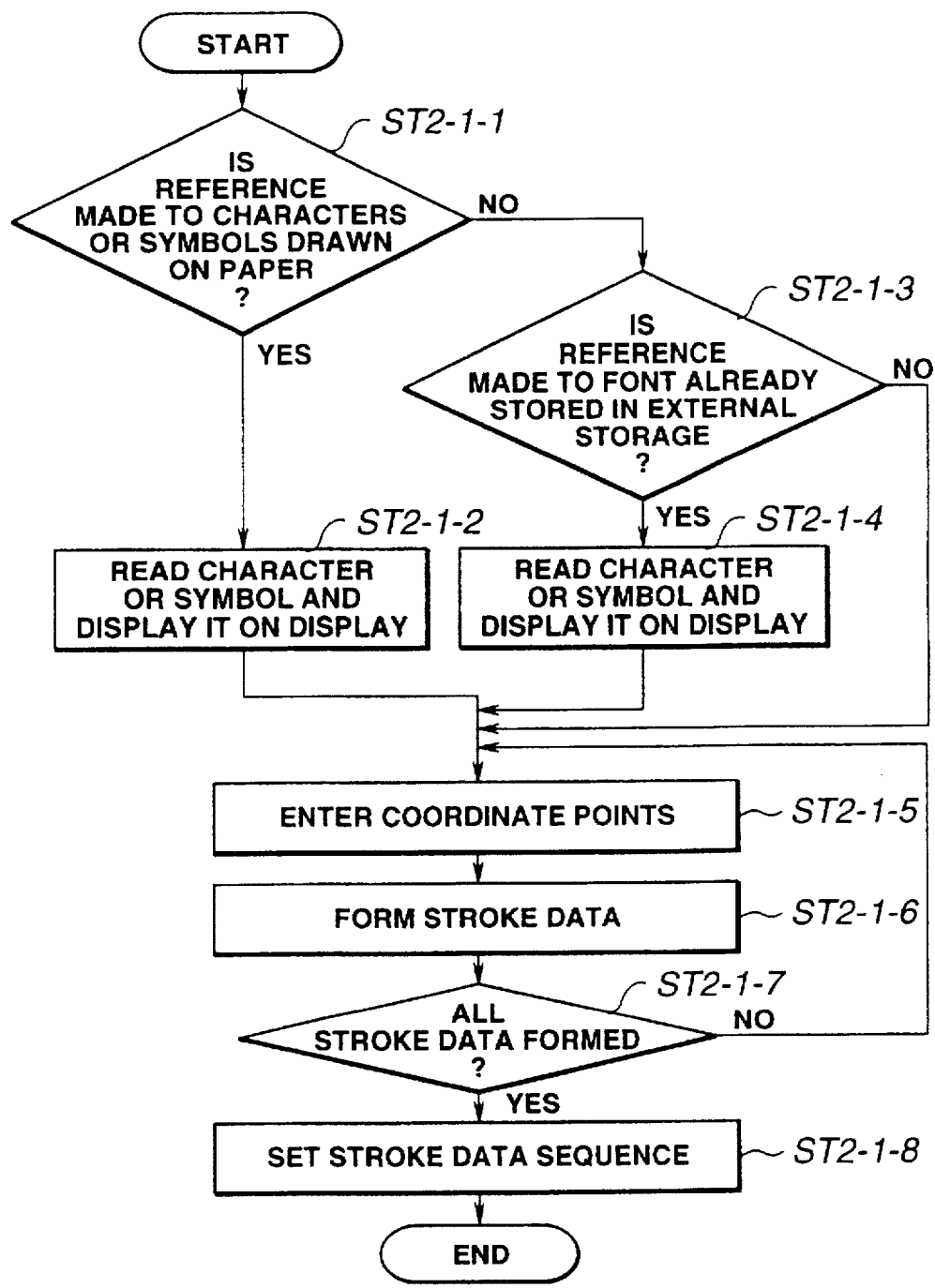
FIG. 11 is a flow chart for illustrating the operation of the font forming processor.

The illustrative operation of the font forming processor 20 is explained by referring to a flowchart shown in FIG. 11.

At step ST-2-1-2, the font forming processor 20 refers to the character or symbol drawn on the paper for judging whether or not the font is to be formed. If the result is YES, that is if the font is to be formed, the font forming processor 20 transfers to step ST-2-1-2 and, if otherwise, the processor 20 transfers to step ST2-1-3.

At step ST2-1-2, the font forming processor 20 displays the character or symbol drawn on the paper on the display unit 5 before transferring to step 2-1-5. Specifically, when the letter or symbol drawn on the paper is to be displayed on the display unit 5, the picture readout device 2 transforms the shape of the character or symbol drawn on the paper into image data and transmits the resulting image data to the image data readout unit 23. The image data readout unit 23 writes the image data supplied form the picture readout unit 2 in the memory 3. The image data purveying unit 24 reads out the image data from the memory 3 and transmits the readout image data to the display unit 5. The display unit 5 displays the picture derived from the image data purveyed from the image data purveying unit 24.

At step ST2-1-3, font forming processor 20 refers to the font stored in the external storage device 4, for judging whether or not the font is to be formed. If the processor refers to the font (YES), the processor transfers to step ST2-1-4. If the processor does not refer to the font (NO), it transfers to step ST2-1-5.

At step ST2-1-4, the font forming processor 20 displays the character or symbol corresponding to the font stored in the external storage device 4. The font forming processor 20 then transfers to step ST2-1-5. Specifically, if the character or symbol corresponding to the font stored in the external storage device 4 is to be displayed on the display device 5, the font readout unit 25 reads out the font from the external storage device 4 and writes the read-out font in the memory 3. The font purveying unit 26 then reads out the font from the memory 3 and sends the read-out font to the display device 5. The display device 5 displays the picture corresponding to the font purveyed from the font purveying unit 26.

Figure 5:
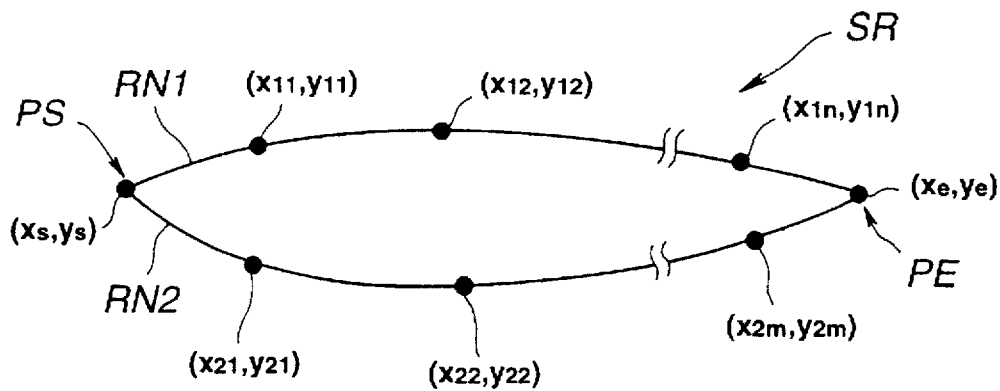
FIG. 5 illustrates data for a stroke.

At step ST2-1-5, the stroke data forming unit 21 of the font forming processor 20 reads coordinate points entered by the user via the input device 1, as will be explained subsequently. The coordinate points read by the stroke data forming unit 21 are plural coordinate points $(x_s, y_s)$, $(x_{11}, y_{11})$, $(x_{12}, y_{12})$, ... $(x_{1n}, y_{1n})$, $(x_{21}, y_{21})$, $(x_{22}, y_{22})$, ... $(x_{2n}, y_{1n})$, $(x_e, y_e)$, as shown in FIG. 5. If the character or symbol drawn on the paper is displayed on the display unit 5, at step ST2-1-2, or if the character or symbol corresponding to the existing font is displayed on the display device 5 at step ST2-1-4, the user enters the stroke data via the input device 1, while having reference to the letter or symbol displayed on the display unit 5. The display processing unit 211 displays the points corresponding to the input coordinate points or lines interconnecting the input coordinate points on the display device 5 to permit facilitated visual recognition of the input coordinate points by the user.

At step ST2-1-6, the stroke data forming unit 21 forms, based upon the coordinate points read out at step ST2-1-5, the stroke data comprised of first contour data made up of coordinate points $(x_s, y_s)$, $(x_{11}, y_{11})$, $(x_{12}, y_{12})$, ... $(x_{1n}, y_{1n})$, $(x_e, y_e)$, and second contour data made up of $(x_s, y_s)$, $(x_{21}, y_{21})$, $(x_{22}, y_{22})$, ... $(x_{2n}, y_{1n})$, $(x_e, y_e)$ The leading coordinate points $(x_s, y_s)$ of the first and second contour data specify the start point while the trailing coordinate points $(x_e, y_e)$ of the first and second contour data specify the end point. At this time, the stroke data forming unit 21 causes the dots and lines corresponding to the stroke data to be displayed on the display unit.

Next, at step ST2-1-7, the stroke data forming unit 21 judges, based upon the commands entered from the input device 1, whether or not the formation of data of all of the strokes of a desired font has come to a close. If there is any data of the stroke yet to be formed (YES), the processor 20 reverts to step ST2-1-5. If the formation of data of all strokes has come to a close (NO), the processor transfers to step ST2-1-8.

If the processor 20 reverts to step ST2-1-5 in order to produce data of a new stroke, the stroke data forming unit 21 causes the dots corresponding to the coordinate points of the data of the stroke formed previously and the lines interconnecting these dots to be displayed on the display unit 5. That is, if the user is desirous to check for the balance between the array of the previously formed stroke and that of the stroke to be newly formed, the user has only to display the points corresponding to the coordinate points of the pre-formed stroke or the lines interconnecting these coordinate points on the display processor 211. If entry of the points corresponding to the coordinate points of the pre-formed stroke or the lines interconnecting these coordinate points on the display unit 5 leads to difficulties in entering the coordinate points on the contour of a newly formed stroke, it is only sufficient if the points corresponding to the coordinate points of the pre-formed stroke or the lines interconnecting these coordinate points are not displayed as described above.

At step ST2-1-8, the stroke sequence setting unit 22 sets the sequence of data of one or more strokes formed at step ST2-1-6 by the stroke data forming unit 21. If supplied with the stroke data sequence designating data from the input device 1, the stroke sequence setting unit 22 re-arrays the stroke data in the designated sequence for setting the sequence of the data of the respective strokes. If not supplied with the stroke data sequence designating data from the input device 1, the stroke sequence setting unit 22 arrays data of the strokes in the sequence in which the stroke data has been formed in the stroke data forming unit 21 for setting the sequence of data of the respective strokes.

By the above-described sequence of operations, the font forming processor 20 forms the font "+" which is formed by data of one or more strokes and in which the sequence of the data of the respective strokes is set.

Figures 12, 13:
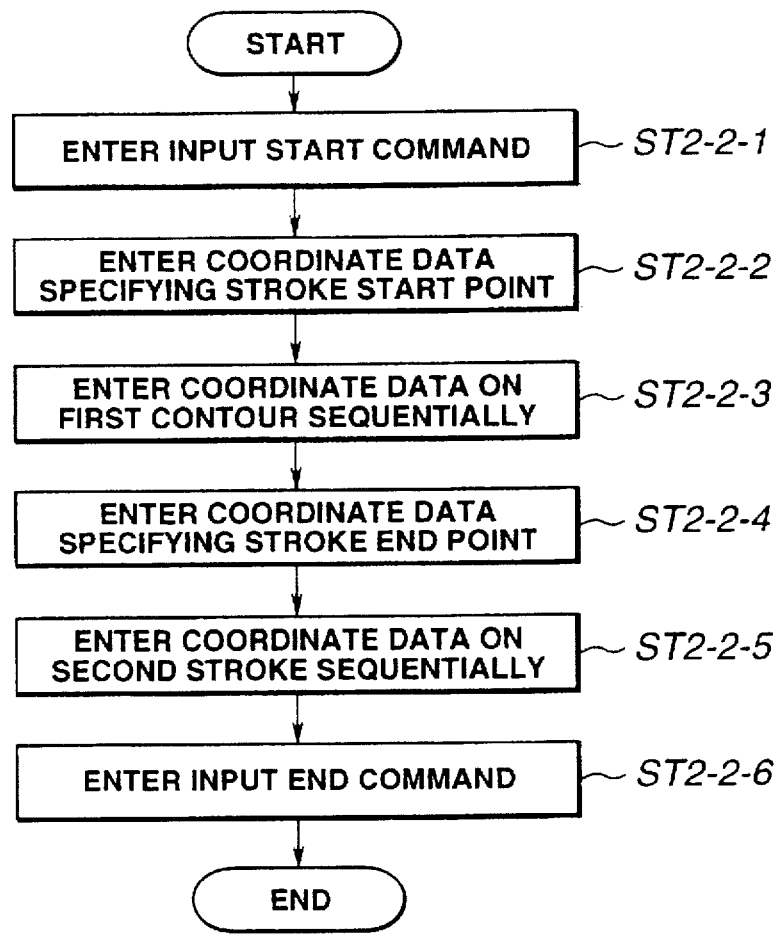
FIG. 12 is a flow chart for inputting coordinate points as stroke data.
FIG. 13 is a diagrammatic view showing an example of paper fiber structure data.

When entering the coordinate points on the stroke contour at step ST2-1-5, the user enters the following coordinate points in accordance with the flowchart shown in FIG. 12.

At step ST2-2-1, the user enters a command of initiating the entry of the coordinate points to the stroke data forming unit 21, using the input device 1, and initiates the entry of the coordinate points on the stroke contour line. At step ST-2-2-2, the user enters the coordinate points $(x_s, y_s)$ specifying the stroke start point to the stroke data forming unit 21 using the input device 1. At step ST-2-2-3, the user sequentially enters the coordinate points $(x_{11}, y_{11}), (x_{12}, y_{12}), \ldots (x_{1n}, y_{1n})$ on the first contour line to the stroke data forming unit 21 using the input device 1. Then, at step ST2-2-4, the user enters the coordinate points $(x_e, y_e)$ specifying the stroke end point to the stroke data forming unit 21 using the input device 1. At step ST-2-2-5, the user sequentially enters the coordinate points $(x_{2m}, y_{2m}), (x_{22}, y_{22}), \ldots (x_{21}, y_{21})$ on the second contour line to the stroke data forming unit 21 using the input device 1. At step ST2-2-6, the user enters a command specifying the end of entry of the coordinate points to the stroke data forming unit 21 using the input device 1 to terminate the entry of the coordinate points on the stroke contour.

Thus, when entering the coordinate points at steps ST2-2-2 to ST2-2-5, the user displays the points corresponding to the input coordinate points and lines interconnecting the respective coordinate points on the display unit 5 using the display processor 211 as he or she enters the coordinate points on the stroke contour. If need be, the user adds, moves or deletes the coordinates, using the editing processor 212, for editing the coordinate points as he or she enters the coordinate points on the stroke contour.

(3) Paper Fiber Structure Data

An illustrative example of the paper fiber structure data processing unit 30 is explained by referring to FIGS. 13 to 28. In the following description, a rectangular coordinate system is set in an area displaying a picture and pixels representing the smallest picture units are arrayed in each integer number coordinate (x, y) of the rectangular coordinate system. The region based on which the paper fiber structure data is to be formed is a region consisting of plural pixels on the rectangular coordinate system.

(3-1) Paper Fiber Structure Data

The paper fiber structure data, formed by the paper fiber structure data forming processor 30, is first explained.

Paper is constituted by plural interconnected fibers distributed in a reticular structure. The figure drawn on the paper with ink is formed by the amount of the ink stored between the fibers. The amount of the ink trapped between the fibers, that is the absorbed quantity of ink, depends upon the fiber structure. Thus, for forming picture data in which the figure drawn on the paper with ink is simulated more realistically, it is necessary to provided data simulating the paper fiber structure.

Since the ink flows through the fibers while the figure is drawn on the paper with ink, the ink flows through the fibers, so that bleeding is produced. The extent of the bleeding depends upon the gap between the fibers through which flows the ink. This gap is hereinafter referred to as a capillary tube. Thus, for formulating picture data in which picture data more realistically representing the figure drawn on the paper with ink, it is necessary to provide data simulating the capillary tube of the paper.

Based on this consideration, the paper fiber structure data, formed in the paper fiber structure data forming processor 30, is based on fiber data representing plural fibers constituting the paper which are arranged within an area made up of plural pixels. That is, the paper fiber structure data for the pixel P is comprised of a number M of fibers passing through the pixel P, the numbers $M_1, M_2, M_3, M_4, M_5, M_6, M_7, M_8$ of fibers passing through the pixel P and also through eight pixels $P_1, P_2, P_3, P_4, P_5, P_6, P_7, P_8$ neighboring to the pixel P, and the numbers of the capillary tubes $S_1, S_2, S_3, S_4, S_5, S_6, S_7, S_8$, as shown for example in FIG. 13. The eight pixels $P_1, P_2, P_3, P_4, P_5, P_6, P_7, P_8$, the eight numbers $M_1, M_2, M_3, M_4, M_5, M_6, M_7, M_8$ and the eight numbers $S_1, S_2, S_3, S_4, S_5, S_6, S_7, S_8$ are denoted as $P_i$, $M_i$ and $S_i$, respectively, where i=1, 2, 3, 4, 5, 6, 7, and 8. The numbers of fibers M, the numbers of fibers $M_i$ and the numbers of capillary tubes $S_i$ are represented by integers not less than 0. The numbers of fibers M, the numbers of fibers $M_i$ and the numbers of capillary tubes $S_i$ are set for all pixels in the areas corresponding to the paper fiber structure data for constituting the paper fiber structure data.

The numbers of fibers $M_i$ are the numbers of fibers passing through the pixel P and the pixels $P_i$. Thus, of the numbers $M_i$ of the fibers of the pixel P, those representing the fibers passing through the pixels $P_6, P_5$, P and $P_2$ in this order are the numbers $M_5$ and $M_1$, while the numbers of the fibers $M_6$ or $M_2$ have no relevance.

With the paper fiber structure data simulating the fine paper fiber structure, the absorbed ink quantity can be calculated since the numbers of fibers M are set. On the other hand, the numbers of capillary tubes $S_i$ formed in various directions from the pixel may be calculated since the numbers of fibers $M_i$ are set, while the amount and the direction of the ink flowing from the pixel to the neighboring pixels can be calculated since the numbers of the capillary tubes $S_i$ are set. Thus, by employing such paper fiber structure data, ink bleeding or absorption can be taken into account when forming picture data of a figure drawn on the paper with ink, so that it becomes possible to prepare picture data of a more realistically represented figure.

The capillary tube is an ink conduit formed between the fibers, with the numbers of the capillary tubes $S_i$ being dependent upon the numbers $M_i$ of the fibers. However, if the numbers of the capillary tubes are large, the width of each capillary tube is reduced, whereas, if the numbers of the capillary tubes are small, the width of each capillary tube becomes larger. Thus, if the numbers of the capillary tubes are changed, the sum of the ink amount flowing in the capillary tubes is thought to be substantially unchanged. Thus, for simplifying the data, the number of the capillary tubes $S_i$ may be set to 1 and 0 for the numbers of fibers $M_i$ of not less than 2 and less than 2, respectively.

Figure 14:
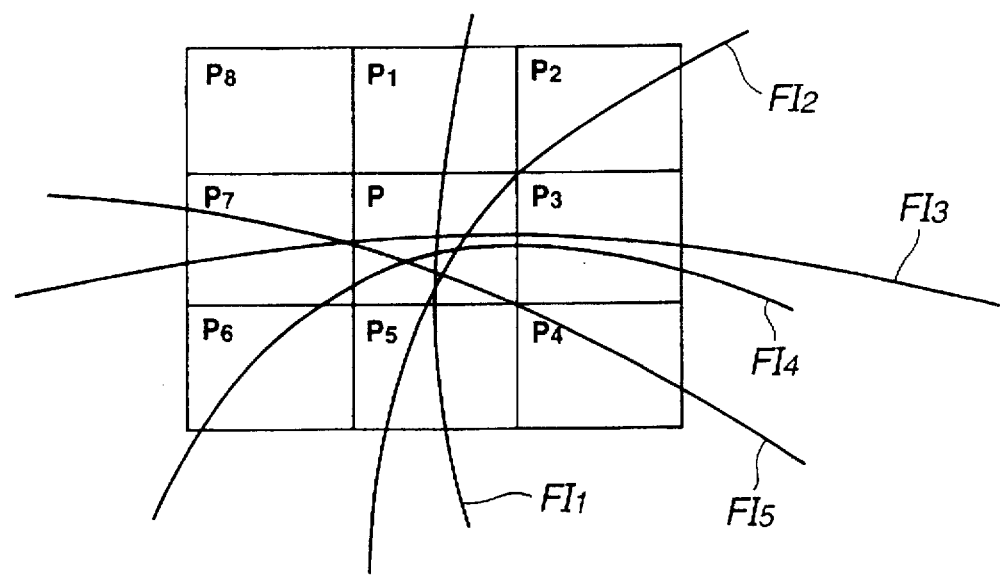
FIG. 14 is a diagrammatic view showing an example of fibers arrayed on a pixel O and neighboring pixels Pi.

Specifically, the paper fiber structure data is such that, if five fibers FI1, FI2, FI3, FI4 and FI5 are arrayed for the pixels P and $P_i$ as shown for example in FIG. 14, the respective values of the paper fiber structure data for the pixel P are such that the numbers of fibers M, $M_1$, $M_2$, $M_3$, $M_4$, $M_5$, $M_6$, $M_7$ and $M_8$ are 5, 1, 1, 2, 1, 2, 0, 3, respectively, and the numbers of capillary tubes $S_1$, $S_2$, $S_3$, $S_4$, $S_5$, $S_6$, $S_7$ and $S_8$ are 0, 1, 1, 0, 1, 0, 1, 0, respectively.

The paper fiber structure data may also comprise light transmittance I as data for representing the paper simulating the paper by the paper fiber structure data as a picture. The light transmittance I is set for respective pixels and represents light transmittance for each pixel. The light transmittance I is a value which depends upon the number M of the fibers and becomes lower and higher with increase and decrease in the number of fibers M, respectively. By setting the luminance of respective pixels for the pixels encompassed by the paper fiber structure data based upon the light transmittance I, and displaying the luminance of the pixels on the display unit 5, the picture of the simulated paper may be represented by the paper fiber structure, thus permitting visual recognition of the state of the modelled or simulated paper structure data.

(3-2) Construction of the Paper Fiber Structure Data Forming Processor

The illustrative structure of the paper fiber structure data forming processor 30 is now explained.

Figure 15:
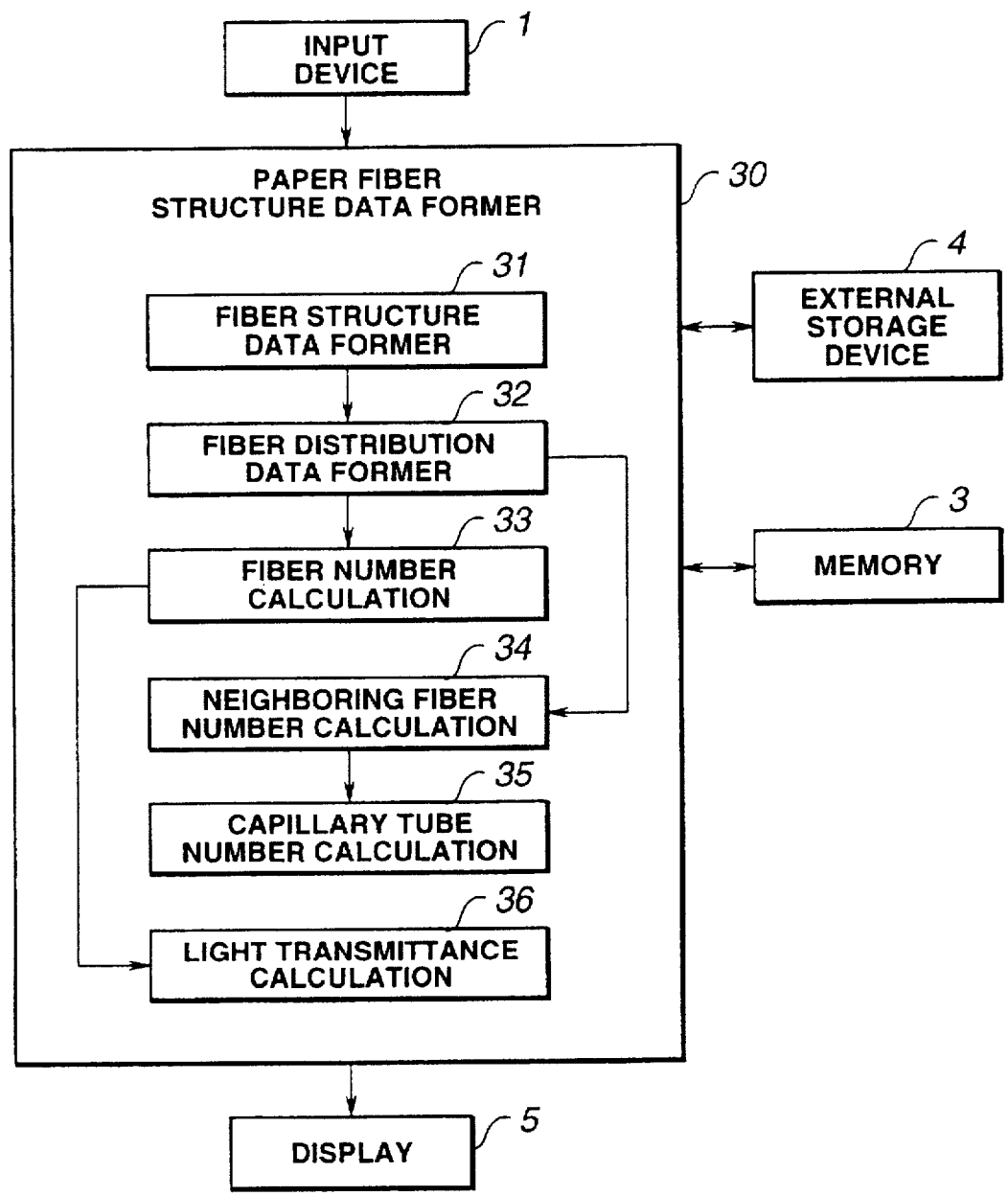
FIG. 15 is a block diagram showing an illustrative construction of a paper fiber structure data former.

Referring to FIG. 15, the paper fiber structure data forming processor 30 includes a fiber data forming unit 31 for producing fiber data representing one of the fibers making up the paper and a fiber distribution data forming unit 32 for arranging the plural fiber data prepared by the fiber data forming unit 31 in an area comprised of plural pixels for forming fiber distribution data representing the fiber distribution. The paper fiber structure data forming processor 30 also includes a fiber number calculation unit 33 for calculating the numbers of fibers M passing through the pixel P for each of the eight pixels $P_i$ neighboring to the pixel P, and a neighboring fiber number calculating unit 34 for calculating the numbers of fibers passing through the pixel P and also passing through the eight pixels $P_i$ neighboring to the pixel P based upon the fiber distribution data formed in the fiber distribution data forming unit 32. The paper fiber structure data forming processor 30 also includes a capillary tube number calculating unit 35 for calculating the numbers of capillary tubes Si formed in the direction of the pixel $P_i$ from the pixel P based upon the numbers of fibers $M_i$ calculated in the fiber number calculating nit 34.

The paper fiber structure data forming processor 30 forms paper fiber structure data, using the numbers of fibers M calculated by the fiber number calculating unit 33, the numbers of fibers $M_i$ calculated by the neighboring fiber number calculating unit 34 and the numbers of capillary tubes $S_i$ calculated by the capillary tube number calculating unit 35 as paper fiber structure data.

The paper fiber structure data formed by the paper fiber structure forming processor 30 is stored by being written in the memory 3 or in the externa storage device 4. When a blurred figure is to be drawn by the blurring processor 40 or a bled figure is to be drawn by the bleeding processor, the paper fiber structure data is read out from the memory 3 or the external storage device 4 for forming picture data representing a figure drawn on the paper with ink.

Meanwhile, the fiber data formed by the fiber data forming unit 31 is the data representing one of the fibers making up the paper, and is made up of data showing the fiber shape, fiber position data and fiber direction data.

Figure 16:
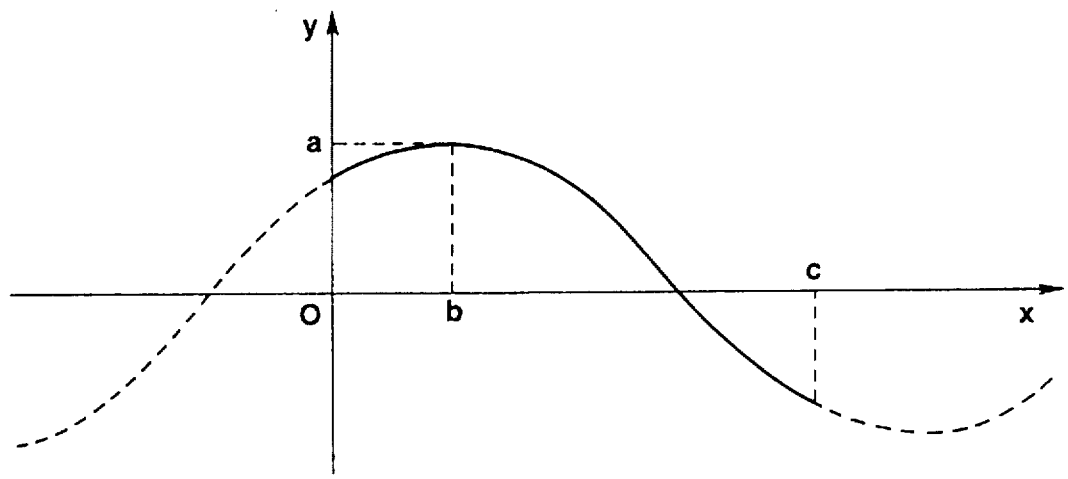
FIG. 16 is a graph showing an example of data representing the shape of fibers.

The data specifying the fiber shape is a part of the cosine function as shown for example in FIG. 16 and represented by the equation (3-1):

$$y = a \times \cos(x-b)$$

where $0 \leq x \leq c$, and a, b and c are constants, c denoting the fiber length. It is noted that a represents the degree of bend of the fiber, such that, the smaller the value of a, the smaller is the bend of the fiber and, conversely, the larger the value of a, the larger is the bend of the fiber. The values of a, b and c may be pre-fixed or may be varied within a pre-set range so as to be set at random depending upon fiber data. Alternatively, the values of a, b and c may be set to desired optional values entered by the input device 1 by the user or may be set at random depending upon the fiber data so to be as set to desired optional values entered by the input device 1 by the user.

By representing the fiber shape as a part of the cosine function as indicated by the equation (3-1), it becomes possible to represent the shape approximate to the actual paper fiber shape. However, the representation of the fiber shape is not limited thereto but may be represented by e.g., part of the sine function, or part of the n-ary curve, such as a quadratic or tertiary curve.

The data representing the fiber position is e.g. the coordinate value showing the end of a fiber $(x_1, y_1)$, while the data representing the fiber direction is the angle θ indicating the fiber arraying direction. The coordinate $(x_1, y_1)$ and the angle θ are values set at random by the fiber data forming unit 31.

Figure 17:
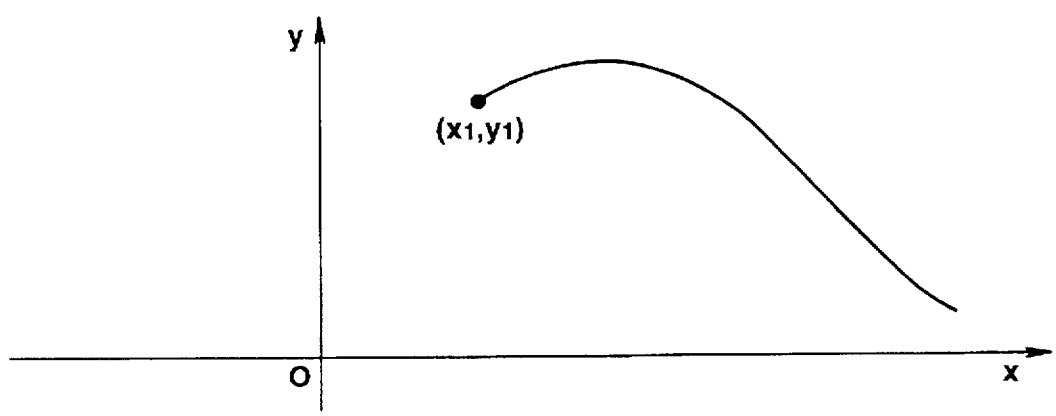
FIG. 17 is a graph showing an example of data representing the position of fibers.
Figure 18:
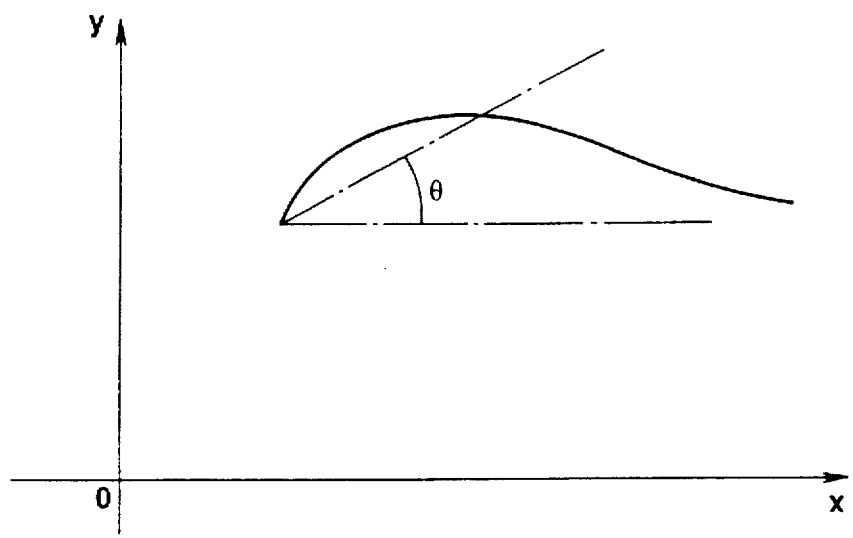
FIG. 18 is a graph showing an example of data representing the direction of fibers.

The fiber data is obtain ed by transforming (x, y) of the equation (3-1) in accordance with the equations (3-2) and (3-3):

$$x = x + x_1 \tag{3-2}$$

$$y = y + y_1 \tag{3-3}$$

using the coordinate value $(x_1, y_1)$ which is the fiber position representing data as shown for example in FIG. 17, and also by rotating (x, y) the equation (3-1) n accordance with the equations (3-4) and (3-5):

$$x = x \times \cos(\theta) + y \times \cos(\theta) \tag{3-4}$$

$$y = -x \times \sin(\theta) + y \times \cos(\theta) \tag{3-5}$$

using the angle θ which is the data representing the fiber direction, as shown for example in FIG. 18.

These plural fiber data, formed by the fiber data forming unit 31, are arranged in an area for forming the paper fiber structure data by the fiber distribution data forming unit 32 for forming fiber distribution data.

Figure 19:
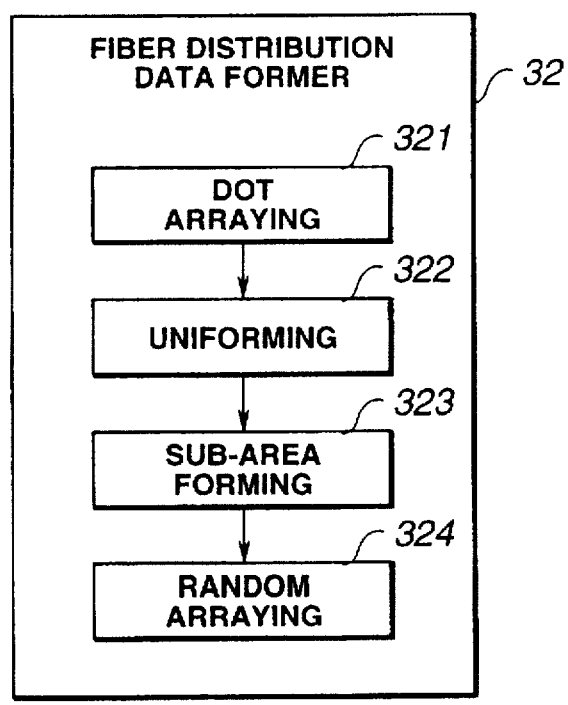
FIG. 19 is a block diagram showing an illustrative construction of a paper fiber distribution data former.

For taking into account both the uniform distribution and partial distribution of the paper fibers, the fiber distribution data forming unit 32 includes a dot arraying unit 321 for arraying plural points at random in an area made up of plural pixels encompassed by the paper fiber structure data and a uniforming unit 322 for uniforming the plural points arranged by the dot arraying unit 321 by relaxation processing, as shown in FIG. 19. The fiber distribution data forming unit 32 also includes a sub-area forming unit 323 for forming plural sub-areas centered about each dot uniformed by the uniforming unit 322 and a random arraying unit 324 for random arraying the same number of fiber data in each of the sub-areas formed by the sub-area forming unit 323.

For producing the fiber distribution data in the fiber distribution data forming unit 32, plural points are arranged at random in an area made up of plural pixels encompassed by the paper fiber structure data by the dot arraying unit 321. The plural points arranged at the dot arraying unit 321 are uniformed by relaxation processing by the uniforming unit 322. Then, a plurality of sub-areas, each centered around each point uniformed by the uniforming unit 322, are formed by the sub-area forming unit 323. The same number of fiber data are arranged at random in each sub-area formed by the sub-area forming unit 323 for forming fiber distribution data.

Figure 20:
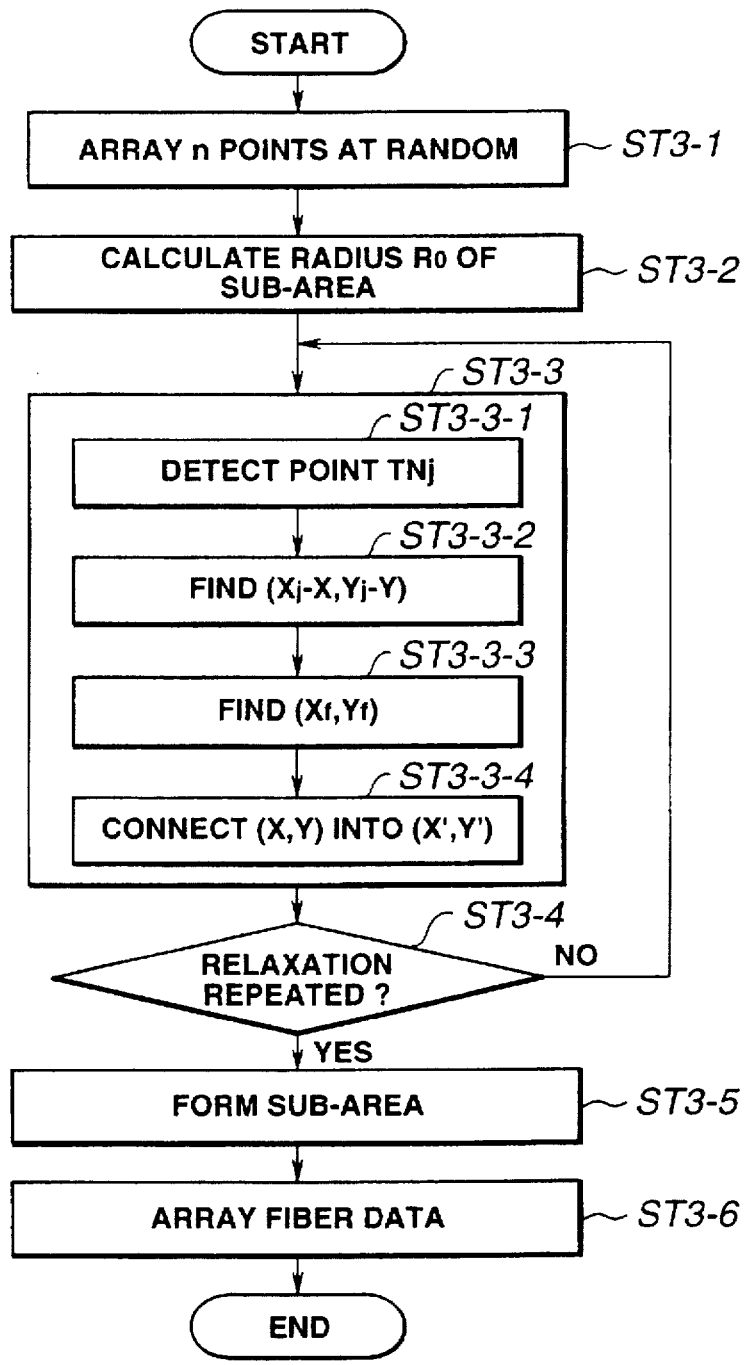
FIG. 20 is a flow chart for illustrating the operation of the paper fiber distribution data former.

Referring to the flowchart of FIG. 20, an illustrative operation of the fiber distribution data forming unit 32 is explained.

Figure 21:
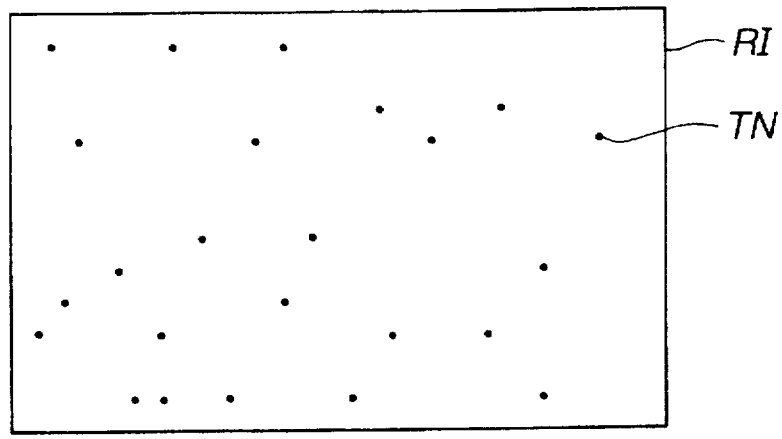
FIG. 21 is a diagrammatic view showing typical plural points arrayed at random by a dot arraying unit.
Figure 22:
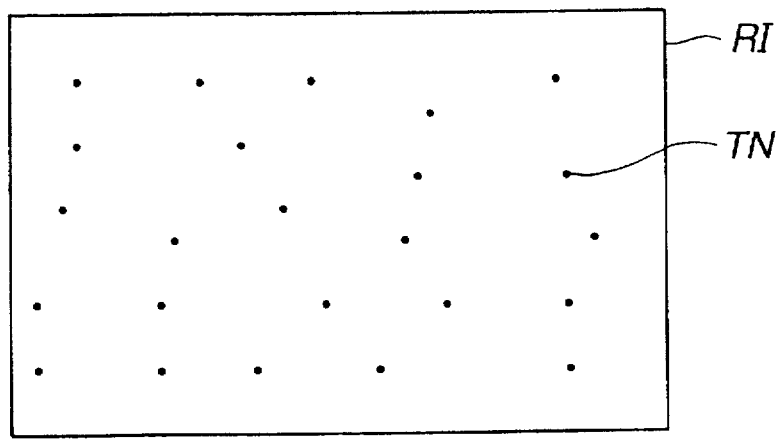
FIG. 22 is a diagrammatic view showing typical plural points uniformed in their positions by a uniforming unit.

At step ST3-1, the dot arraying unit 321 arrays at random n dots TN in an area RI made up of plural pixels encompassed by the paper fiber structure data, as shown for example in FIG. 21. The value of n, which is an integer not less than 2, may be pre-set or entered at a desired value by the user via the input unit 1.

Then, at step ST3-2, the dot arraying unit 321 calculates the radius $R_O$ of the sub-area formed within the area RI made up of plural pixels encompassed by the paper fiber structure data. The value of the radium $R_O$ may be pre-set, entered at a desired value by the user via the input unit 1, or calculated based upon the value of the number n of the dots arrayed at step ST3-1. If the value of the radius $R_O$ is to be calculated based upon the number n of the dots arrayed at step ST3-1, it is calculated in accordance with the equation (3-6):

$$R2O=2.0\times(X\times Y/n)^{1/2} \quad (3-6)$$

where X and R denote the transverse length and the vertical length of the area RI made up of plural pixels encompassed by the paper fiber structure data. Then, at step ST-3, the uniforming unit 322 carries out relaxation processing for moving the respective dots for uniforming the positions of the n dots arranged at the step ST3-1.

As an example of the relaxation processing, the relaxation processing on a point $TN_a$ having the current position (X, Y) is explained.

At step ST3-3-1, the uniforming unit 322 detects m dots $TN_j$ (j=1, 2, 3, . . . m), included within a circle having a radius $R_O$ centered about (X, Y), from among the dots TN placed at random at step ST3-1. The radius $R_O$ is the value found at step ST3-2. It is noted that m<n and a point $TN_a$ is not included among the dots $TN_j$.

At step ST3-3-2, the uniforming unit 322 finds j vectors $(X_j-X, Y_j-Y)$ proceeding from a point $TN_a$ to a point $TN_j$.

At step ST3-3-3, the uniforming unit 322 finds the sum $(X_f, Y_f)$ of j vectors $(X_j-X, Y_j-Y)$ proceeding from the point $TN_a$ to the point $TN_j$, where $(X_f, Y_f)$ is represented by the following equation (3-7):

$$(X_f, Y_f)=(X_1-X, Y_1-Y)+(X_2-X, Y_2-Y)+\ldots (X_m-X, Y_m-Y) \quad (3-7)$$

Then, at step ST3-3-4, the uniforming unit 322 transforms the position of the point $TN_a$ (X, Y) into (X', Y') as shown by the equation (3-8) and (3-9):

$$X'=X+d\times X_f \quad (3-8)$$

$$Y'=Y+d\times Y_f \quad (3-9)$$

where d is a pre-set proportionality constant.

The relaxation processing on the dot $TN_a$ is performed by the above step ST3-3-1 to ST3-3-4. Thus, by sequentially performing the steps ST3-3-1 to ST3-3-4 for n dots TN, the n points TN is relaxed, so that the n points TN placed in the area RI made up of plural pixels encompassed by the paper fiber structure data are uniformed, as shown for example in FIG. 22.

The relaxation processing is not limited to the above-given processing provided the positions of plural points may be uniformed. Thus, any of known relaxation processing operations may be employed.

If the step ST3-3 comes to a close, the uniforming unit 322 judges, at step ST3-4, whether or not the relaxation processing is to be iterated. The number of the relaxation processing operations needs only to be changed depending upon the state of distribution of the fibers constituting the desired paper. If the distribution of the fibers making up the paper exhibits partiality over the entire area, the number of iteration of the relaxation processing is diminished, whereas, if the paper exhibits partiality to a lesser extent over the entire area, the number of iteration is decreased. The number of times of iteration of the relaxation processing may be pre-set or entered via the input device 1 so that the number of times of the iteration may be freely set by the user. If the relaxation processing is to be repeated (YES), the processing reverts to step ST3-3, whereas, if the relaxation processing comes to a close (NO), the processing returns to step ST3-5.

Figure 23:
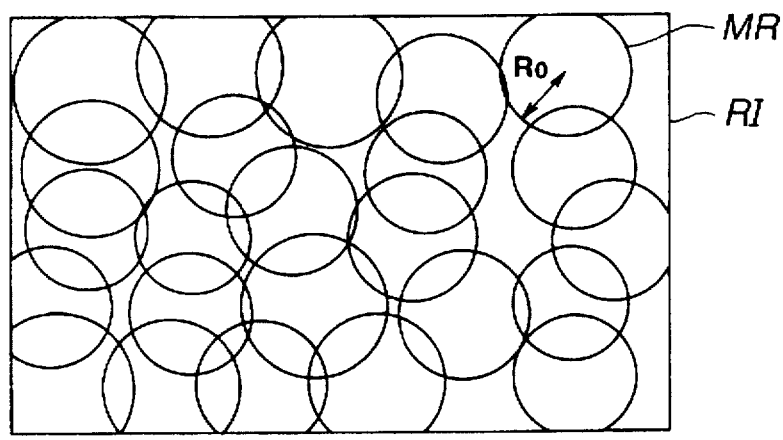
FIG. 23 is a diagrammatic view showing typical small areas formed by a small area former.

At step ST3-5, the sub-area forming unit 323 forms n circular sub-areas MR, each centered about one of n uniformed dots TN, as shown for example in FIG. 23. The value of the radius $R_O$ of the sub-area MR is one found at step ST3-2.

Figure 24:
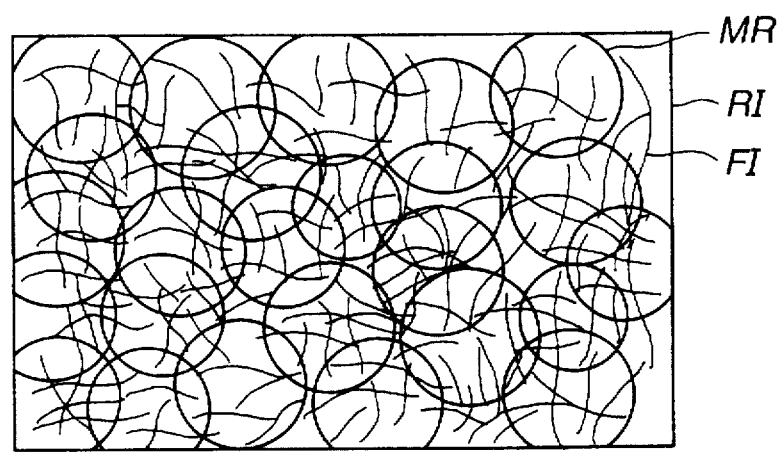
FIG. 24 is a diagrammatic view showing typical fiber data arrayed at random by a random arraying unit.

Then, at step ST3-6, the random arraying unit 324 places at random fiber data in the respective sub-areas MR so that the same number of fibers FI as that of the small sub-areas MR will be arranged in the small sub-areas MR as shown for example in FIG. 24.

By the above steps ST3-1 to ST3-6, the fiber data formed by the fiber data forming unit 31 are placed with uniform distribution and partial distribution in the area for forming paper fiber structure data.

If the fiber data are formed in this manner, it becomes possible to realize the fiber distribution data having both the uniform fiber data distribution over the entire area and the partial fiber data distribution over a small-sized area. That is, the fiber data may be distributed so as to have partial distribution in a small-sized area by uniforming the positions of the dots by the uniforming unit 322 so that partial dot positions are left to a small extent. On the other hand, the fiber data may be distributed so as to be uniform over the entire area by setting the same number of fibers as the respective sub-areas formed by the small area forming unit 323 in these sub-areas.

Figure 25:
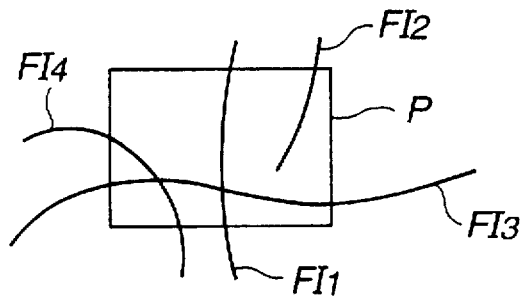
FIG. 25 is a diagrammatic view showing typical fibers arrayed on a pixel.

Based upon the thus formed fiber distribution data, the fiber number calculating unit 33 finds the number of fibers associated with the pixel P. That is, the fiber number calculating unit 33 finds the number of fibers M passing through the pixel P based upon the fiber distribution data formed by the fiber distribution data forming unit 32. This number of the fibers M is found for each pixel so as to be the paper fiber structure data. Specifically, if fibers $FI_1$, $FI_2$, $FI_3$ and $F_4$ are arranged for the pixel P, as shown in FIG. 25, the number of fibers M of the pixel P is equal to 4. On the other hand, the neighboring fiber number calculating unit 34 finds the number of the fibers for the pixel P according to the fiber directions. Thus the unit 34 finds the numbers of fibers $M_i$ passing through the pixel P and through the eight pixels $P_i$ neighboring to the pixel P based upon the fiber distribution data formed by the fiber distribution data forming unit 32.

If the fiber passes through the pixel P and through two or more pixels of the eight neighboring pixels $P_i$ neighboring to the pixel P, it is then assumed that the fiber is arrayed in the direction of the fiber $P_i$ which the fiber emanating from the pixel P first traverses and thus the number $M_i$ of the fibers for the pixel $P_i$ traversed first by the fiber emanating from the pixel P is incremented by one. Specifically, if the fiber traverses the pixels $P_6$, $P_5$, P, $P_1$, $P_2$ in this order, the numbers of fibers M5 and M1 are incremented by one, while the numbers of fibers M6 and M2 are not incremented by one.

The numbers of fibers $M_i$ are found from pixel to pixel to pixel in order to provide the paper fiber structure data. Specifically, if the five fibers $FI_1$, $FI_2$, $FI_3$, $FL_4$ and $FI_5$ are arrayed for the pixels P and $P_i$, as shown in FIG. 14, the number M of fibers of the pixel P is 5, while the numbers of the fibers $M_1$, $M_2$, $M_3$, $M_4$, $M_5$, $M_6$, $M_7$ and $M_8$ become equal to 1, 1, 2, 1, 2, 0, 3, 0, respectively.

The capillary tube number setting unit 35 finds the numbers of the capillary tubes for the pixel P according to directions. That is, the calculating unit 35 finds the numbers of capillary tubes $S_i$ formed in the respective directions of the eight pixels neighboring to the pixel P based upon the numbers $M_i$ of fibers as calculated by the neighboring fiber number calculating unit 34. The numbers $S_i$ of the capillary tubes are found on the pixel basis to provide the paper fiber structure data.

Since the ink duct formed in the fiber gap is the capillary tube, the number of the capillary tubes $S_i$ is dependent upon the number of fibers $M_i$. However, if the number of capillary tubes is large, the capillary tube is reduced in width, whereas, if there is only a small number of the capillary tubes, the capillary tube is increased in width. Thus it may be presumed that the sum total of the ink quantity flowing through he capillary tubes remains substantially constant even if the number of the capillary tubes is changed. Thus the number of capillary tubes $S_i$ may be reduced to data specifying only the presence or absence of the capillary tubes for data simplification. Specifically, the number of the capillary tubes $S_i$ may be set to 1 or 0 according as the capillary tubes are or are not constituted by $M_i$ fibers, respectively.

In deciding whether or not the capillary tubes are constituted by $M_i$ tubes, it is assumed that the capillary tubes are formed for the number of fibers $M_i$ equal to 2 or more while the capillary tubes are not formed if the number of fibers $M_i$ is less than 2. That is, the number of capillary tubes $S_i$ is set to 1 or 0 for the number of fibers $M_i$ equal to not less than 2 or less than 2, respectively. Specifically, if the fiber fibers $FI_1$, $FI_2$, $FI_3$, $FL_4$ and $FI_5$ are arrayed for the pixel P and the pixel $P_i$ as shown in FIG. 14, the numbers of the capillary tubes $S_1$, $S_2$, $S_3$, $S_4$, $S_5$, $S_6$, $S_7$, $S_8$ are 0, 0, 1, 0, 1, 0, 1, 0, respectively.

For more accurate simulation of the paper structure, the angles of intersection of the $M_i$ fibers may be taken into account in setting the numbers $S_i$ of the capillary tubes. The reason is that, if the angle of intersection of the neighboring fibers is large, the fiber gap is increased so that the fiber gap ceases to function as the capillary tube and hence the ink cannot flow through the fiber gap.

Figure 26:
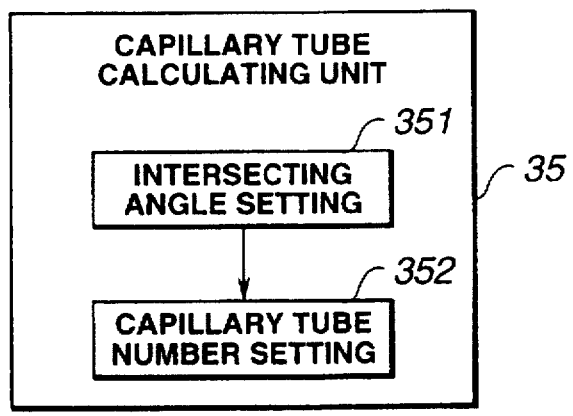
FIG. 26 is a block diagram showing an illustrative construction of a capillary tube calculating unit.
Figure 27:
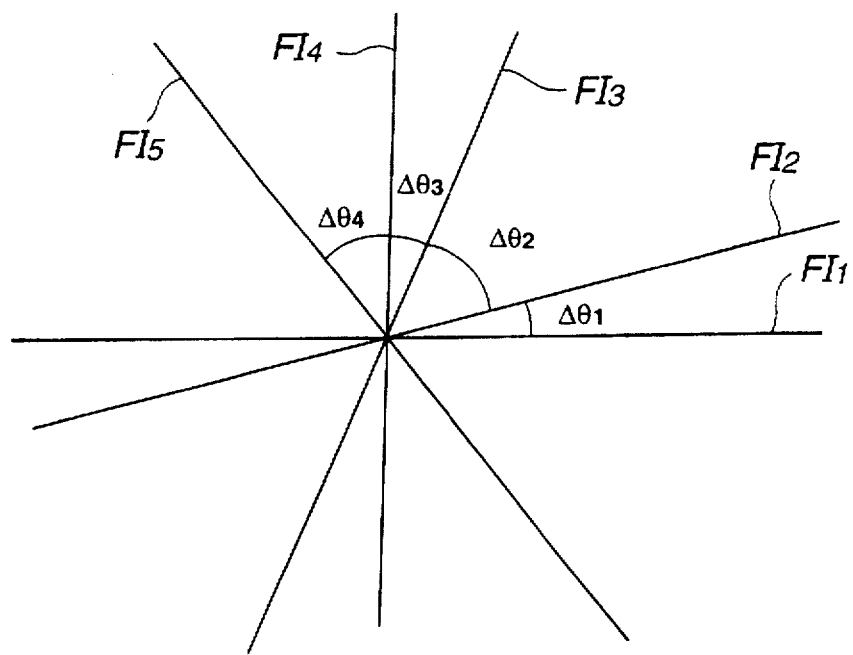
FIG. 27 is a diagrammatic view showing an Mi number of fibers, with the angles of intersection between neighboring fibers being set at random.

If the number of the capillary tubes $S_i$ is to be set in consideration of the angles of intersection of the $M_i$ fibers, the capillary tube calculating unit 35 is made up of an intersection angle setting unit 351 for setting the angles of intersection between neighboring fibers at random, and a capillary tube number setting unit 352 for setting the numbers of capillary tubes $S_i$, as shown for example in FIG. 26. After setting the angles of intersection between neighboring fibers of $M_i$ fibers in the direction of the pixels $P_i$ neighboring to the pixel P at random by the intersection angle setting unit 351, the capillary tube number setting unit 352 sets the number of the capillary tubes $S_i$ to 1 or 0 if at least one of the intersection angles as set by the intersection angle setting nit 351 is within a preset angle or if the totality of the intersection angles as set by the intersection angle setting unit 351 is not within the pre-set angle, respectively. Specifically, if the number M1 of fibers of the pixel P is 5, the intersection angle setting unit 351 sets the intersection angles $\Delta\theta_1$, $\Delta\theta_2$, $\Delta\theta_3$ and $\Delta\theta_4$ between neighboring one of the five fibers $FI_1$, $FI_2$, $FI_3$, $FL_4$ and $FI_5$ at random at the intersection angle setting unit 351, as shown in FIG. 27. The capillary tube number setting unit 352 sets the number of the capillary tubes $S_i$ to 1 or 0 if at least one of the intersection angles $\Delta\theta_1$, $\Delta\theta_2$, $\Delta\theta_3$ and $\Delta\theta_4$ as set by the intersection angle setting unit 351 is within a preset angle or if the totality of the intersection angles as set by the intersection angle setting unit 351 is not within the pre-set angle, respectively.

If light transmittance I is also set as the paper fiber structure data, the paper fiber structure data forming processor 30 includes a light transmittance calculating unit 36 for finding the pixel-based light transmittance I indicating the light transmittance in the pixel in which the fiber is placed based upon the number of fibers M as calculated by the fiber number calculating unit 33.

The light transmittance calculating unit 36 calculates the pixel-based light transmittance I based upon the number of fibers M and uses the calculated light transmittance I as the paper fiber structure data. The light transmittance I is calculated based upon the number of fibers M of each pixel so that the more the number of the fibers M, the less becomes the light transmittance through the pixel and the lesser the number of the fibers M, the larger becomes the light transmittance through the pixel.

Figure 28:
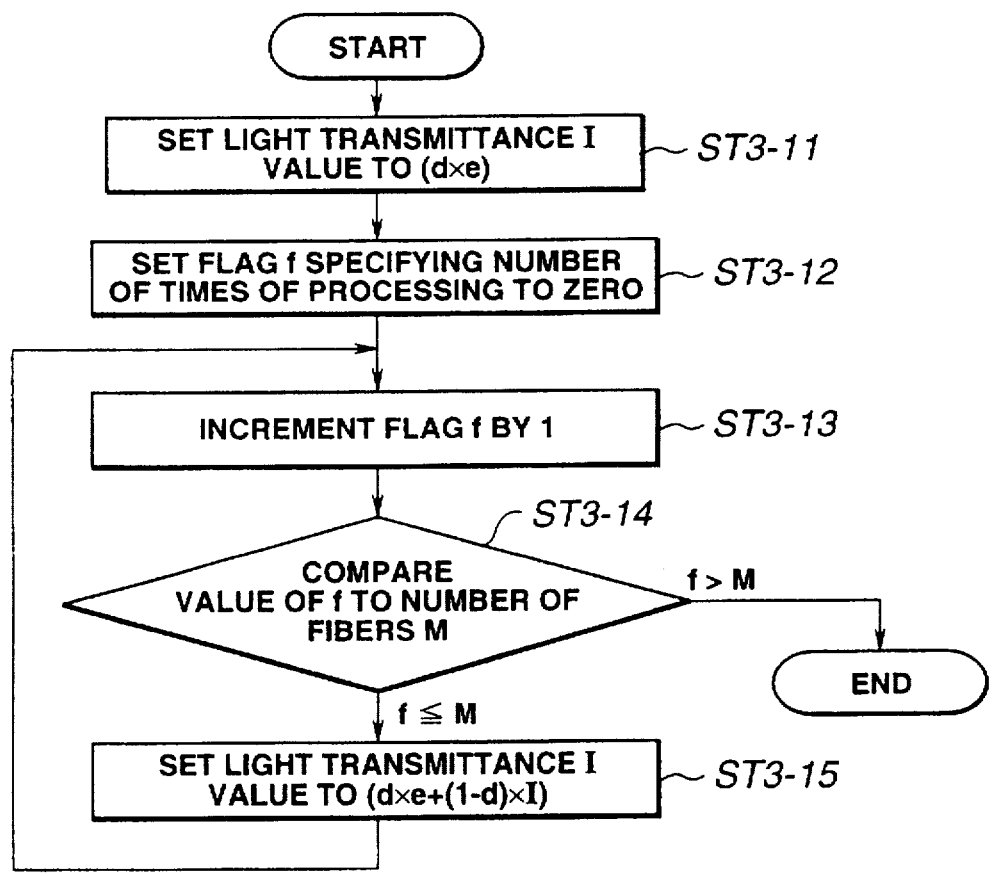
FIG. 28 is a flowchart showing the operation of a light transmittance calculating unit.

The illustrative operation of the light transmittance calculating unit 36 will be explained by referring to the flowchart of FIG. 28. In the following explanation, it is assumed that the larger the value of the light transmittance I, the lesser becomes the light transmittance and the smaller the value of the light transmittance I, the higher becomes the light transmittance.

At step ST3-11, the light transmittance calculating unit 36 sets the value of light transmittance I to (d×e) as an initial value, where d and e are pre-set constants, with 0<d<1 . . . .

At step ST3-12, the light transmittance calculating unit 36 sets the value of the flag for the number of times of processing operations f to 0.

At step ST3-13, the light transmittance calculating unit 36 increments the value of the flag specifying the number of times of processing operations to 1 for setting the number of times of the processing operations.

At step ST3-14, the light transmittance calculating unit 36 compares the values of f and M to each other for repeating the processing a number of times equal to the number M of the fibers for the pixel P. The light transmittance calculating unit 36 transfers to step ST3-15 or terminates the processing if f≦M or otherwise, respectively.

At step ST3-15, the light transmittance calculating unit 36 sets the value of the light transmittance I to (d×e+(1−d)×I) as a change in the light transmittance caused by a sole fiber. The light transmittance calculating unit 36 then reverts to step ST3-13 for iterating the processing a number of times equal to the number of fibers M for the pixel P.

By setting the luminance of the respective pixels based upon the thus set light transmittance I and displaying the luminance in the display unit 5, the picture of the paper simulated by the paper fiber structure data may be displayed such that the state of the simulated paper fiber structure data may be checked by visual inspection by the user.

(4) Blurring Processor

Figure 29:
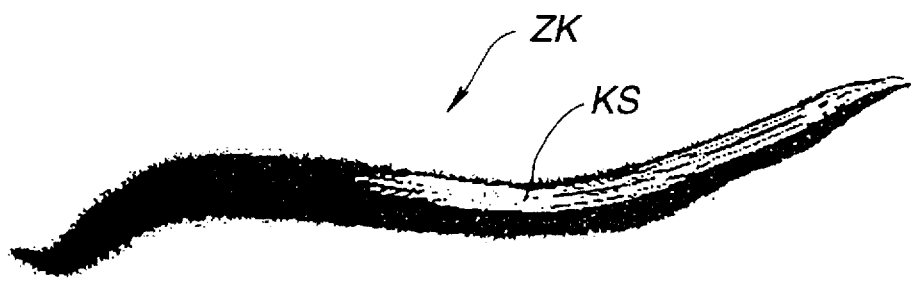
FIG. 29 shows an illustrative figure presenting blurring.
Figure 87:

Referring to FIGS. 29 to 87, an illustrative embodiment of the blurring processor 40 is explained n detail.

If, while the writing brush is moved from a starting point towards an end point for drawing a picture, the amount of ink contained in the brush is small, the brush carrying speed is high or the brush pressure is low, a region depleted of ink, referred to hereinafter as a blurred area KS, is produced as a result of blurring. The blurring processor 40 mainly forms a picture data for displaying a blurred figure. Such picture data is supplied to the display unit 5 for drawing a blurred figure on the display surface of the display unit 5.

Figures 30, 31:
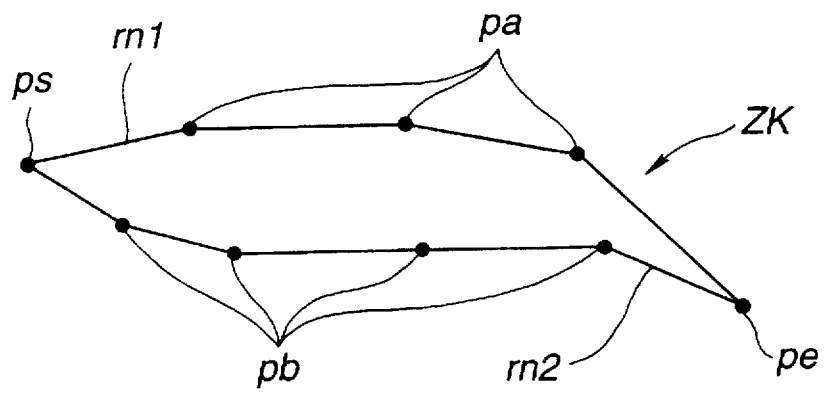
FIG. 30 illustrates an example of a figure processed by a blurring processor.
FIG. 31 illustrates an illustrative data structure of full-contour data.

The figure processed by the blurring processor 40 is a figure ZK surrounded by a first contour rn1 interconnecting plural points pa inclusive of a starting point ps and an end point pe and a second contour rn2 interconnecting plural points pb inclusive of the starting point ps and the end point pe, as shown for example n FIG. 30. Specifically, the figure processed by the blurring processor 40 is a figure represented by stroke data of a font formed by the above-mentioned font forming processor 20.

The basic processing performed by the blurring processor 40 is to set ink present data specifying the ink present state as picture data for pixels of the figure within a non-blurred region, referred to hereinafter as a drawing region, and to set ink absent data specifying the ink absent state as picture data for pixels within the blurred area KS for forming picture data for representing a blurred figure ZK.

(4-1) Data Employed in Blurring Processing

First, full-contour data, blurred region data, blurring parameters, shape data, picture data and writing brush data, which are main data employed in the blurring processing by the blurring processor 40, are explained.

(4-1-1) Full Contour Data

The full-contour data is the data specifying the contour of a figure and the drawing direction. For example, the full-contour data is comprised of first contour data including a contour interconnecting a start point and an end point of a figure and the drawing direction, and second contour data including another contour interconnecting the start point and the end point of the figure and the drawing direction, as shown in FIG. 31.

Figures 38, 39:
FIG. 38 illustrates continuous blurring.
FIG. 39 is a diagrammatic view showing a data structure of shape data.

The first contour data is an array of m coordinate points $A_i$ (i=1, 2, 3, ..., m), m being an integer not less than 1, on the first contour of the figure, arrayed in the figure drawing direction, as shown in FIG. 31. The first coordinate point $A_1$ and the last coordinate point $A_m$ represent the starting point and the end point of the figure, respectively. Similarly, the second contour data is an array of n coordinate points $B_j$ (i=1, 2, 3, ... n), n being an integer not less than 1, on the second contour of the figure, arrayed in the figure drawing direction, as shown in FIG. 38. The first coordinate point $B_1$ and the last coordinate point $B_n$ represent the starting point and the end point of the figure, respectively. Thus the coordinate points $A_1$ and $B_1$ represent the same point, while the coordinate points $A_m$ and $B_n$ represent the same point.

The above-described full-contour data is complemented as explained subsequently so that coordinate points are added to the first contour data and the second contour data for further smoothing the contour of the figure. Thus it suffices to set the initially set first and second contour data so as to permit the approximate contour of the figure to be comprehended. The coordinate points are added to the first and second contour data so that the numbers of the coordinate points of the first contour data m and the numbers of the coordinate points of the second contour data n will be equal to each other by way of complementation, as will be explained subsequently. Thus it is unnecessary for the initially set first and second contour data to be equal to each other.

Specifically, these full-contour data are stroke data of the font formed by the font forming processor 20. Thus the blurring processor 40 performs blurring processing on the stroke data of the font formed by the font forming processor 20.

If there exist plural figures to be drawn, for example, if a character or a symbol is comprised of plural strokes each of which is a figure to be drawn, plural sets of full-contour data are provided for coping with the respective strokes. The respective sets of the full-contour data are set so that the full-contour data will be arrayed in the drawing sequence of the respective figures to permit the drawing sequence of the respective figures to be understood. Specifically, the plural sets of the full-contour data is a font comprised of data of plural strokes formed by the font forming processor 20. That is, in the case of the font comprised of data of plural strokes formed by the font forming processor 20, the data of the respective strokes each corresponding to the full-contour data are arrayed in the writing sequence for setting the data sequence of the respective strokes. The blurring processor 40 performs blurring processing on the font formed by the font forming processor 20.

(4-1-2) Blurred Region Data

The blurred region data is the data representing the position of the blurred region and is comprised of data representing the length of m trajectories along the first or second contours extending within the figure from the starting point to the end point. These trajectories are hereinafter referred to as drawing trajectories. The position within the figure of the blurred area is represented by the lengths of these m trajectories.

Figures 32, 33:
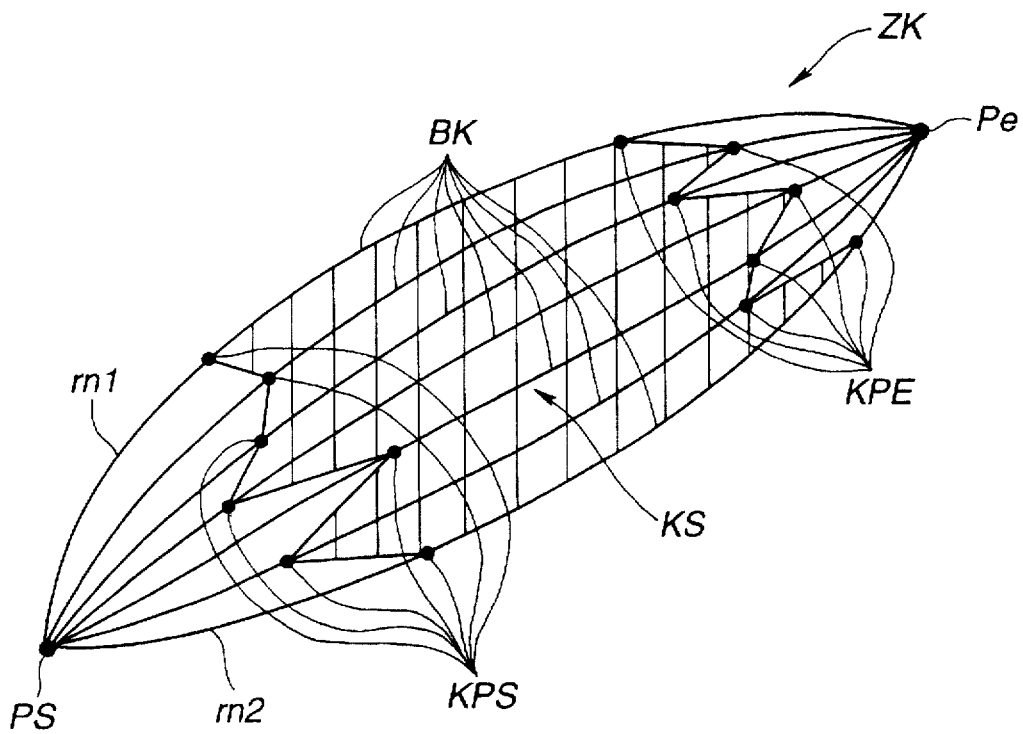
FIG. 32 is a diagrammatic view showing an example of a figure drawing trajectory.
FIG. 33 shows an example of a blurred area represented by the blurred area data.

The drawing trajectories BK are m lines extending from the start point ps as far as the end point pe and spaced apart with an equal spacing from each other along the width of the figure ZK as shown for example in FIG. 32. Both end drawing trajectories are equivalent to the first contour line rn1 and the second contour line rn2 of the figure ZK. Although the number m of the drawing trajectories is small in FIG. 32 for ease in understanding, the number m of the drawing trajectories BK is actually much larger for representing the blurring more precisely.

The blurred area data is comprised of m blurring start length data on the m drawing trajectories BK beginning from the start point ps and terminating at blurring start points KPS and m blurring end length data on the m drawing trajectories BK beginning from the start point ps and terminating at blurring end points KPE, thereby specifying the position in the drawing ZK of the blurred region KS.

If there exists no blurred area KS on a given drawing trajectory BK, the blurring start length data and the blurring end length data on the drawing trajectory are set to an equal value. Specific ally, the blurring start length data and the blurring end length data on the drawing trajectory are both set to 0 or 1.

The blurring start length data is a value comprised within a range of 0 and 1, obtained on normalizing the length from the start point ps as far as the blurring start point KPS, with the length of the figure ZK beginning at the start point ps and ending at the end point pe, for example, a mean value of the length of the first contour and the length of the second contour, being set to 1. Similarly, the blurring end length data is a value comprised within a range of from 0 to 1 obtained on normalizing the length from the starting point ps as far as the blurring end point PE, with the length of the figure being set to 1. This simplifies the blurring start length data and the blurring end length data. Of course, the blurring start length data and the blurring end length data may be set so as to be equal to the actual length from the start point p as far as the blurring start point KP and the actual length from the start point ps as far as the blurring end point KPE.

With the blurred region data, the position within the figure of the blurred area may be represented solely by the blurring start length data and the blurring end data, that is two one-dimensionally arrayed data. In other words, with such blurred area data, the blurred area position may be specified by simplified data. In addition, if the blurring start data and the blurring end data are normalized based upon the figure length, data specifying the position of the blurred area may be simplified further.

The blurred area data is the data set for corresponding to a sole blurred area, so that, if there exist plural blurred areas in a figure, plural blurred areas may be set in each blurred area.

FIG. 33 shows an illustrative example of the above-described blurred area data. The blurred area data shown in FIG. 33 is such data in which, for a figure having two blurred areas KS, eight blurring trajectories BK1, BK2, BK3, BK4, BK5, BK6, BK7 and BK8 are provided, with the blurred area data being normalized with the figure length set to 1. It is noted that the blurred area data shown in FIG. 33 are simplified for explanation and that, for defining the blurred area KS more precisely, the number of the drawing trajectories, that is the numbers of the blurring start length data and the blurring end length data, are set to larger values, while the numbers of the effective digits of the blurring start length data and the blurring end length data are also set to larger values.

Figure 34:
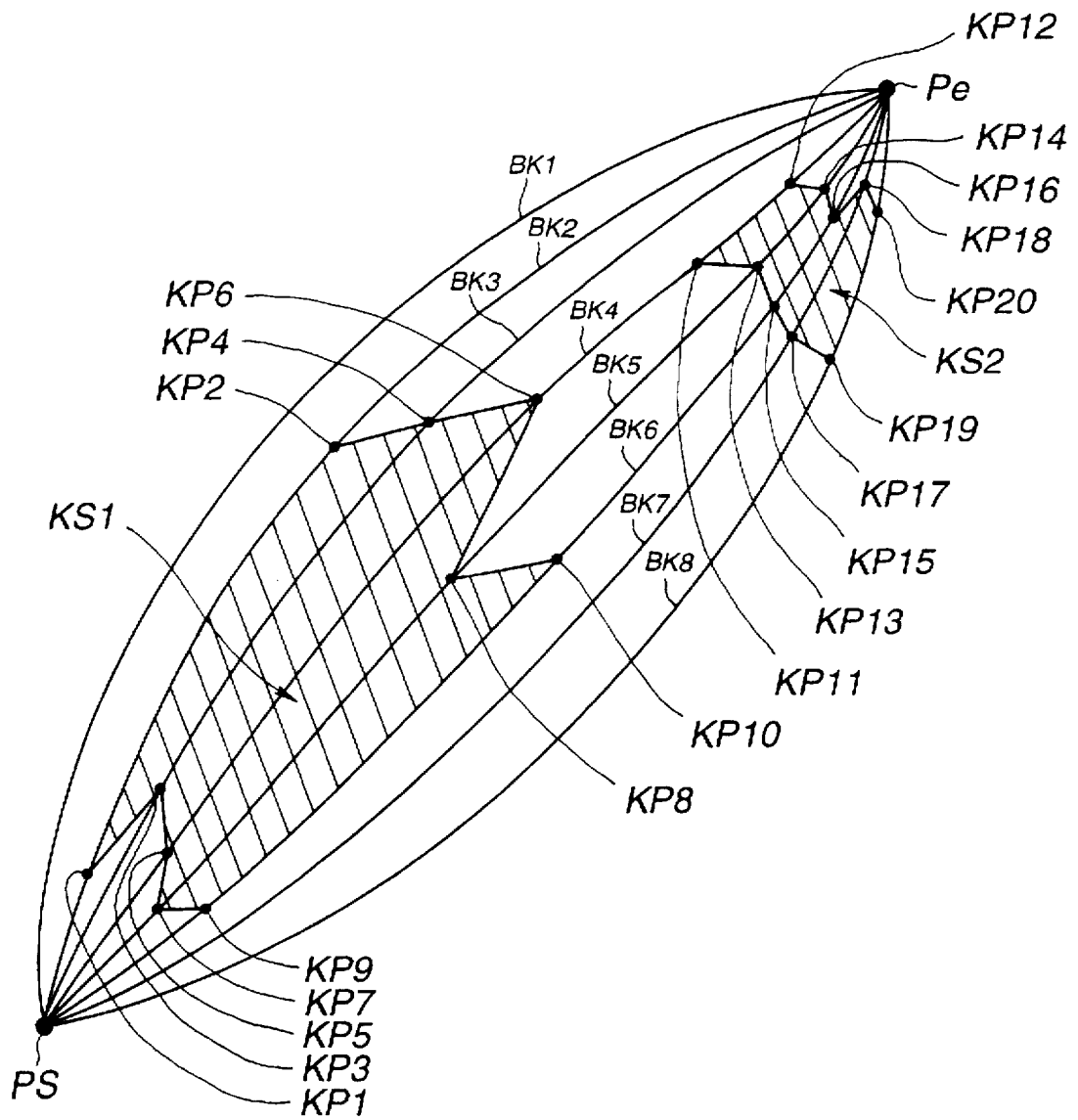
FIG. 34 shows an example of a blurred area represented by blurred area data of FIG. 32.

Referring to FIG. 34, the blurred area KS represented by the blurred area data shown in FIG. 33 is comprised of a first blurred area KS1 surrounded by a blurring start point KP1 and a blurring end point KP2 on the drawing trajectory BK2, a blurring start point KP3 and a blurring end point KP4 on the drawing trajectory BK3, a blurring start point KP5 and a blurring end point KP6 on the drawing trajectory BK4, a blurring start point KP7 and a blurring end point KP8 on the drawing trajectory BK5 and a blurring start point KP9 and a blurring end point KP10 on the drawing trajectory BK6, and a second blurred area KS2 surrounded by a blurring start point KP11 and a blurring end point KP12 on the drawing trajectory BK4, a blurring start point KP13 and a blurring end point KP14 on the drawing trajectory BK5, a blurring start point KP15 and a blurring end point KP16 on the drawing trajectory BK6, a blurring start point KP17 and a blurring end point KP18 on the drawing trajectory BK7 and a blurring start point KP19 and a blurring end point KP20 on the drawing trajectory BK8.

If the figure length is set to 1, the lengths on the drawing trajectories BK2, BK3, BK4, BK5 and BK6 from the start point as far as the blurring start points KP1, KP3, KP5, KP7 and KP9 are 0.12, 0.31, 0.25, 0.14 and 0.20, respectively, while the lengths from the starting point as far as the blurring end points KP1, KP3, KP5, KP7 and KP9 are 0.51, 0.60, 0.69, 0.42 and 0.55, respectively. On the other hand, the lengths on the drawing trajectories BK4, BK5, BK6, BK7 and BK8 from the start point as far as the blurring start points KP11, KP13, KP15, KP17 and KP19 are 0.71, 0.84, 0.82, 0.78 and 0.73, respectively, while the lengths from the starting point as far as the blurring end points KP12, KP14, KP16, KP18 and KP20 are 0.92 0.93, 0.91, 0.95 and 0.94, respectively.

(4-1-3) Blurring Parameters

The blurring parameters are parameters for forming blurred area data, and are comprised of a parameter $c_1$ employed for setting the blurring starting length data for the blurred area data for specifying the blurring start position along the length of the figure, a parameter $c_2$ employed for setting the blurring end length data for the blurred area data for specifying the blurring end position along the length of the figure, a parameter $C_3$ specifying the upper end of the blurring along the width of the figure, a parameter $c_4$ specifying the lower end of the blurring along the width of the figure, a parameter $c_5$ specifying the extent of variations in the blurring start position along the length of the figure, a parameter $c_6$ specifying the extent of variations in the blurring end position along the length of the figure, and a parameter $c_7$ specifying the density of the blurring along the width of the figure. These parameters $c_1$ to $c_7$ specify the positions in the figure of the blurred area KS, as will be explained subsequently.

Figure 36:
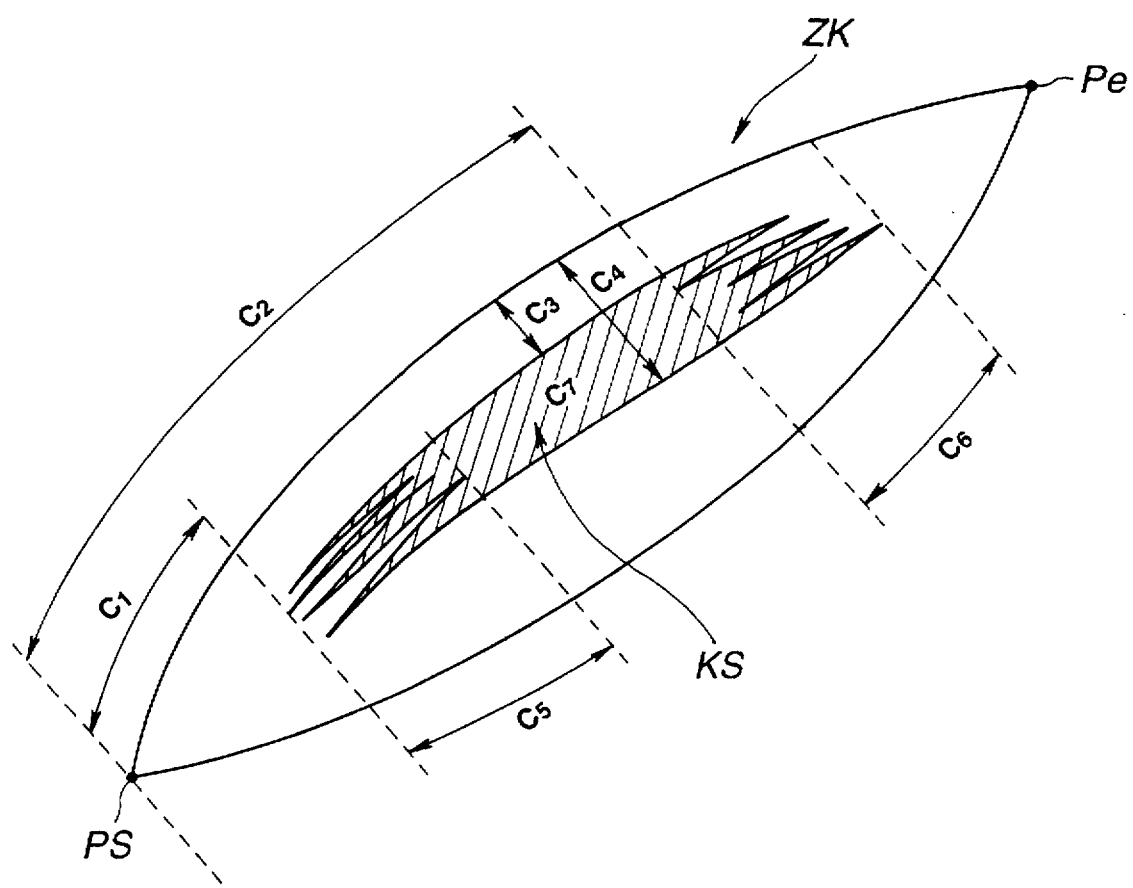
FIG. 36 illustrates the relation between the blurring parameters and the blurred area.
Figure 37:
FIG. 37 illustrates interrupted blurring.

For these parameters $c_1$ to $c_3$, specified values are set for specifying the positions of the blurred area KS in the figure ZK, as shown for example in FIG. 36.

That is, values of from 0 to 1, obtained on normalization with the figure length of 1 for representing the length from the start point ps as far as the blurring start position, are set for the parameter $c_1$, while values of from 0 to 1, obtained on normalization with the figure length of 1 for representing the length from the start point ps as far as the blurring end point, are set for the parameter $c_2$. The relation of the parameters $c_1$ and $c_2$ is naturally $c_1 \leq c_2$.

The parameters $c_1$, $c_2$ may be set in a different manner provided the blurring start position or the blurring end position may thereby be known. For example, the parameter $c_1$ may be set for representing the mean position of the blurring start positions KPS on the drawing trajectories BK while the parameter $c_2$ may be set for representing the mean position of the blurring end positions KPE on the drawing trajectories BK. The parameters $c_1$, $c_2$ may be of actual lengths instead of being normalized with the drawing length set to 1.

The parameters $c_3$, $c_4$ are set to values of from 0 to 1 corresponding to the numbers of the drawing trajectories BK delimiting the upper and lower ends of the blurring normalized by the number m of the drawing trajectories BK. That is, of the m drawing trajectories BK, the $(C_3 \times m)$'th drawing trajectory represents the upper end of the blurring area KS, while the $(C_4 \times M)$'th drawing trajectory BK represents the lower end of the blurring area KS. These parameters $c_3$, $c_4$ delimit the blurring range along the width of the figure ZK.

The values of these parameters $c_3$, $c_4$ are set so that $|c_3-c_4|$ will be larger and smaller for broader and narrower widths of the blurred area KS, respectively. If the blurred area KS is offset along the width of the figure ZK in one or the other direction, the values of the parameters $c_3$, $c_4$ are both set to values closer to 0 or 1.

The parameters $c_3$, $c_4$ may be set in a different manner provided the upper and lower positions along the width of the figure may thereby be known. For example, the parameters $c_3$ and $c_4$ may be set so as to be equal to the length from one contour of the figure ZK to the upper end of the blurred area and to the length from the other contour of the figure ZK to the lower end of the blurred area, respectively. Although the parameters $c_3$, $c_4$ are normalized with the number m of the drawing trajectories BK, the actual number of the drawing trajectories BK my naturally be employed without normalization.

The parameter $c_5$ is set to a value within a range of from 0 to $0.5\times(c_2-c_1)$ for specifying the extent of variations of the blurring start position, normalized with the figure length being set to 1. Similarly, the parameter $c_6$ is set to a value within a range of from 0 to $0.5\times(c_2-c_1)$ for specifying the extent of variations of the blurring end position, normalized with the figure length being set to 1.

The parameters $c_5$, $c_6$ may be set in a different manner provided variations in the blurring start position or the blurring end position may thereby be known. Although the parameters $c_5$, $c_6$ are normalized with the figure length being set to 1, the actual length may naturally be employed without normalization.

The parameter $c_7$ is set to a value within the range of from 0 to 1 representing the blurring density normalized so that the absence of the blurring in the range defined by the parameters $C_3$ and $c_4$ and the presence of the blurring in the entire range denote 0 and 1, respectively. If, for example, the parameter $c_7$ is 0.4 and the number of the drawing trajectories BK traversing the area defined by the parameters $c_3$, $c_4$ is k, the $(0.4\times k)$ drawing trajectories and the $((1-0.4)\times k)$ drawing trajectories among the drawing trajectories represent the blurred portion, that is the portion where there is no ink, and the non-blurred portion, that is portion where there is ink, respectively.

The parameter $c_7$ may be set in any different manner provided the blurring density along the figure width may thereby be known. For example, the parameter $c_7$ may be set to an actual number of the drawing trajectories BK present in the blurred portion.

It is noted that, when a figure is actually drawn with a writing brush on the paper, such blurring may be produced in which the extent of blurring is large, such that the amount of the ink present in the blurred portion is small. This sort of blurring is hereinafter referred to as intense blurring. In the case of the intense blurring, variations in the blurring start position and in the blurring end position tends to be diminished. Conversely, in the case of the blurring shown in FIG. 38, the extent of blurring is small, such that the amount of the ink present in the blurred portion is large. This sort of blurring is referred to hereinafter as linear blurring. In the case of the linear blurring, variations in the blurring start position and in the blurring end position tends to be increased.

Thus, for representing the intense blurring, a larger value on the order of 0.8 to 1.0 is set for the parameter $c_7$, while a smaller value on the order of 0.4 to 0.7 is set for the parameters $c_5$ and $c_6$. On the other hand, for representing the linear blurring, a smaller value on the order of 0.4 to 0.7 is set for the parameter $c_7$, while a larger value on the order of ⅙ to ⅛ is set for the parameters $c_5$ and $c_6$.

These blurring parameters are set from one blurred area to another, such that, if there are plural blurred areas, plural blurring parameters are set for coping with the respective blurred areas. Blurred area data are produced for coping with the respective blurred areas based upon the blurring parameters set from one blurred area to another.

(4-1-4) Shape Data

The shape data is data specifying the figure shape and is comprised of length data, width data, curvature data and curved point data, as shown for example in FIG. 39. The values of these data are calculated based upon the full contour data complemented so that the number of the coordinate points of the first contour data and the number of the coordinate points of the second contour data will be equal to each other.

The length data is the data specifying the length from the start point up to the end point of a figure and is comprised of a length L, as shown in FIG. 39. This length L is equivalent to the above-mentioned figure length. For this length L, a mean value of the length of the first contour found from the first contour data and the length of the second contour found from the second contour data is set. Specifically, the length of the first contour is a sum of the sequentially calculated values of the distances between neighboring coordinate points $A_j$ and $A_{j+1}$ of the first contour data, while the length of the second contour is a sum of the sequentially calculated values of the distances between neighboring coordinate points $B_j$ and $B_{j+1}$ of the second contour data. That is, if the X-coordinate and the Y-coordinate of a coordinate point $A_i$ are $X_{Ai}$ and $Y_{Ai}$, respectively, the X-coordinate and the Y-coordinate of a coordinate point $A_{i+1}$ are $X_{Ai+1}$ and $Y_{Ai+1}$, respectively, the X-coordinate and the Y-coordinate of a coordinate point $B_i$ are $X_{Bi}$ and $Y_{Bi}$, the X-coordinate and the Y-coordinate of a coordinate point $B_{i+1}$ are $X_{Bi+1}$ and $Y_{Bi+1}$, respectively, the length L is found from the equation (4-1): (4-1)

The width data is data specifying the figure width and is $$L = \frac{1}{2} \times \sum_{i=1}^{n-1} \sqrt{(X_{Ai} - X_{Ai+1})^2 + (Y_{Ai} - Y_{Ai+1})^2} + \sum_{i=0}^{n-1} \sqrt{(X_{Bi} - X_{Bi+1})^2 + (Y_{Ai} - Y_{Ai+1})^2}$$

comprised of w widths $W_i$ (i=1, 2, 3, . . . w) between the coordinate points $A_i$ and the coordinate points $B_i$, as set for each of the coordinate points of the first or second contour data, where w is the number of the first or second coordinate points, as shown in FIG. 39.

The curvature data is data specifying the bend of a figure and is comprised of w curvatures $r_i$ (i=1, 2, 3, . . . , w), as set for each coordinate point of the first or second contour data. Specifically, for finding the curvature $r_i$, a coordinate point $C_{i-1}$, of a mid point between the coordinate point $A_{i-1}$ and the coordinate point $B_{i-1}$, a coordinate point $C_i$ of a mid point between the coordinate point $A_i$ and the coordinate point $B_i$ and a coordinate point $C_{i+1}$ of a mid point between the coordinate point $A_{i+1}$ and the coordinate point $B_{i+1}$ are found, and an angle $\theta_i$ between a line interconnecting the coordinate point $C_{i-1}$ and the coordinate point $C_i$ and a line interconnecting the coordinate point $C_i$ and the coordinate point $C_{i+1}$ is calculated, this angle $\theta_i$ being a curvature $r_i$ for the coordinate point $A_i$ or the coordinate point $B_i$. The angular range possible for the curvature $r_i$ is from 0° to 180° and the smaller or the larger the angle, the larger and the smaller is the bend of the figure, respectively. It is noted that the curvature $r_1$ for the starting point $A_1$ or $B_1$ and the curvature $r_w$ for the end point $A_w$ or $B_w$ is pre-set to 180° for specifying the bend-free state.

The curved or bend point data is the data for bend points where the curvature $r_i$ indicates a bend exceeding a pre-set angle. The curved point data is made up of the bend point position r_p and the number of bend points r_n. The bend point position r_p specifies the number i of the curvature $r_i$ exceeding a pe-set value, such as 115°, while the number of bend points r n is the number of such curvatures $r_i$. It is also possible to set only the curved point position r_p as the curvature data and to find the number of curved points r_n from the number of set bend point positions r_p.

(4-1-5) Picture Data

Figures 40, 41, 42:
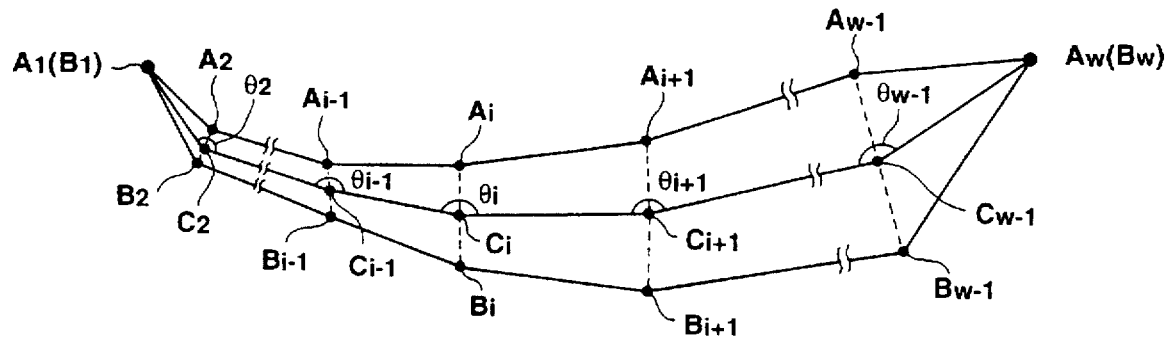
FIG. 40 illustrates the curvature $r_i$.
FIG. 41 is a diagrammatic view showing an example of a data structure of picture data.
FIG. 42 is a diagrammatic view showing an example of a data structure of writing brush data.

The picture data is data set from pixel to pixel for displaying a picture on the display device 5, as explained previously. The picture data for a given pixel is comprised of ink data specifying the state of the ink in the pixel and luminance data specifying the luminance of the pixel, as shown in FIG. 41. The ink data is comprised of ink/no ink data, specifying the presence or absence of the ink in the pixel, ink density data specifying the ink density in the pixel and the ink quantity data specifying the ink quantity in the pixel.

(4-1-6) Writing Brush Data

The writing brush data is data simulating a writing brush and is comprised of the ink quantity $IO_k$ (k=1, 2, 3, . . . . , m) and the ink density $ID_k$ (k=1, 2, 3, . . . . , m), with the ink quantity and ink density being set in association with m drawing trajectories, as shown in FIG. 42. Based upon the ink quantity $IQ_k$ and the ink density $ID_k$, the above-mentioned ink quantity data and the ink density data for the picture data are set, as will be explained subsequently.

(4-2) Construction of the Blurring Processor

An illustrative construction of the blurring processor 40 is explained.

Figure 43:
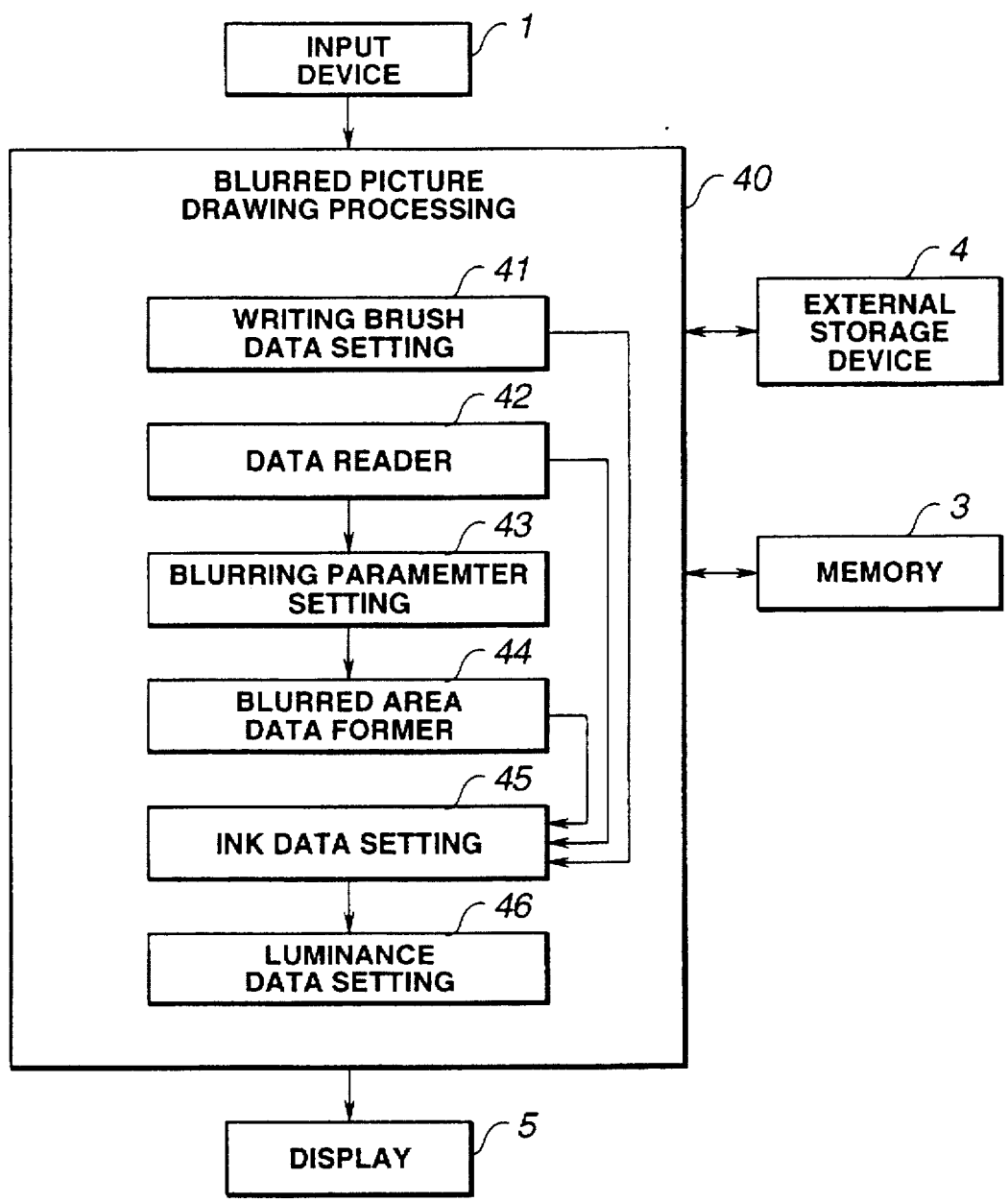
FIG. 43 is a block diagram showing an illustrative construction of a blurring processor.

Referring to FIG. 43, the blurring processor 40 includes a writing brush data setting unit 41 for setting writing brush data, and a data readout unit 42 for reading full-contour data, such as fonts, formed by the font forming processor 20, from the external storage device 4 or the memory 3. The blurring processor also includes a blurring parameter setting unit 43 for setting blurring parameters based upon the full contour data supplied from the data readout unit 42 and a blurred area data forming unit 44 for forming blurred area data based upon the blurring parameters set by the blurring parameter setting unit 43. The blurring processor similarly includes an ink data setting unit 45 for setting ink data in the pixels in a figure based upon the full contour data supplied from the data readout unit 42, writing brush data set in the writing brush data setting unit 41 and blurred area data formed by the blurred area data forming unit 44, and a luminance data setting unit 46 for setting luminance data in the pixel for which ink data has been set in the ink data setting unit 45.

The luminance data as set by the luminance data setting unit 46 is supplied to the display device 5 and the picture corresponding to the luminance data is displayed on the display device 5 for displaying a blurred figure on the display device 5.

(4-2-1) Writing Brush Data Setting Unit

Figure 44:
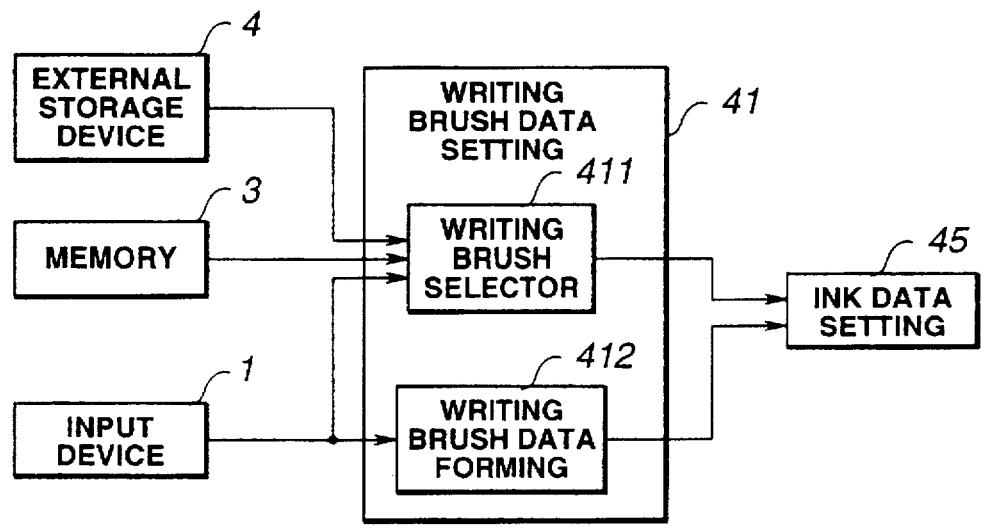
FIG. 44 is a block diagram showing an illustrative construction of the writing brush data.

The writing brush data setting unit 41 includes a writing brush selecting unit 411 for selecting writing brush data from plural pre-formed writing brush data, and a writing brush data forming unit 412 for forming writing brush data based upon input data from the input device 1, as shown for example in FIG. 44. The writing brush data selected by the writing brush data selecting unit 411 or the writing brush data formed by the writing brush data forming unit 412 is supplied to the ink data setting unit 45.

The writing brush selecting unit 411 reads out plural writing brush data from the memory 3 or the external storage device 4 and selects one of plural writing brush data responsive to a signal entered by the user responsive to the user actuation. Specifically, if illustrative figures to be drawn with the respective writing brushes are displayed on the display device 5, and the user selects writing brush data by selecting the desired illustrative figures, from among the plural illustrative figures displayed on the display device 5, with the aid of the input device, such as a mouse, the writing brush selecting unit 411 selects writing brush data based upon a signal from the input device 1 corresponding to the user actuation. The writing brush data selecting unit 411 transmits the selected writing brush data to the ink data setting unit 45. The result is that the writing brush data required for the desired figure drawing may be easily selected by the user.

Figure 45:
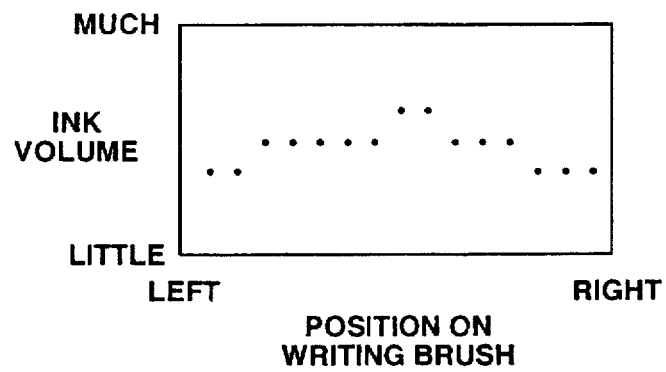
FIG. 45 illustrates the state of ink quantity inputs for several points on a writing brush.
Figure 46:
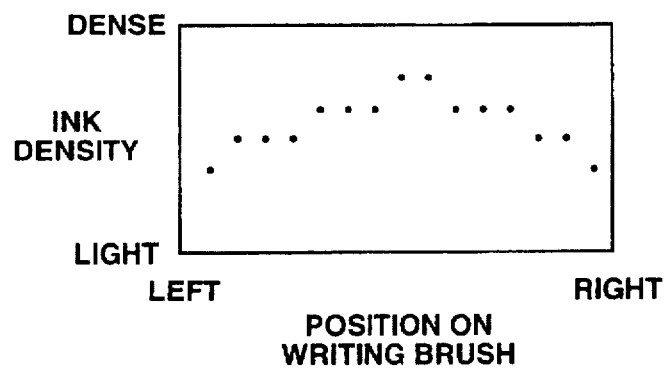
FIG. 46 illustrates the state of ink density inputs for several points on a writing brush.

The writing brush forming unit 412 forms writing brush data based upon input data from the input device 1. Specifically, the writing brush forming unit 412 calculates the ink quantity at each point on the writing brush based upon the ink quantity values for the respective points on the writing brush, as entered by the input device 1, as shown for example in FIG. 45. The writing brush forming unit 412 calculates the ink density at each point on the writing brush based upon the ink density values for the respective points on the writing brush, as shown for example in FIG. 46. Data entry by the input device 1 may be simplified in this manner by entering only the approximate distribution of the ink density or quantity contained in the writing brush and by forming new writing brush data at the writing brush input device.

For further simplification, it is also possible for the writing brush forming unit 412 to calculate the ink quantity at each point n the writing brush based upon the entire ink quantity in the writing brush as entered by the input device 1, as shown for example in FIG. 47. It is similarly possible for the writing brush forming unit 412 to calculate the ink density at each point on the writing brush based upon the entire ink density in the writing brush as entered by the input device 1, as shown for example in FIG. 48.

(4-2-2) Data readout Unit

Figure 49:
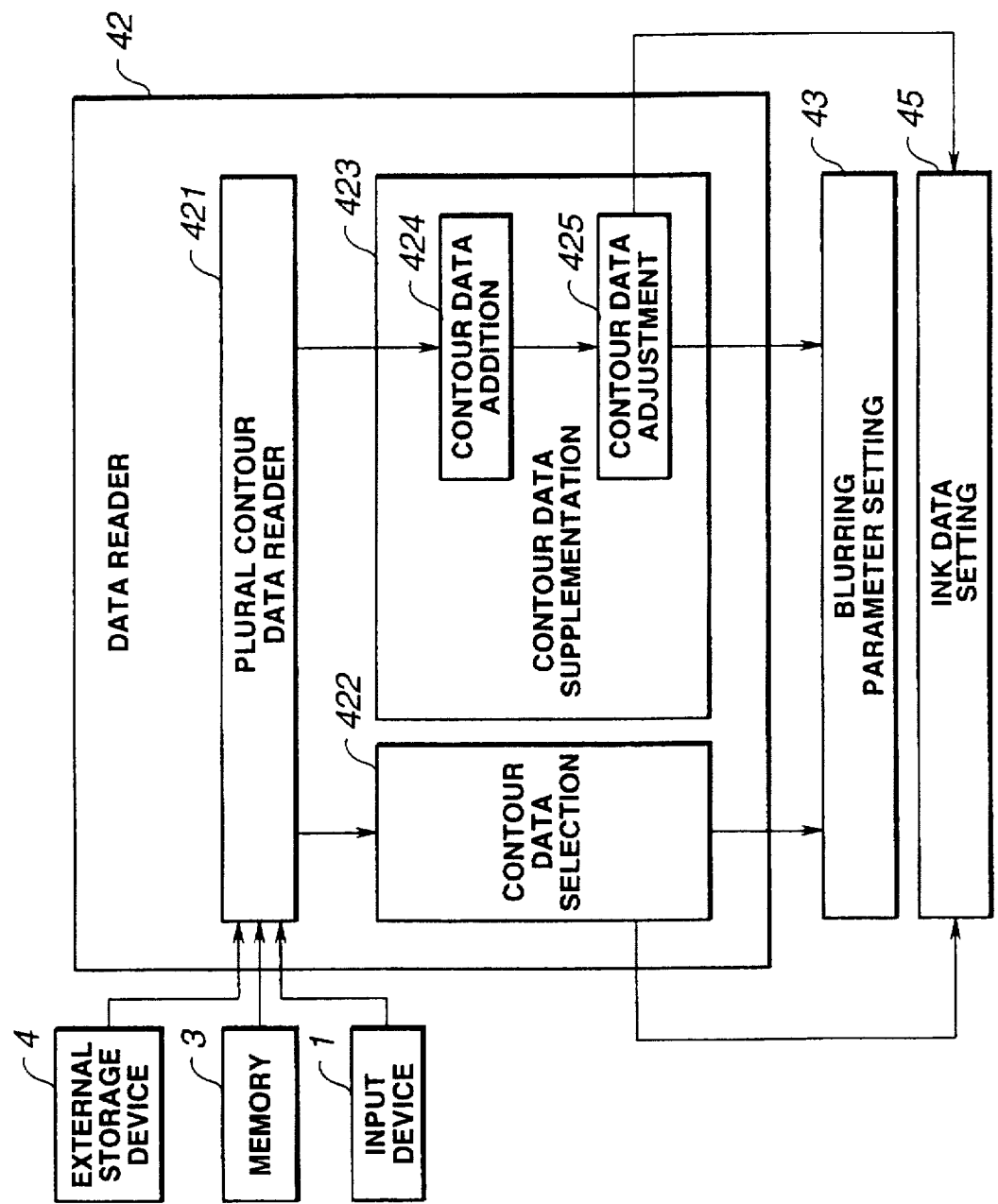
FIG. 49 is a block diagram showing an illustrative construction of a data reader.

The data readout unit 42 includes a plural contour data reading unit 421 for reading one or more full-contour data from the input device 1, memory 3 or the external storage device 4, a contour data selecting unit 422 for selecting the full-contour data corresponding to the blurred picture from the full-contour data from the plural contour data reading unit 421 in accordance with a pre-set rule, and a contour data complementing unit 423 for selecting one or more full-contour data supplied from the plural contour data reading unit 421, as shown for example in FIG. 49.

The plural contour data reading unit 421 reads one or more full-contour data from the input device 1, memory 3 or the external storage device 4. Specifically, one or more full-contour data representing a blurred character or symbol having at least one stroke, that is the font prepared by the above-mentioned font forming unit 20.

If one or more full-contour data read by the plural contour data reading unit 421 represents a character or a symbol, that is if the respective full-contour data correspond to the strokes constituting the character or the symbol, the contour data selecting unit 422 selects the full contour data corresponding to the blurred picture, from among the full-contour data, in accordance with the pre-set rule. The figure represented by the full contour data selected by the contour data selecting unit 422 is to be an object of the blurred picture, while the figure represented by the non-selected full contour data is not to be an object of the blurred picture. The contour data selecting unit 422 sends the into be ion as to which full-contour data is to be an object of the blurred picture to the blurring parameter setting unit 43 and to the ink data setting unit 45.

The reason is that, if a character is actually written on the paper with a writing brush, blurring is not necessarily produced in all of the strikes constituting the character such that a blurred stroke and a non-blurred stroke usually co-exist in the character. There exists a certain statistic rule between the burred stroke and the non-blurred stroke, as will be explained subsequently. The contour data selecting unit 422 selects the full-contour data constituting the object of the blurred picture in accordance with the pre-set rule.

Specifically, this pre-set rule states that the ratio of the number of the selected full contour data to the number of the entire full-contour data be not more than a pre-set value, such as one-third. That is, the contour data selecting unit 422 first selects, from all of the full-contour data supplied to the contour data selecting unit 422, the full contour data having the longest stroke represented by the full contour data. The contour data selecting unit 422 also selects, from among he full contour data excluding the full contour data directly before and after the previously selected longest full-contour data, the full-concur data having a longer stroke represented by the full-contour data. The contour data selecting unit 422 iterates he above operation until the number of the selected full contour data reaches one-third of the entire full-contour data. The pre-set rule may also be such a rule that full-contour data be selected from one or more full contour data supplied to the contour data selecting unit 422 so that the ratio of the selected full-contour data to the total number of the full-contour data is not more than the pre-set ratio, such as one-third, and only one full-contour data be selected at random from the remaining full-contour data.

By selecting the full-contour data as an object of the blurred picture from one or more of the full-contour data n accordance wit the pre-set rule and by drawing the character so that blurring is produced in the stroke represented by the selected full-contour data but is not produced in the stroke represented by the non-selected full-contour data, the character may be drawn to a more beautiful appearance.

However, if one or more full-contour data read by the plural full contour data reading unit 421 represents a figure other than the character or the symbol, the contour data selecting unit 422 selects all of the full-contour data read by the plural full contour data reading unit 421 as the full contour data which is to be the object of the blurred picture.

On the other hand, the contour data complementing unit 423 includes a contour data supplementation unit 424 for supplementing cordate points to the first contour data and the second contour data of the full contour data supplied from the plural contour data reading unit 421 and a contour data adjustment unit 425 for coinciding the number of the coordinate points of the first contour data and that of the coordinate points of the second contour data of the full contour data supplied from the plural contour data reading unit 421, as shown for example in FIG. 49.

The contour data complementing unit 423 supplements the coordinate points to the first contour data and the second contour data by the contour data supplementation unit 424 for producing new coordinate data having a smaller number between the coordinate points and further supplements coordinate points to the new full coordinate points by the contour data adjustment unit 425 for forming new full-contour data in which the number of the coordinate points of the first contour data is equal to that of the coordinate points of the second coordinate data.

Specifically, if the distance between the neighboring coordinate points $A_i$ and $A_{i+1}$ of the first contour data is larger than a pre-set value, the contour data supplementation unit 424 supplements coordinate points between the neighboring coordinate points $A_i$ and $A_{i+1}$ for forming new first contour data so that the distance between the neighboring coordinate points will be smaller than a pre-set value. On the other hand, if the distance between the neighboring coordinate points $B_i$ and $B_{i+1}$ of the second contour data is larger than a pre-set value, the contour data supplementation unit 424 supplements coordinate points between the neighboring coordinate points $B_i$ and $B_{i+1}$ for forming new second contour data so that the distance between the neighboring coordinate points will be smaller than a pre-set value. The pre-set value is selected so that the first and second contours represented by the new first and second contour data will appear smooth.

The contour data supplementation unit 424 supplements coordinate points so that the first contour produced on sequentially interconnecting the coordinate points $A_i$ and the second contour produced on sequentially interconnecting the coordinate points $B_j$ using the spline curve or the Bezier curve will become smooth. Specifically, the contour data supplementation unit 424 sets the direction of a tangential line at the coordinate point $A_1$ at the starting point as the direction proceeding from the coordinate point $A_1$ towards the coordinate point $A_2$ for setting a spline curve traversing the coordinate points $A_i$, and supplements the coordinate points on the spline curve to the first contour data. The contour data supplementation unit 424 also sets the direction of a tangential line at the coordinate point $B_1$ at the starting point as the direction proceeding from the coordinate point $B_1$ towards the coordinate point $B_2$ for setting a spline curve traversing the coordinate points $B_j$, and supplements the coordinate points on the spline curve to the second contour data.

By supplementing the coordinate points at the cordate data supplementation nit 424, the first and second contours become smooth thus enabling a figure to be drawn with more beautiful appearance.

The contour data supplementation unit 424 sends to the contour data adjustment unit 425 full-contour data in which the distance between the coordinate points becomes smaller than the pre-set value and the first and second contours have become smooth.

If, in the full-contour data supplied from the contour data supplementation unit 424, the number of the coordinate points of the first contour data and the number of the coordinate points of the second contour data are different from each other, the contour data adjustment unit 425 supplements the coordinate points to the first contour data or the second contour data so that the number of the coordinate points of the first and second contour data will become equal to each other, in order to from new first and second contour data.

Specifically, the contour data adjustment unit 425 selects two neighboring coordinate points having a broader distance between the coordinate points, beginning from one of the first and second contour data having the smaller number of the coordinate points. If the distances between the coordinate points are all the same, the contour data adjustment unit 425 selects two coordinate points at random. The contour data adjustment unit 425 supplements a coordinate point which is on a straight line, Bezier curve or on a spline curve interconnecting these two coordinate points and which is equally spaced apart from these coordinate points. This enables the coordinate point to be supplemented to render the first and second contours smooth and to reduce variations in the distance between the coordinate points.

Thus the contour data supplementation unit 423 supplements the new coordinate point to the full contour data supplied from the plural contour data reading unit 421 to form new full-contour data. The full-contour data supplementation unit 423 supplies the new full contour data to the blurring parameter setting unit 43 and to the ink data setting unit 45.

(4-2-3) Blurring parameter Setting Unit

Figures 50, 51:
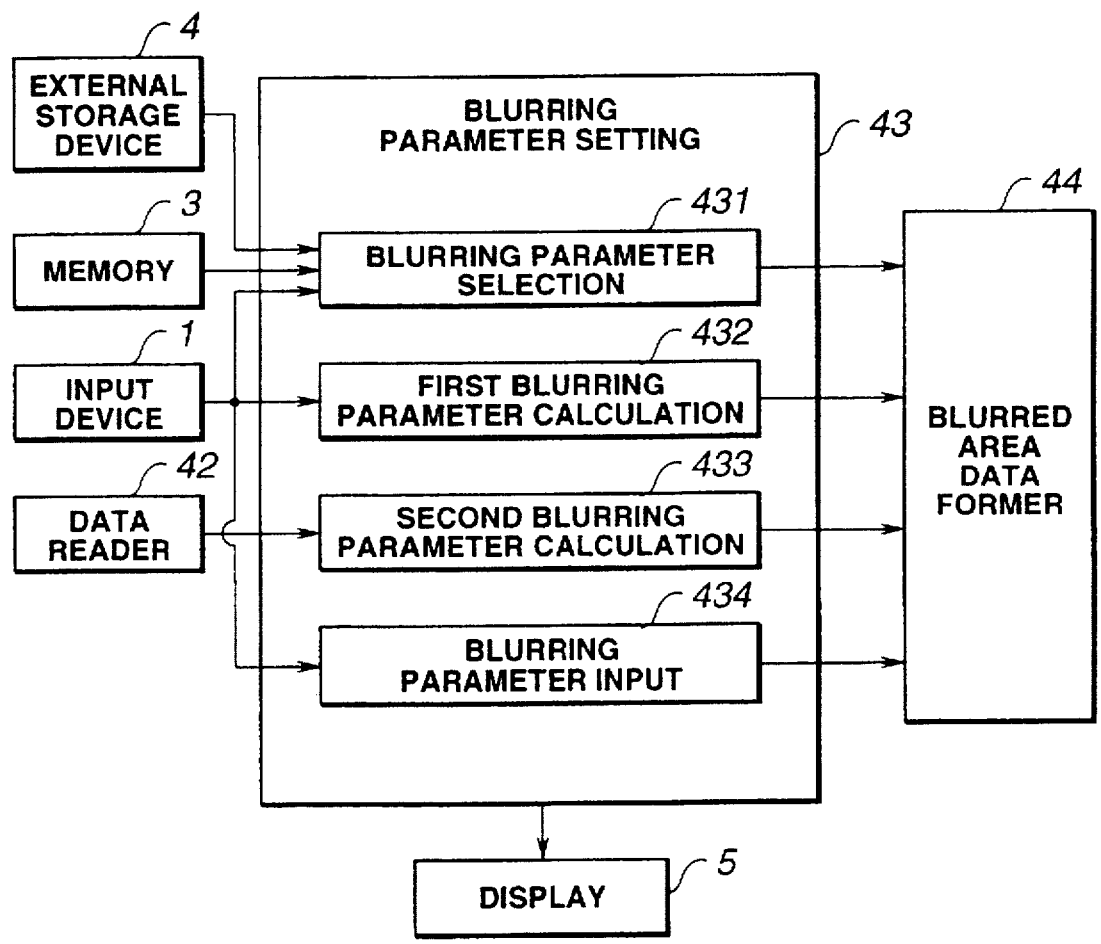
FIG. 50 is a block diagram showing an illustrative construction of a blurring parameter setting unit.
FIG. 51 illustrates an illustrative data structure of speed distribution data.

Referring to FIG. 50, the blurring parameter setting unit 43 includes a blurring parameter selecting unit 431 for reading plural pre-formed blurring parameters from the memory 3 or the external storage device 4 for selecting blurring parameters from the plural blurring parameters responsive to the signal from the input device 1 by user actuation, and a first blurring parameter calculating unit 432 for calculating blurring parameters based upon the writing brush carrying speed and writing brush pressure distribution entered from the input device 1 as the writing brush is carried for figure drawing from the starting point to the end point. The blurring parameter setting unit also includes a second blurring parameter calculating unit 433 for calculating the blurring parameters based upon the shape of the figure represented by the full contour data supplied from the data readout unit 42, and a blurring parameter input device 434 for forming the blurring parameters from the parameters $c_1$ to $c_7$ entered via the input device 1.

The blurring parameter selection nit 431 sends the selected blurring parameters to the blurred area data forming unit 44, while the first blurring parameter calculating unit 432 sends the calculated blurring parameters to the blurred area forming unit 44. The second blurring parameter calculating unit 432 sends the calculated blurring parameters to the blurred area forming unit 44. The blurring parameter input device 434 sends the formed blurring parameters to the blurred area forming unit 44.

The blurring parameter selecting unit 431 selects blurring parameters from the plural pre-formed blurring parameters having different combinations of the values of the parameters $c_1$ to $c_7$ supplied from the memory 3 or the external storage device 4. Specifically, typical blurring examples obtained using the blurring parameters are displayed on the display device 5. If the user selects, from the plural blurring examples displayed on the display device 5, the desired blurring example by the input device, such as a mouse, for thereby selecting the blurring parameters, the blurring parameter selection unit 431 selects the blurring parameters based upon the signal from the input device 1 responsive to the user actuation. The blurring parameter selection unit 431 sends the selected blurring parameters to the blurred area data forming unit 44. The result is that the user may easily select the blurring parameters required for drawing the desired figure.

The first blurring parameter calculating unit 432 calculates the parameters $c_1$ to $c_7$, based upon the speed distribution data and the writing brush distribution data entered from the input device 1, and sends the blurring parameters comprised of these parameters $c_1$ to $c_7$ to the blurred area data forming unit 44. The speed distribution data is the data specifying the distribution of the writing brush carrying speed during figure drawing from the beginning point to the terminal point, and is comprised of g speeds $v_i$ (i=1, 2, 3, ..., g) specifying the writing brush carrying speed at the respective g positions within the figure, as shown in FIG. 51. The writing brush distribution data is the data specifying the distribution of the writing brush pressure during figure drawing from the beginning point to the terminal point, and is comprised of g pressures $p_i$ (i=1, 2, 3, ..., g) specifying the writing brush pressure at the respective g positions within the figure, as shown in FIG. 51.

For the input device 1 for entering the speed distribution data and the writing brush pressure distribution data, a tablet is employed. That is, the user enters the pen movement speed with the tablet as the speed distribution data, while entering the pen pressure as the writing brush distribution data. This makes it possible to enter the speed distribution data and the writing brush distribution data more easily.

The second blurring parameter calculating unit 433 calculates the parameters $c_1$ to $c_7$, based upon the shape of the figure represented by the full-contour data supplied from the data readout unit 42 as later explained, and sends blurring parameters comprised of the parameters $c_1$ to $c_7$ to the blurred area data forming unit 44.

The blurred parameter input unit 434 directly sends the parameters $c_1$ to $c_7$ entered from the input device 1 as blurring parameters to the blurred area data forming unit 44.

The blurring parameter setting unit 43 decides, based upon the signal from the input device 1 responsive to the operation by the user, which of the blurring parameter selecting unit 431, first blurring parameter calculating unit 432, second blurring parameter calculating unit 433 and the blurring parameter input device 434 is to be used in setting the blurring parameters. If the user desires to set the blurring parameters while viewing the blurring manner, he or she selects the blurring parameter selecting unit 431. If the user desires to set the blurring parameters based upon the actual writing brush carrying speed or actual writing pressure, he or she selects the first blurring parameter calculating unit 432. If the user desires to set the blurring parameters for generating usual blurring, he or she selects the first blurring parameter calculating unit 432. Finally, if the user desires to set the blurring parameters freely, he or she selects the blurring parameter input device 434.

(4-2-4) Blurred Area Data Firming Unit

The blurred area data forming unit 44 forms the blurred area data based upon the blurring parameters supplied from the blurring parameter setting unit 43, as will be explained subsequently. The blurred area data forming unit 44 sends the formed blurred area data to the ink data setting unit 45.

(4-2-5) Ink data Setting Unit

Figure 52:
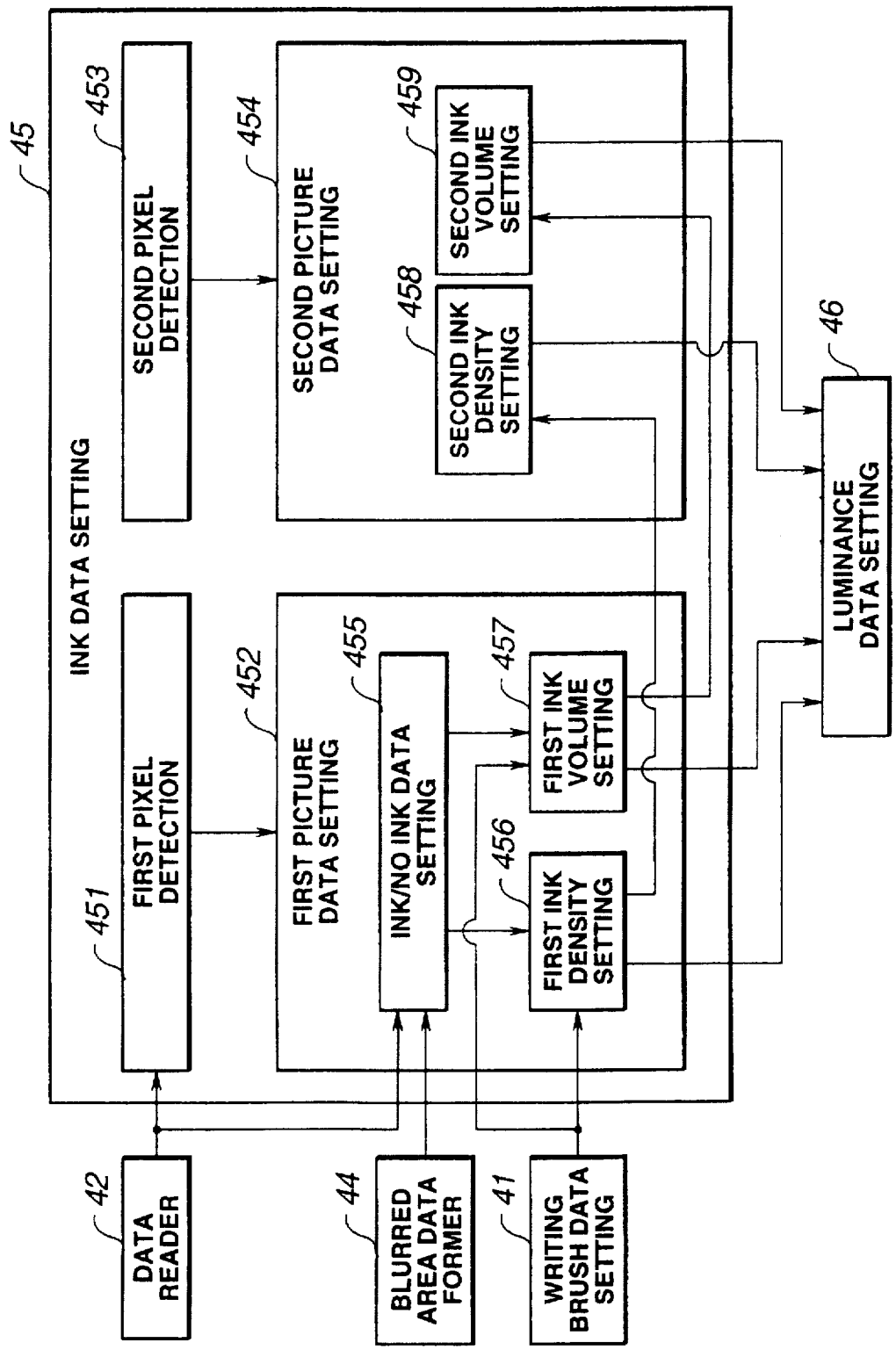
FIG. 52 is a block diagram showing an illustrative construction of an ink data setting unit.
Figure 53:
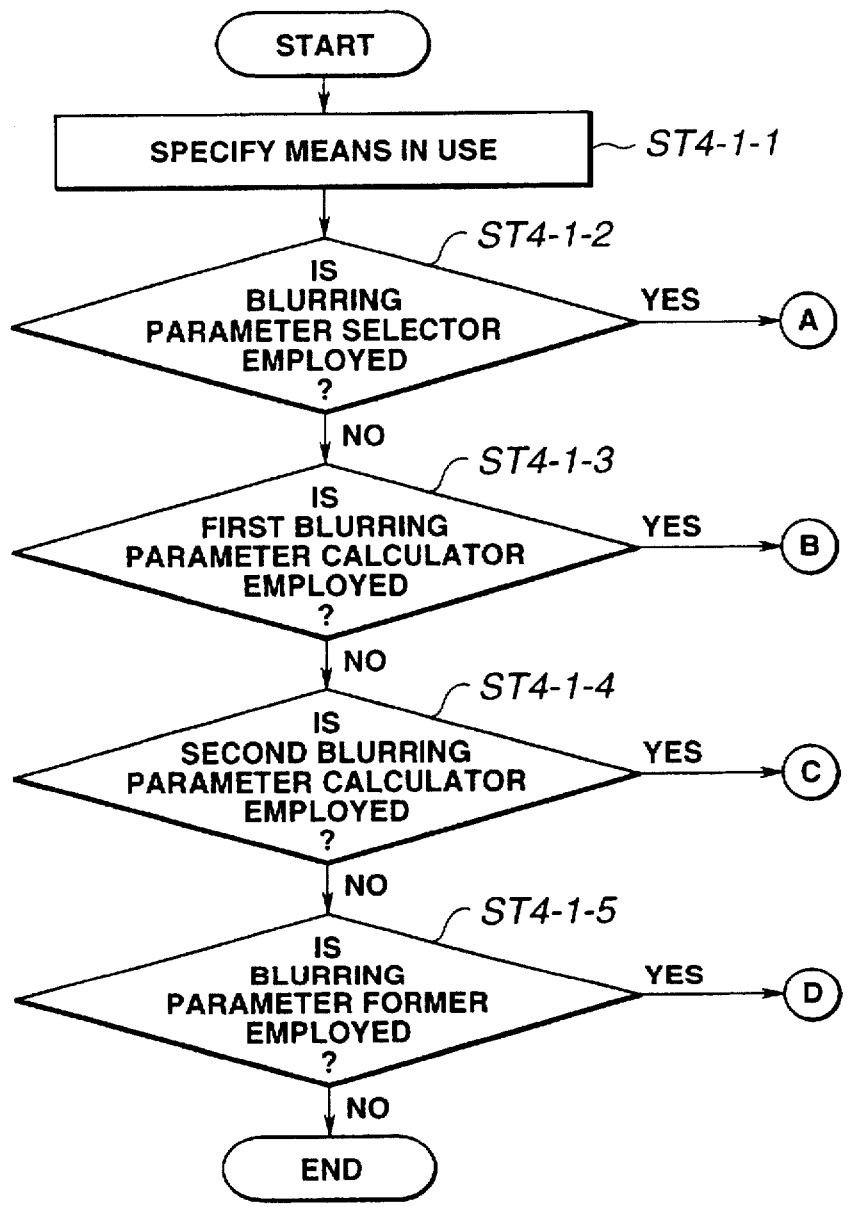
FIG. 53 is a flowchart for illustrating the operation of a blurring parameter setting unit.

Referring to FIG. 52, the ink data setting unit 45 includes a first pixel detection unit 451 for detecting the pixel based upon full contour data supplied from the data reading unit 42 and a first picture data setting unit 452 for setting picture data on the pixel detected by the first pixel setting unit 451. The ink data setting unit 45 also includes a second pixel detection unit 453 for detecting the pixel based upon the pixel detected by the first pixel detect ion unit 451 and a second picture data setting unit 454 for setting picture data on the pixel detected by the second pixel setting unit 451.

The first pixel detection unit 451 detects, based upon the full-contour data supplied from the data reading unit 42, the pixels on a line segment $l_i$ interconnecting the coordinate point $A_i$ of the first contour data and the coordinate point $B_i$ of the second contour data. One or plural pixels, usually plural pixels, are detected in this manner. The range of i is from 1 to w. The pixel detected for i=1 is that on the starting point, while that detected for i=w is that on the end point.

The first picture data setting unit 452 includes an ink/no ink setting unit 455, a first ink density setting unit 456 and a first ink quantity setting unit 457. The first picture data setting unit 452 sets ink data in the pixel detected by the first pixel detection unit 451 based upon the writing brush data supplied from the writing brush data setting unit 41, full-contour data supplied from the data reading unit 42 and the blurred area data supplied from the blurred area data forming unit 44 and sends the ink data to the second picture data setting unit 454 and the luminance data setting unit 46.

The ink/no ink data setting unit 455 judges, based upon the full-contour data and the blurred area data, whether or not the pixel detected by the first pixel detection unit 451 is within the blurred area KS. If the pixel is within the blurred area KS, the ink/no ink setting unit 455 sets the ink/no ink data for specifying the state of ink absence in the pixel. If the pixel is not within the blurred area KS, the ink/no ink setting unit 455 sets the ink/no ink data for specifying the state of ink presence in the pixel. If there are plural pixels detected by the first pixel detection unit 451, the ink/no ink setting unit 455 naturally judges whether or not the pixels are separately in the blurred area for setting the ink/no ink data.

If the blurring start length and the blurring end length indicated by the blurring start length data and by the blurring end length data of the blurred area data associated with the figure drawing trajectory traversing the pixel are denoted as Ks and Ke, respectively, and the figure length from the starting point as far as the line segment $l_i$ is $L_i$, the ink presence/ink absence data setting unit 455 judges the pixel as being within and outside the blurred area KS for Ks<Li<Ke and for $L_i \leq Ps$ or $Ke \leq L_i$, respectively. This judgment, however, is given for each blurred area KS if plural blurred area data are set. That is, if the pixel being judged is present in the blurred area KS represented by any of the blurred area data, the pixel is judged to be within the blurred area KS. Conversely, if the pixel being judged is present outside the blurred area KS represented by all of the blurred area data, the pixel is judged to be outside the blurred area KS.

On the other hand, the first ink density setting unit 456 sets ink density in the pixel detected by the first pixel detection unit 451, based upon writing brush data associated with the figure drawing trajectory traversing the pixel detected by the first pixel detection unit 451, so that the ink density will be higher the shorter the length of the figure from the starting point as far as the line segment $l_i$. The first ink density setting unit 456 sends the ink density data to the second picture data setting unit 454 and to the luminance data setting unit 46.

The first ink quantity setting unit 457 sets the ink density data in the pixel detected by the first pixel detection unit 451, based upon writing brush data associated with the figure drawing trajectory traversing the pixel detected by the first pixel detection unit 451, so that the ink quantity will be larger the shorter the length of the figure from the starting point as far as the line segment $l_i$. The first ink quantity setting unit 457 sends the ink quantity data to the second picture data setting unit 454 and to the luminance data setting unit 46.

However, if the ink presence/ink absence data is set for the pixel for specifying the ink absent data, the first ink density setting unit 456 sets the ink density data to 0, while the first ink quantity setting unit 457 sets the ink quantity data to 0. If there are plural pixels detected by the first pixel detection unit 451, the first ink density setting unit 456 and the first ink quantity setting unit 457 naturally calculate the ink density and the ink quantity on the pixel basis for setting the ink density data and the ink quantity data, respectively.

The second pixel detection unit 453 detects a pixel lying between the pixel on the line segment $l_i$, as detected by the first pixel detection unit 451, and a pixel on a line segment $l_{i+1}$ neighboring to the line segment $l_i$, as detected by the first pixel detecting unit 451. Usually, plural pixels are detected by the second pixel detection unit 453. If the pixel on the line segment $l_i$ and the pixel on the line segment $l_{i+1}$ neighboring to the line segment $l_i$ are adjacent to each other, zero pixels are detected by the second pixel detection nit 453.

The second picture data setting unit 454 includes a second ink density setting unit 458 for setting ink density data in the pixel detected by the second pixel detection unit 453 and a second ink quantity setting unit 459 for setting ink quantity data in the pixel detected by the second pixel detection unit 453.

The second ink density setting unit 458 calculates, based upon ink density data set in the pixel on the line segment $l_i$ supplied from the first picture data setting unit 452, distance between the pixel on the line segment $l_i$ and the pixel detected by the second pixel detection unit 453, ink density data set in the pixel on the line segment $l_{i+1}$ supplied from the first picture data setting unit 452, and the distance between the pixel on the line segment $l_{i+1}$ and the pixel detected by the second pixel detection unit 453, the ink density in the pixel detected by the second pixel detection unit 453, sets ink density data on the pixel detected by the second pixel detection unit 453 and sends the ink density data to the luminance data setting unit 46.

The second ink quantity setting unit 459 calculates, based upon ink quantity data set in the pixel on the line segment $l_1$ supplied from the first picture data setting unit 452, distance between the pixel on the line segment $l_i$ and the pixel detected by the second pixel detection unit 453, ink quantity data set in the pixel on the line segment $l_{i+1}$ supplied from the first picture data setting unit 452, and the distance between the pixel on the line segment $l_{i+1}$ and the pixel detected by the second pixel detection unit 453, the ink quantity in the pixel detected by the second pixel detection unit 453, sets ink quantity data on the pixel detected by the second pixel detection unit 453 and sends the ink quantity data to the luminance data setting unit 46.

(4-2-6) Luminance Data Setting Unit

The luminance data setting unit 46 calculates luminance in each pixel, based upon the paper fiber structure data formed by the above-described paper fiber structure data forming unit and picture data set in the first and second picture data setting units, and sets luminance data for each pixel.

The luminance data setting unit 46 calculates the luminance data for each pixel, based upon the numbers of fibers M represented by the paper fiber structure data and the ink density and ink quantity data set in the first picture data setting unit 452 and in the second picture data setting unit 454, as will be explained subsequently. However, for pixels for which the picture data has not been set in the first picture data setting unit 452 or in the second picture data setting unit 454, default data, such data specifying pure white or data specifying pure black, are set.

The luminance data setting unit 46 calculates luminance using only data of the numbers of fibers M, among data constituting the paper fiber structure data. Thus it suffices for the paper fiber structure data referred to here to have at least the numbers of fibers M, while it is unnecessary for the data to have e.g., the number of capillary tubes.

(4-3) Blurring Processing

An illustrative operation of the blurring processor 40 is explained.

If the blurring selection unit 431 or the first blurring parameter calculating unit 432 is used for setting blurring parameters, the blurring processor 40 performs blurring processing by the following steps (a) to (d):

(a) The step of setting writing brush data by the writing brush data setting unit 41;

(b) the step of setting the blurring parameters by the blurring parameter setting unit 43 using the blurring parameter selection unit 431 or the first blurring parameter calculating unit 432 and subsequently forming blurred area data by the blurred area data forming unit 44 based upon the blurring parameters set by the blurring parameter setting unit 43;

(c) reading one or more full-contour data by the data reading unit 42 from e.g., the input device 1, memory 3, external storage device 4 or the font forming processor 20 and selecting the full-contour data as an object of blurred drawing by the contour data selecting unit 422; and (d) setting ink data in pixels in a figure by the ink data setting unit 45 based upon the full-contour data supplied from the data reading unit 42, writing brush data set by the writing brush setting unit 41 and the blurred area data formed by the blurred area data forming unit 4 and subsequently setting luminance data in he pixels for which the ink data has been set by the ink data setting unit 45.

The steps (a) to (c) may be carried out in any sequence provided that these steps are carried out prior to the step (d).

If the second blurring parameter calculating unit 433 is used for setting the blurring parameters, the blurring processor 40 performs blurred drawing by the following steps (e) to (h):

(e) The step of setting writing brush data by the writing brush data setting unit 41;

(f) reading out one or more full-contour data from the input device 1, memory 3, external storage device 4 or the font forming processor 20 by the data readout unit 42 and selecting the full-contour data as the object of blurred drawing by the contour data selecting unit 422;

(g) setting blurring parameters by the blurring parameter setting unit 43, using the second blurring parameter calculating unit 43, based upon the full-contour data selected as the object of blurred drawing by the blurring data selecting unit 422 and subsequently forming blurred area data by the blurred area data forming unit 44 based upon the blurring parameters set by the blurred parameter setting unit 43; and (h) setting ink data in the pixels in the figure by the ink data setting unit 45 based upon the full-contour data supplied by the data reading unit 42, writing brush data set by the writing brush setting unit 41 and blurred area data formed by the blurred area data forming unit 44 and subsequently setting luminance data in the pixels in which the ink data has been set by the ink data setting unit 45.

The step (e) may be set at any stage provided it is performed before the step (h).

Of the blurring drawing processing steps, the setting of the blurring parameters by the blurring parameter setting unit 43, formation of the blurred area data by the blurred area data forming unit 44, selection of the full-contour data by the contour data selecting unit 422 and the setting of the ink data by the ink data setting unit 45, are explained in detail.

(4-3-1) Setting of Blurring Parameters by Blurring Parameter Setting Unit

Referring to the flowchart of FIGS. 53 to 57, the illustrative operation of the blurring parameter setting unit 43 is now explained.

At step ST-4-1-1, a command as to which of the blurring parameter selection unit 431, first blurring parameter calculating unit 432 or the second blurring parameter calculating unit 433 is to be employed is entered from the input device 1 to the blurring parameter setting unit 43.

Then, at steps ST4-1-2, ST4-1-3, ST4-1-4 and ST4-1-5, the blurring parameter setting unit 43 judges, based upon the command entered at step ST4-1-1, which of the blurring parameter selection unit 431, first blurring parameter calculating unit 432, second blurring parameter calculating unit 433 or the blurring parameter input device 434 is to be employed. If the blurring parameter selecting unit 431 is to be used, the blurring parameter setting unit 43 transfers to step STST4-1-21, whereas, if the first blurring parameter calculating unit 432 is to be used, the blurring parameter setting unit 43 transfers to step STST4-1-31. If the second blurring parameter calculating unit 433 is to be used, the blurring parameter setting unit 43 transfers to step STST4-1-41, whereas, if the blurring parameter input device 434 is to be used, the blurring parameter setting unit 43 transfers to step STST4-1-51.

Figure 54:
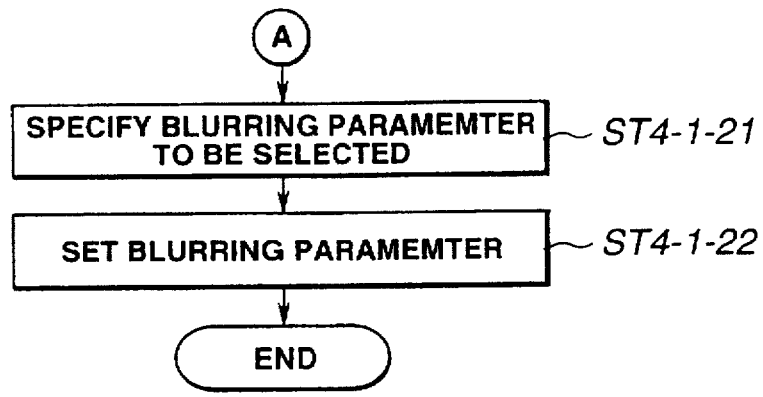
Figure 55:
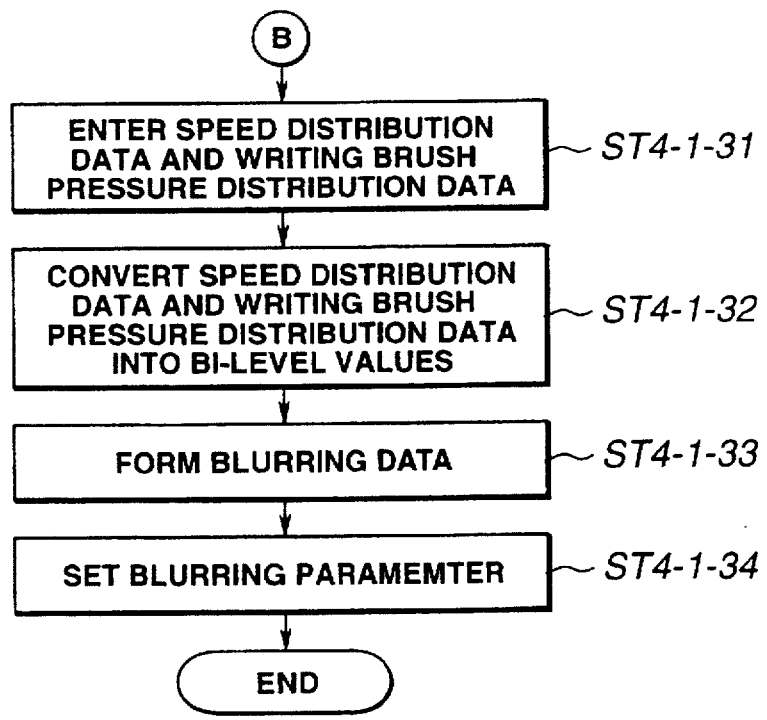

Referring to FIG. 54, at step ST4-1-21, to which the blurring parameter setting unit transfers if the blurring parameter is set using the blurring parameter selecting unit 431, a command on which of previously formed plural blurring parameters is to be used is entered from the input device 1 to the blurring parameter selecting unit 431. Specifically, by displaying examples of blurring produced with the use of each of the pre-formed plural blurring parameters on the display device 5, and by the user selecting a desired one of the blurring examples displayed on the display device 5 using the input device 1, such as a mouse, a command as to which of the blurring parameters is to be employed is entered to the blurring parameter selection unit 431. Thus the user is able to easily command the blurring parameter required for generating the desired blurring.

Then, at step ST4-1-22, the blurring parameter selecting unit 431 selects one of the previously formed plural blurring parameters, based upon the command entered at step ST4-1-21, and sets the selected blurring parameter to complete the processing.

At step ST4-1-31, to which the first blurring parameter calculating unit transfers if the blurring parameter is set using the first blurring parameter calculating unit 432, speed distribution data and writing brush pressure distribution data are entered from the input device, such as a tablet, to the first blurring parameter calculating unit 432. If, however, the tablet is used as the input device 1, input data tend to be fluctuated in an unexpected manner at the input time due to pen wobbling. Thus, if the speed distribution or writing brush pressure distribution be changed significantly within a short period, these changes are assumed to be ascribable to unexpected changes in the speed distribution or writing brush pressure distribution caused by pen wobbling at the input time and data correction is made based upon temporally previous or temporally subsequent speed distribution or writing brush distribution.

Then, at step ST4-1-32, the first blurring parameter calculating unit 432 converts the speed distribution data and the writing brush pressure distribution data entered at step ST4-1-31 into bi-level signals. The first blurring parameter calculating unit 432 then transfers to step ST4-1-33. That is, the first blurring parameter calculating unit 432 processes the speed distribution data so that the speeds $v_i$ ($i=1, 2, 3, \ldots, g$) at respective points in the writing brush carrying direction higher and not higher than a pre-set value, with the writing brush carrying speed being then higher and lower, respectively, are set to 1 and 0 respectively. Similarly, the first blurring parameter calculating unit 432 processes the writing brush pressure distribution data so that the writing brush pressures pi ($i=1, 2, 3, \ldots, g$) at respective points in the writing brush carrying direction higher and not higher than a pre-set value, with the writing brush pressure being then higher and lower, respectively, are set to 1 and 0, respectively.

Specifically, if fed with the speed distribution data and the writing brush distribution data yet to be converted into bi-level signals are entered from the input device 1, as shown for example in FIG. 58, the first blurring parameter calculating unit 432 sets the pre-set value to e.g., 0.5, and forms speed distribution data and the writing brush pressure distribution data in the bi-level form, as shown in FIG. 59. The speed distribution data and the writing brush distribution data shown in FIGS. 59 and 60 are simplified for explanation and, in effect, the data yet to be converted into bi-level signals are more abundant in the number of effective digits or in the overall data volume.

At step ST4-1-33, the first blurring parameter calculating unit 432 forms blurring brush-carrying data based upon the speed distribution data and the writing brush distribution data converted into the bi-level signals at step ST4-1-32. The first blurring parameter calculating unit 432 then transfers to step ST4-1-34.

Specifically, the first blurring parameter calculating unit 432 forms blurring brush-carrying data made up of g blurring data $t_i$ (i=1, 2, 3, . . . , g) specifying the state of blurring during brush carrying at respective g positions within the figure. The values of the blurring data $t_i$ at these g points are in a range of from 0 to 1. The stronger and the weaker the manner of blurring, the larger and the smaller is the value of the blurring data $t_i$, respectively.

That is, if the speed $v_i$ is 0 and the writing brush pressure $P_i$ is 0, the speed is low and the writing brush pressure is also low, so that blurring is assumed not to occur significantly, and hence the blurring data $t_i$ is set to a small value, such as 0.3. If the speed $v_i$ is 1 and the writing brush pressure $p_i$ is 0, the speed is high but the writing brush pressure is low, so that blurring is assumed to occur and hence the blurring data $t_i$ is set to the maximum value, that is 1. If the speed $v_i$ is 0 and the writing brush pressure $p_i$ is 1, the speed is low but the writing brush pressure is high, so that blurring is assumed not to occur and hence the blurring data $t_i$ is set to the minimum value, that is 0. If the speed $v_i$ is 1 and the writing brush pressure $p_i$ is 1, the speed is high and the writing brush pressure is also high, so that the blurring is assumed to occur to some extent and hence the blurring data $t_i$ is set to a larger value, such as 0.5.

As typical of the blurring bush-carrying data, the blurring brush-carrying data, formed based upon the speed distribution data and the writing brush pressure distribution data, shown in FIG. 59, are shown in FIG. 60.

At step ST-4-1-34, the first blurring parameter calculating unit 432 calculates the blurring parameters, based upon the blurring brush-carrying data formed at step ST4-1-33, and sets the calculated data as the blurring parameters, to terminate the processing.

At step ST4-1-41 in FIG. 56, to which the processing transfers when the blurring parameters are set using the second blurring parameter calculating unit 433, the second blurring parameter calculating unit 433 forms shape data representing the shape of a figure represented by the full-contour data supplied from the contour data reading unit 42. The second blurring parameter calculating unit 433 then transfers to step ST4-1-142.

At step ST4-1-42, the second blurring parameter calculating unit 433 calculates the blurring parameters, based upon the shape parameters formed at step ST4-1-41, and sets the calculated parameters as the blurring parameters, to terminate the processing.

At step ST4-1-51, shown in FIG. 57, to which the processing transfers when the blurring parameters are set using the blurring parameter input device 434, the parameters $c_1$ to $c_7$ are entered from e.g., the input device 1 to the blurring parameter input device 434.

Then, at step ST4-1-52, the blurring parameter forming unit directly sets the parameters $c_1$ to $c_7$ entered at step ST4-1-51 as the blurring parameters to terminate the processing.

If plural blurred areas are resent in a figure, that is if plural blurred area data are set, plural sets of the blurring parameters are set in association with the respective blurred area data.

(4-3-2) Formation of Blurred Area Data by Blurred Area Data Forming Unit

Figure 61:
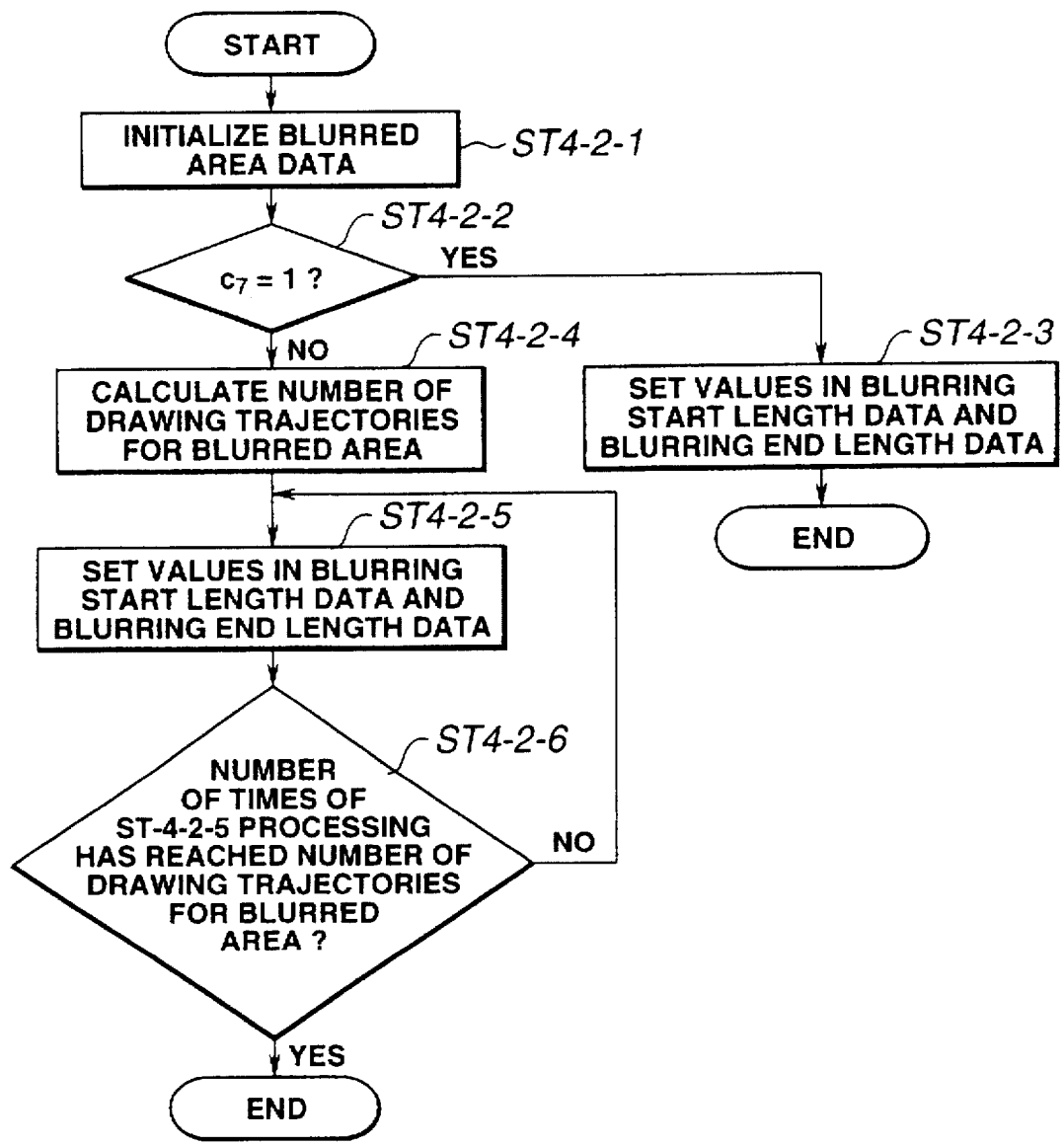
FIG. 61 is a flowchart for illustrating the operation of a blurred area data former.

An illustrative operation of the blurred area data forming unit 44 is explained by referring to the flowchart of FIG. 61.

At step ST4-2-1, the blurred area data forming unit 44 initializes the blurred area data and sets all blurring start length data and al blurring end length data to e.g., 1. The blurred area data forming unit 44 then transfers to step ST4-2-2.

At step ST4-2-2, blurred area data forming unit 44 refers to the value of the parameter $c_7$ and transfers to steps ST4-2-3 and ST4-2-4 if the value of the parameter $c_7$ is 1 (YES) and is not 1 (NO), respectively.

At step ST4-2-3, the blurred area data forming unit 44 sets values to the blurring start length data and the blurring end length data, associated with all drawing trajectories positioned within the width-wise range as set by the parameters $c_3$ and $c_4$. That is, if the value of $c_7$ is 1, the width-wise range of blurring defined by the parameters $c_3$ and $c_4$ represents the blurred area. The blurred area data forming unit 44 sets values on these blurring start and end length data to terminate the processing.

Specifically, the blurred area data forming unit 44 sets at random a value ranging from $c_1$ to $(c_1+c_5)$ as the blurring start length data, while setting at random a value ranging from $c_2$ to $(c_2+c_6)$ as the blurring end length data. Thus the blurring start length data and the blurring end length data, associated with the drawing trajectories located within the width-wise range of blurring as defined by the parameters $c_3$, $c_4$, are fluctuated within the range of from $c_1$ to $(c_1+c_5)$ and within the range of from $c_2$ to $(c_2+c_6)$, respectively.

At step ST4-2-4, the blurred area data forming unit 44 calculates how many of the drawing trajectories positioned within the width-wise blurring range as defined by the parameters $c_3$ and $c_4$ are associated with the blurred area. The blurred area data forming unit 44 then transfers to step ST4-2-5. That is, if the value of value of $c_7$ is not 1, all of the width-wise blurring range defined by the parameters $c_3$ and $c_4$ is not the blurred area. Specifically, the number n of the drawing trajectories associated with the blurred area is calculated as n=m×|$c_3$−$c_4$|×$c_7$, where m is the total number of the drawing trajectories.

At step ST4-2-5, the blurred area data forming unit 44 selects at random one of the drawing trajectories located within the width-wise blurring range defined by the parameters $c_3$ and $c_4$, and sets values in the blurring start length data and the blurring end length data associated with the drawing trajectories. The blurred area data forming unit 44 then transfers to step ST4-2-6.

Specifically, the blurred area data forming unit 44 sets at random a value ranging from $c_1$ to $(c_1+c_5)$ for the blurring start length data, while setting at random a value ranging from $c_2$ to $(c_2+c_6)$ for the blurring end length data. Thus the blurring start length data and the blurring end length data, associated with the drawing trajectories located within the width-wise range of blurring as defined by the parameters $c_3$, $c_4$, are fluctuated within the range of from $c_1$ to $(c_1+c_5)$ and within the range of from $c_2$ to $(c_2+c_6)$, respectively.

Meanwhile, if values other than initial values are set in the blurring start length data and the blurring end length data, associated with the selected drawing trajectories, that is if the processing corresponding to step ST4-2-5 is previously performed, the blurred area data forming unit 44 selects the next drawing trajectories, without updating the values of the blurring start length data and the blurring end length data associated with the pre-selected drawing trajectories.

At step ST4-2-6, the blurred area data forming unit 44 compares the number of times of the processing operations of the step ST4-2-5, that is the number of the blurring start length data and the blurring end length data, for which values other than the initial values have been set, to the number n of the drawing trajectories associated with the blurred area, calculated at step ST4-2-4. If the result is NO, that is if the number of times of processing at step ST4-2-5 is less than the number n of the drawing trajectories calculated at step ST4-2-4, the blurred area data forming unit 44 reverts to step ST4-2-5 to repeat the processing. If the result is YES, that is if the number of times of processing at step ST4-2-5 has reached the number n of the drawing trajectories calculated at step ST4-2-4, the processing comes to a close.

If there are plural blurred areas, that is if plural blurring parameters are set, plural blurred area data are set in association with the respective blurring parameters.

(4-3-3) Selection of Full-Contour Data by Contour Data Selection Unit

Figure 62:
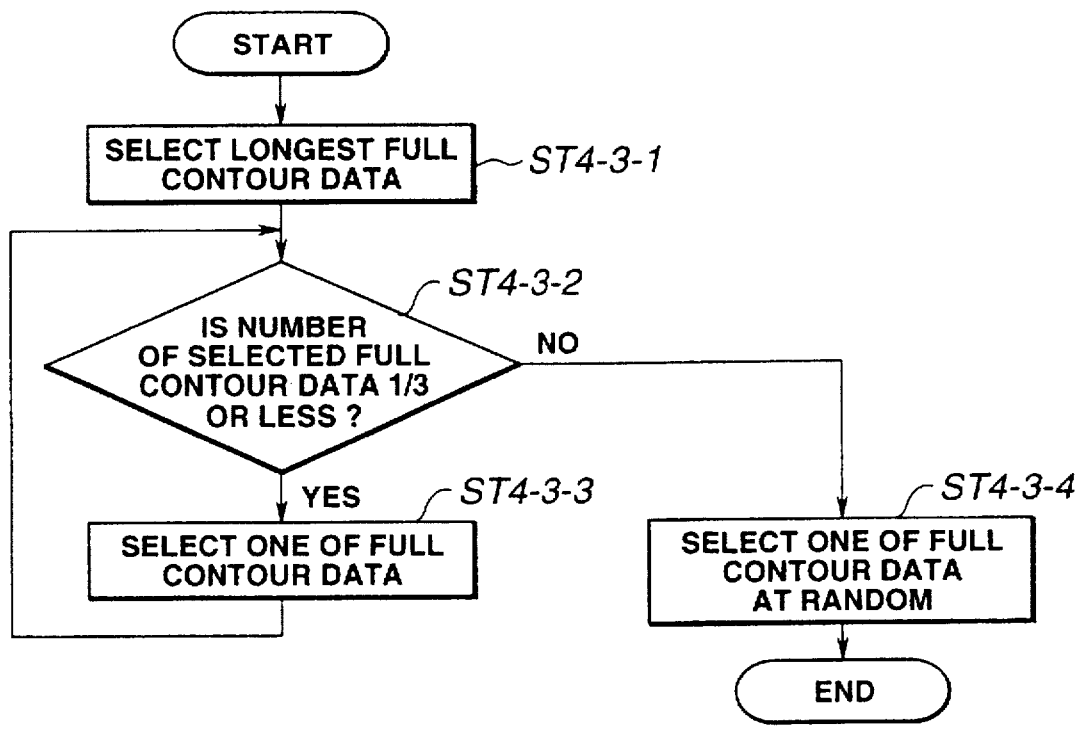
FIG. 62 is a flow chart for illustrating the operation of a contour data selector.

The illustrative operation of the contour data selecting unit 422 is explained by referring to the flowchart of FIG. 62.

At step ST4-3-1, the contour data selection unit 422 selects from all full-contour data the full-contour data having the longest length of the figure represented by the full-contour data. The contour data selection unit 422 then transfers to step ST4-3-2.

At step ST4-3-2, the full-length data selecting unit 422 judges the number of the selected full-contour data with respect to the number of all full-contour. If the number of the selected full-contour data is not more than one-third (YES), the full-length data selecting unit 422 transfers to step ST4-3-3. If the number of the selected full-contour data exceeds one-third (NO), the full-length data selecting unit 422 transfers to step ST4-3-4.

At step ST4-3-3, the full-length data selecting unit 422 selects one non-selected full-contour data, from among the full-contour data excluding the full-contour data directly before and after the full-contour data selected at step ST4-3-1, which has the longest length of the figure represented by the full-contour data. The full-length data selecting unit 422 then reverts to step ST4-3-2 to repeat the processing.

On the other hand, the full-length data selecting unit 422 selects at random one full-contour data, from among the non-selected full-contour data, to terminate the processing.

(4-3-4) Setting of Ink Data by Ink Data Setting Unit

Figure 63:
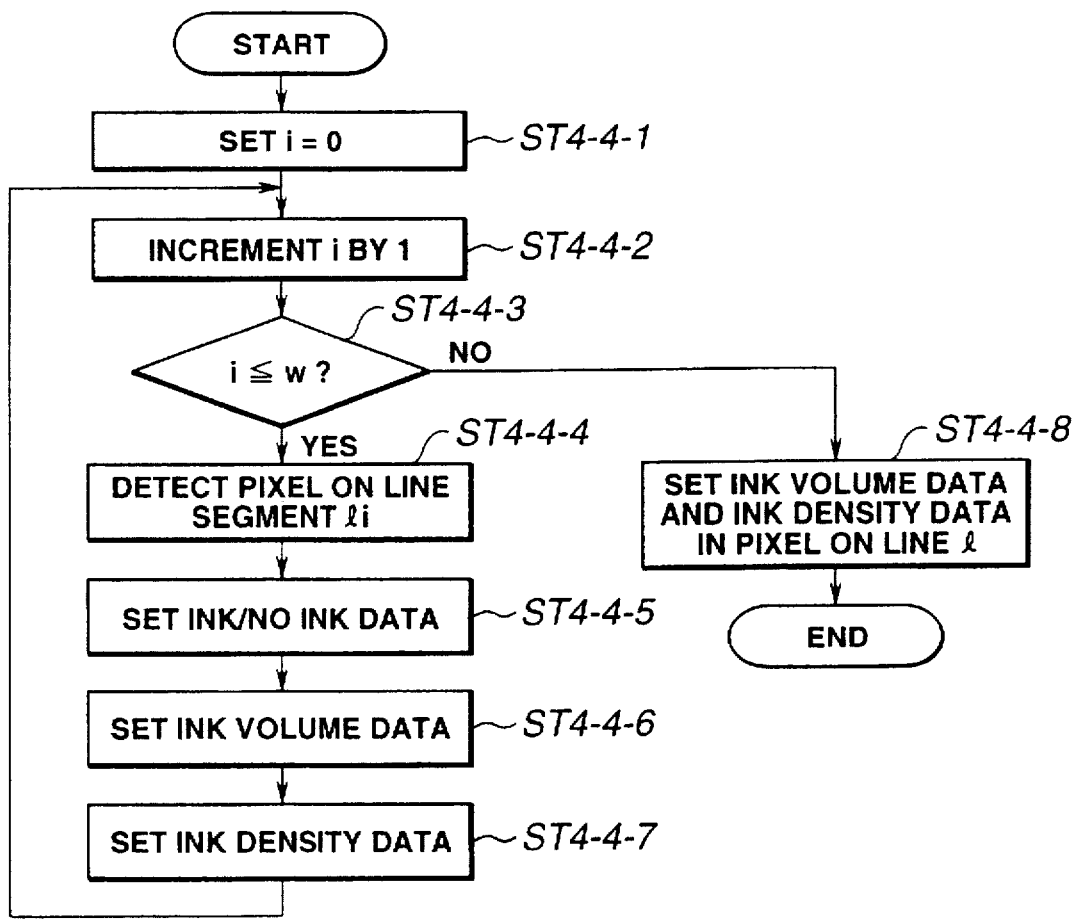
FIG. 63 is a flow chart for illustrating the operation of an ink data setting unit.

The illustrative operation of the ink data setting unit 45 is explained by referring to the flowchart of FIG. 63.

At step ST4-4-1, the first pixel detection unit 451 sets the value of the number i of times of processing flag to 0, before transferring to step ST4-4-2.

At step ST4-4-2, the first pixel detection unit 451 increments the value of the number i of times of processing flag by 1, before transferring to step ST4-4-3.

At step ST4-4-3, the first pixel detection unit 451 compares the number w of the coordinate points of the first or second contour data to the value i of the number of times of processing flag. If $i \leq w$ (YES), the processing transfers to step ST4-4-4. If $i > w$ (NO), the processing transfers to step ST4-4-8.

At step ST4-4-4, the first pixel detection unit 451 detects the pixels on a line segment $l_i$ interconnecting the coordinate point $A_i$ of the first contour data and the coordinate point $B_i$ of the second contour data, where i denotes the value of the number of times of processing flag i.

Then, at step ST4-4-5, the ink presence/ink absence setting unit 455 refers to blurred area data in order to judge whether or not the pixel detected at step ST4-4-4 is within the blurred area. If the pixel is found to be within the blurred area, the ink presence/ink absence data is set for indicating the state of ink absence in the pixel. If the pixel is not found to be within the blurred area, the ink presence/ink absence data is set for indicating the state of ink presence in the pixel.

If there exist plural blurred areas, that is if there exist plural sets of the blurred area data, the ink presence/ink absence setting unit 455 judges, based upon all of the blurred area data sets, whether or not the pixel detected at step ST4-4-4 is within the blurred area.

Then, at step ST4-4-6, the first ink quantity setting unit 457 refers to writing brush data for setting ink quantity data in the pixel detected at step ST4-4-4 so that the shorter the length of the figure from the beginning point as far as the line segment $l_i$, the more becomes the ink quantity. However, if the ink presence/ink absence data specifying the state of ink absence in the pixel is set at step ST4-4-5, the first ink quantity setting unit 457 sets the ink quantity data to 0.

Then, at step ST4-4-7, the first ink density setting unit 456 refers to writing brush data for setting ink density data in the pixel detected at step ST4-4-4 so that the shorter the length of the figure from the beginning point as far as the line segment $l_i$, the higher becomes the ink density. If, however, the ink presence/ink absence data is set at step ST4-4-5 for specifying the state of ink depletion in the pixel, the first ink density setting unit 456 sets the ink density data of the pixel to 0. After end of the step ST4-4-7, processing reverts to step ST4-4-2 to repeat the processing.

However, if there are plural pixels detected at step ST4-4-4, the ink presence/ink absence data, ink density data and the ink quantity data are set from pixel to pixel at steps ST4-4-5 to ST4-5-7.

On the other hand, the second pixel detection unit 453 detects, at step ST4-4-8, a pixel on a line segment l interconnecting the pixel on the line segment $l_i$ for which the ink data has been set at steps ST4-4-5 to ST4-4-7 and the pixel on the line segment $l_{i+1}$ for which the ink data has been set at steps ST4-4-5 to ST4-4-7. The second picture data setting unit 454 calculates the ink density and the ink quantity in the detected pixels, based upon the ink data set on the pixel on the line segment $l_i$, ink data set on the pixel on the line segment $l_{i+1}$, distance between the detected pixel and the pixel on the line segment $l_i$ and the distance between the detected pixel and the pixel on the line segment $l_{i+1}$, for setting the ink density data and the ink quantity data on the detected pixels. After setting the ink density data and the ink quantity data in all pixels on the line segment l, the second pixel data setting unit 454 terminates the processing.

Since plural pixels on the line segment l are usually detected, the second pixel data setting unit 454 calculates the ink density and the ink quantity for each detected pixel for setting the ink density data and the ink quantity data.

If there are plural pixels on the line segment $l_i$ or on the line segment $l_{+1i}$, the second pixel detection unit 453 sets plural line segments i interconnecting the pixels on the line segment $l_i$ and the pixels on the line segment $l_{i+1}$, so that these line segments extend along the contour of the figure, from pixel to pixel, and detects pixels on the line segment l for each of these line segments l. If the number of the pixels on the line segment $l_i$ differs from that of the pixels on the line segment $l_{i+1}$, the line segments are set so that the position of the pixels on the line segment $l_i$ along the width of the figure corresponds to that of the pixels on the line segment $l_{i+1}$ along the width of the figure.

The above explanation has been made for the case of setting full-contour data representing an object of the blurred drawing, that is full-contour data selected as an object of blurred drawing by the contour data selecting unit 422. If ink data is to be set for the full-contour data not representing the object of blurred drawing, that is the full-contour data not selected by the blurred data selecting unit 422 as the object of blurred drawing, the ink data setting unit 45 disregards the ink presence/ink absence data, or assumes the ink presence/ink absence data to be ink presence data, in setting the ink density data and the ink quantity data.

(4-4) Method for Setting Data Values

Next, illustrative values of various data set in the blurred picture processor 40 are explained.

(4-4-1) Setting of Blurring Parameters by First Blurring Parameter Calculating Unit The first blurring parameter calculating unit 432 sets two sets of blurring parameters. The reason the two sets of the blurring parameters are set is that two blurred portions are produced at most per stroke when a character is actually written with the writing brush on the paper, so that it suffices to set two blurred areas for representing a blurred character. However, the number of sets of the blurred parameters is not limited to two and may naturally be varied depending upon the figure to be produced.

Figure 64:
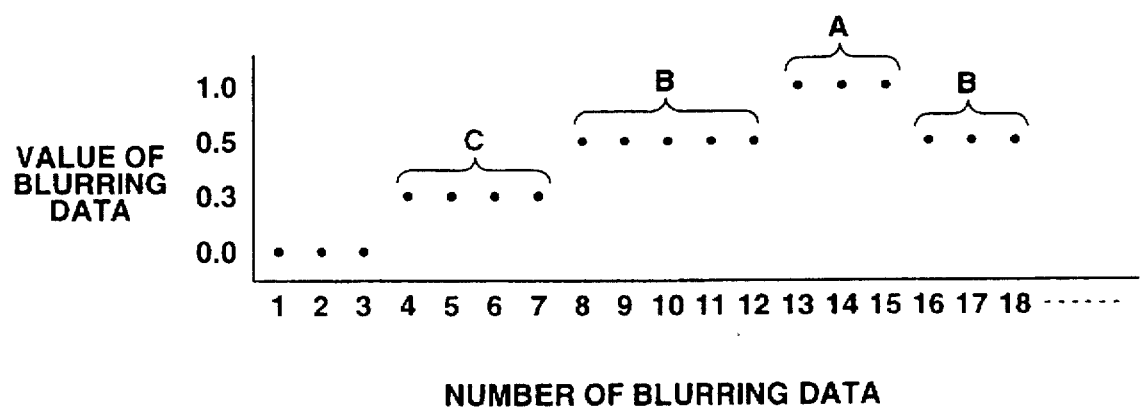
FIG. 64 illustrates an example of an area of $t_i=1.0$, 0.5 or 0.3.

In the description to follow, the portion of the blurring data $t_i$ of the blurring writing brush carrying data in which the value of $t_i$ is continuously "1" as shown at A in FIG. 64 is termed "an area with $t_i=1.0$". Similarly, the portion of the blurring data $t_i$ in which the value of $t_i$ is continuously "0.5" as shown at B in FIG. 64 is termed "an area with $t_i=0.5$", while the portion of the blurring data $t_i$ in which the value of $t_i$ is continuously "0.3" as shown at C in FIG. 64 is termed "an area with $t_i=0.3$".

Figure 65:
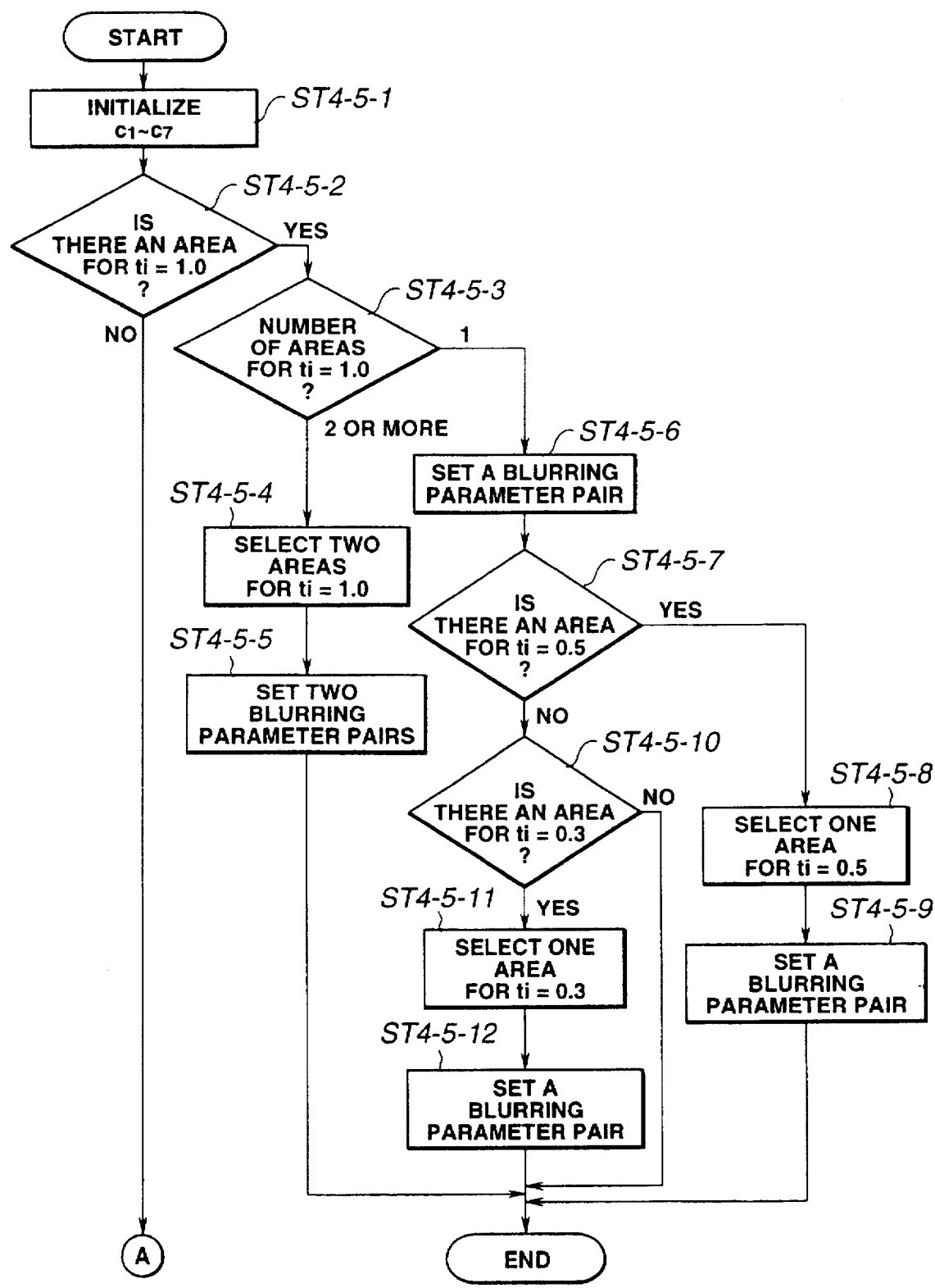
FIG. 65 is a flowchart for illustrating the operation of a first blurring parameter calculating unit.
Figure 66:
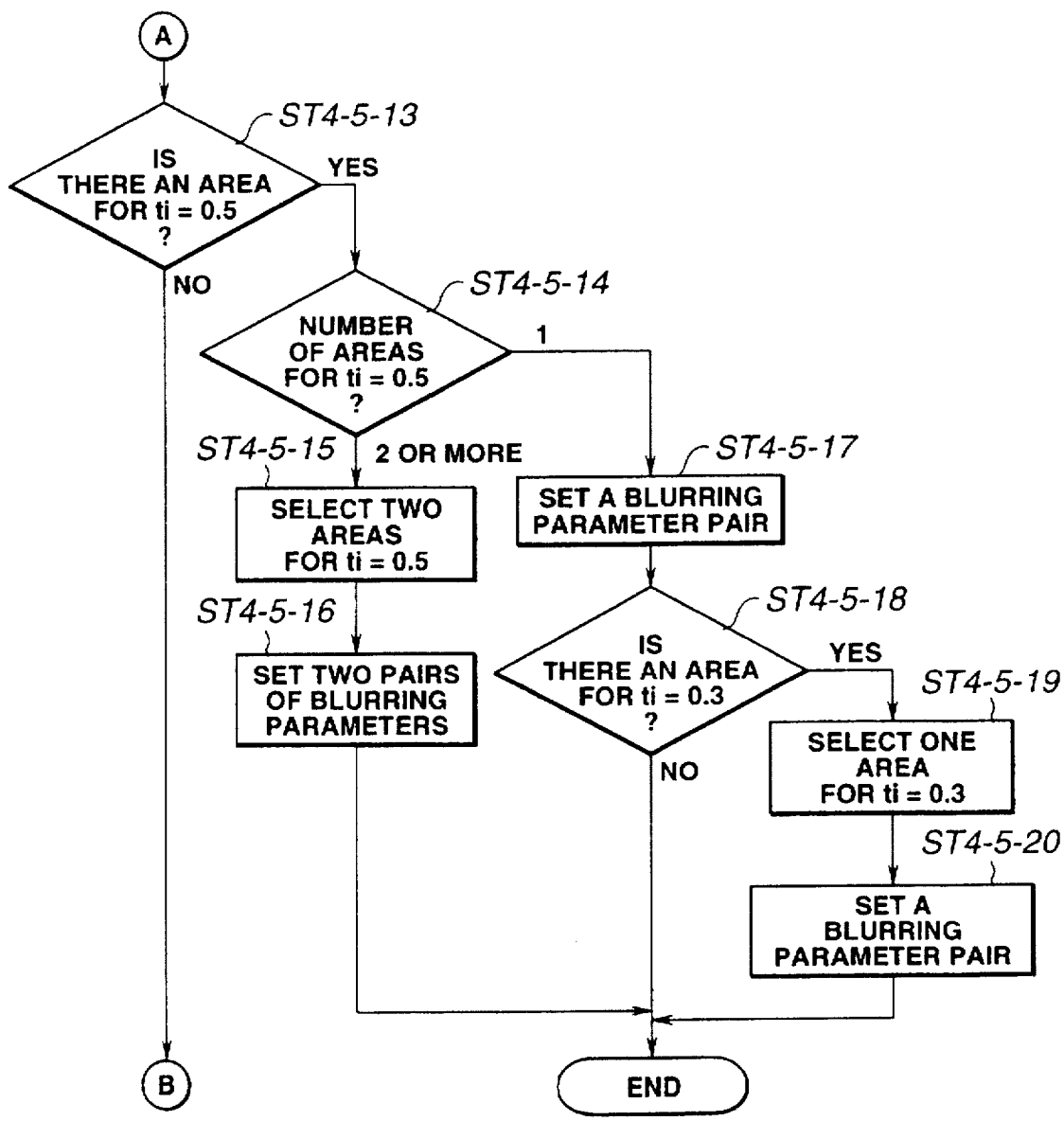
FIG. 66 is a flowchart showing the continuation of the flow chart of FIG. 65.
Figure 67:
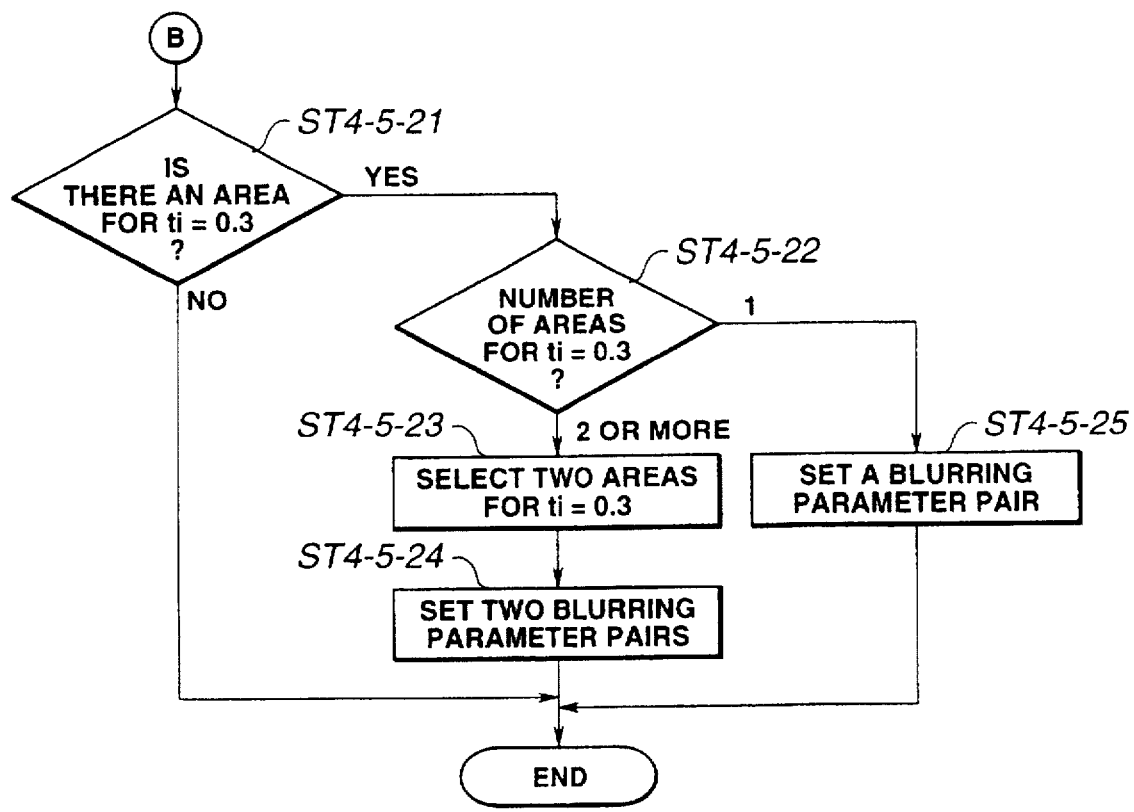
FIG. 67 is a flowchart showing the continuation of the flow chart of FIG. 66.

The first blurring parameter calculating unit 432 operates in accordance with the flowchart shown in FIGS. 65 to 67 for setting the blurring parameters based upon the blurring brush-carrying data.

At step ST4-5-1, the first blurring parameter calculating unit 432 initializes two sets of blurring parameters before transferring to step ST4-5-2. Specifically, the parameters $c_1$ to $c_7$ are all set to 0.

At step ST4-5-2, the first blurring parameter calculating unit 432 extracts the area with $t_i=1.0$. If there exists one or more of the area with $t_i=1.0$ (YES), the first blurring parameter calculating unit 432 transfers to step ST4-5-3. If there exists no area with $t_i=1.0$ (NO), the first blurring parameter calculating unit 432 transfers to step ST4-5-13.

At step ST4-5-3, the first blurring parameter calculating unit 432 extracts the area with $t_1=1.0$. If there exist two or more of the area with $t_i=1.0$ (YES), the first blurring parameter calculating unit 432 transfers to step ST4-5-4. If only one such area exists, the first blurring parameter calculating unit 432 transfers to step ST4-5-6.

At step ST4-5-4, the first blurring parameter calculating unit 432 selects two areas with $t_i=1.0$ and transfers to step ST4-5-5. Two of these areas with $t_i=1.0$ are selected in the order of the decreasing length of the area with $t_i=1.0$, that is in the decreasing order of the number of $t_i$ in the area with $t_i=1.0$.

At step ST4-5-5, the first blurring parameter calculating unit 432 sets two sets of blurring parameters in association with the two areas with $t_i=1.0$, selected at step ST4-5-4, in accordance with the equation (4-2), to terminate the processing.

$$c_1 = T_{is} - |T_{i-1}| \times T_{i-1}$$

$$c_2 = T_{ie} + |T_{i+1}| \times T_{i+1}$$

$$|c_3 - c_4| = \frac{1}{2}$$

$$c_5 = e + |T_{i+1}| \times (1 - T_{i+1})$$

$$c_6 = e + |T_{i-1}| \times (1 - T_{i-1})$$

$$c_7 = 1 - 0.08 \times (c_2 - c_1) \quad (4-2)$$

In the above equation, $T_i$ stands for the value of $t_i$ in an area as an object of setting of the blurring parameters, that is 1.0, 0.5 and 0.3 for the areas with $t_i=1.0$, $t_i=0.5$ and with $t_i=0.3$, respectively, and $|T_i|$ stands for the length of the area. The length of the area is normalized with the figure length being set to 1 and hence assumes the value of from 0 to 1. The same holds for the length of the figure, as explained subsequently.

On the other hand, $T_{i-1}$ specifies the value of $t_i$ in an area with $t_i=0.5$ or 0.3 neighboring to one side of the area for which the blurring parameters are set, while $|T_{i-1}|$ denotes the length of the area. Similarly, $T_{i+1}$ specifies the value of $t_i$ in an area with $t_i=0.5$ or 0.3 neighboring to the other side of the area for which the blurring parameters are set, while $|T_{i+1}|$ denotes the length of the area.

$T_{is}$ stands for the length of the figure from the beginning point of the figure as far as the starting point of the areas with $t_i=1.0$, 0.5 or 0.3 selected for setting the blurring parameters, while $T_{ie}$ stands for the length of the figure from the beginning point of the figure as far as the end point of the areas with $t_i=1.0$, 0.5 or 0.3 selected for setting the blurring parameters.

In the above equation, e is a coefficient representing an initial value of the fluctuations of the blurring start position and the blurring end position along the length of the figure, and is pre-set to a value on the order of 1/20.

At step ST4-5-6, the first blurring parameter calculating unit 432 sets a set of blurring parameters, in association with the area with $t_i=1.0$, in accordance with the equation (4-2). The first blurring parameter calculating unit 432 then transfers to step ST4-45-7.

At step ST4-5-7, the first blurring parameter calculating unit 432 extracts the areas with $t_i=0.5$. If there is one or more area with $t_i=0.5$ (YES), the processing transfers to step ST4-5-8. If otherwise (NO), the processing transfers to step ST4-5-10.

At step ST4-5-8, the first blurring parameter calculating unit 432 selects one area with $t_i=0.5$ before transferring to step ST4-5-9. In selecting the area with $t_i=1.0$, such area with the longest length of the area $t_i=0.3$, that is with the largest number of $t_i$ in the areas with $t_i=1.0$.

At step ST4-5-9, the first blurring parameter calculating unit 432 sets a set of blurring parameters in association with the areas with $t_i=0.5$ selected at step ST4-5-8, in accordance with the following equation (4-3):

$$c_1 = T_{is} - |T_{i-1}| \times T_{i-1}$$

$$c_2 = T_{ie} + |T_{i+1}| \times T_{i+1}$$

$$|c_3 - c_4| = \frac{1}{2}$$

$$c_5 = e + |T_{i+1}| \times (1 - T_{i+1})$$

$$c_6 = e + |T_{i-1}| \times (1 - T_{i-1})$$

$c_7=0.6$                                               (4-3)

before terminating the processing.

At step ST4-5-10, the first blurring parameter calculating unit 432 extracts the areas with $t_j=0.3$. It there is one or more area with $t_j=0.3$ (YES), the processing transfers to step ST4-5-11. If otherwise (NO), the processing is terminated.

At step ST4-5-11, the first blurring parameter calculating unit 432 selects an area with $t_j=0.3$ before transferring to step ST4-5-12. In selecting the area with $t_j=0.3$, such area with the longest length of the area $t_j=0.3$, that is with the largest number of $t_i$ in the areas with $t_j=0.3$, is selected.

At step ST4-5-12, the first blurring parameter calculating unit 432 sets a set of blurring parameters in association with the areas with $t_j=0.5$ selected at step ST4-5-11, in accordance with the following equation (4-4):

$c_1=T_{ls}$ $c_2=T_{le}$ $|c_3-c_4|=\frac{1}{3}$ $c_3=c_4=1$ $c_7=0.4$                                           (4-4)

On the other hand, at step ST4-5-13 shown in FIG. 66, the first blurring parameter calculating unit 432 extracts the areas with $t_j=0.5$. If there is one or more area with $t_j=0.5$ (YES), the processing transfers to step ST4-5-14 and, if otherwise (NO), the processing transfers to step ST4-5-21.

At step ST4-5-14, the first blurring parameter calculating unit 432 extracts the areas with $t_j=0.5$. If there are two or more areas with $t_j=0.5$ (YES), the processing transfers to step ST4-5-15 and, if otherwise (NO), the processing transfers to step ST4-5-17.

At step ST4-5-15, the first blurring parameter calculating unit 432 selects two or more areas with $t_j=0.5$ before transferring to step ST4-5-16. Two of these areas with $t_j=0.5$ are selected in the order of the decreasing length of the area with $t_j=0.5$, that is in the decreasing order of the number of $t_i$ in the area with $t_j=0.5$.

At step ST4-5-16, the first blurring parameter calculating unit 432 sets two sets of blurring parameters in association with two areas with $t_j=0.5$ selected at step ST4-5-15, in accordance with the above equation (4-3), before terminating the processing.

At step ST4-5-17, the first blurring parameter calculating unit 432 sets a set of blurring parameters in association with the area $t_j=0.5$, in accordance with the above equation (4-3), before transferring to step ST4-5-18.

At step ST4-5-18, the first blurring parameter calculating unit 432 extracts areas with $t_j=0.3$. If there is one or more area with $t_j=0.5$ (YES), the processing transfers to step ST4-5-19 and, if otherwise (NO), the processing is terminated.

At step ST4-5-19, the first blurring parameter calculating unit 432 selects an area with $t_j=0.3$ before transferring to step ST4-5-20. In selecting the areas with $t_j=0.5$, such area with the longest length of the area $t_j=0.5$, that is with the largest number of $t_i$ in the areas with $t_j=0.5$, is selected.

At step ST4-5-20, the first blurring parameter calculating unit 432 sets a set of blurring parameters in association with the area with $t_j=0.3$ selected at step ST4-5-19, in accordance with the above equation (4-4), before terminating the processing.

At step ST4-5-21 shown in FIG. 67, the first blurring parameter calculating unit 432 extracts the areas with $t_j=0.3$.

If there is one or more area with $t_j=0.3$ (YES), the processing transfers to step ST4-5-22 and, if otherwise (NO), the first blurring parameter calculating unit 432 terminates the processing.

At step ST4-5-22, the first blurring parameter calculating unit 432 extracts two areas with $t_j=0.3$. If there are two or more areas with $t_j=0.3$ (YES), the processing transfers to step ST4-5-23 and, if otherwise (NO), the processing transfers to step ST4-5-25.

At step ST4-5-23, the first blurring parameter calculating unit 432 selects two areas with $t_j=0.3$ before transferring to step ST4-5-24. Two of these areas with $t_j=0.3$ are selected in the order of the decreasing length of the area with $t_j=0.3$, that is in the decreasing order of the number of $t_i$ in the area with $t_j=1.0$.

At step ST4-5-24, the first blurring parameter calculating unit 432 sets two sets of blurring parameters in association with two areas with $t_j=0.3$ selected at step ST4-5-23, in accordance with the above equation (4-4), before terminating the processing.

At step ST4-5-25, the first blurring parameter calculating unit 432 sets a set of blurring parameters in association with the area $t_j=0.3$, in accordance with the above equation (4-4), to terminate the processing.

(4-4-2) Setting Blurring Parameters by Second Blurring Parameter Calculating Unit An illustrative embodiment of the blurring parameters set by the second blurring parameter calculating unit 433 is explained.

In setting the blurring parameters by the second blurring parameter calculating unit 433, the figures are classified, based upon the shape data, as shown for example in Tables 1 and 2:

TABLE 1

| number of bends | length of figure | bend of figure | width of figure | length between bend points | mean width between bend points | |
|---|---|---|---|---|---|---|
| 0 | | $D_3 < r$ avg | $D_8 \leq W$ min $D_5 < W$ max | | | pattern 1 |
| | | | W min $< D_6$ | | | pattern 2 |
| | | | $D_5 < W$ max | | | |
| | | | $D_4 \leq W$ max | | | pattern 3 |
| | | | W_max $< D_5$ | | | |
| | | | W max $< D_4$ | | | pattern 4 |
| | | r_avg $\leq$ $D_3$ | $D_5 < W$ max | | | pattern 5 |
| | | | $D_4 \leq W$ max | | | pattern 6 |
| | | | W max $\leq D_5$ | | | |
| | | | W max $< D_4$ | | | pattern 7 |
| 1 | $L \leq D_1$ | | | | | pattern 8 |
| | $D_1 < L$ | | | $L_1 <$ ⅔ × L | $D_4 \leq W_2$ | pattern 9 |
| | | | | | $W_2 < D_4$ | pattern 10 |
| | | | | ⅔ × L $\leq L_1$ | | pattern 11 |

TABLE 2

| number of bends | length of figure | bend of figure | width of figure | length between bend points | mean width between bend points | |
|---|---|---|---|---|---|---|
| 2 | $L \leq D_1$ | | | | | pattern 8 |
| | $D_1 < L$ | | ⅓ × $L < L_2$ | | $W_2 \leq W_1$<br>$W_2 \leq W_3$<br>$W_3 < W_2$ | pattern 12<br>pattern 13 |
| | | | | $L_2 \leq$<br>⅓ × L<br>$L_3 \leq L_1$ | | pattern 14 |
| | | | | $L_2 \leq$<br>1/5 × L<br>$L_1 < L_3$ | | pattern 15 |
| | $L \leq D_1$ | | | | | pattern 8 |
| | $D_1 < L$ | | ⅓ ≤<br>$L_2 - L_3$ | | $W_2 \leq W_1$<br>$W_2 \leq W_3$<br>$W_2 \leq W_4$<br>$W_3 < W_2$<br>$W_3 = W_4$<br>$W_4 < W_3$ | pattern 16<br><br>pattern 16<br>pattern 17 |
| | | | | $L_4 < L_1$ | | pattern 18 |
| | | | | $L_1 < L_4$ | | pattern 19 |
| 4 or more | | | ⅓ ×<br>$L < L_i$<br>$L_i \leq$<br>⅓ × L | | | pattern 16<br>pattern 20 |

In Tables 1 and 2, $D_1$, $D_2$, $D_3$, $D_4$, $D_5$ and $D_6$ stand for values pre-set for classifying the figures.

In Tables 1 and 2, the number of bend points is based upon bend point data and stands for the number of portions bent in more than a pre-set angle. The length of the figure is based upon length data and L stands for the length of the figure. The bend of the figure is based upon curvature data, with r_avg representing the mean value of the curvature data. The figure width is based upon width data and W_min stands for the smallest value of the figure width represented by the width data, while W_max stands for the largest value of the figure width represented by the width data.

The length between bend points is based upon curved point data and the length data and stands for the figure length which is the figure length between bend points. It is noted that L stands for the length of the figure from the beginning point to the end point and $L_i$ stands for the figure length from the (i−1)'th bend point to the i'th bend point. That is, $L_1$ stands for the figure length from the beginning point to the first bend point and $L_2$ stands for the figure length from the beginning point to the end point if the number of bend points is 1 and the figure length from the beginning point to the second bend point if the number of bend points is 2. On the other hand, $L_3$ stands for the figure length from the second bend point to the end point if the number of bend points is 2 and the figure length from the second bend point to the third bend point if the number of bend points is 3, while $L_4$ stands for the figure length from the third bend point to the end point if the number of bend points is 3 and the figure length from the third bend point to the fourth bend point if the number of bend points is 4.

The mean width between bend points is a value based upon the curved point data and the width data and stands for the mean figure width between the bend points. It is noted that $W_i$ stands for the mean width of the figure from the (i−1)'st bend point to the i'th bend point. That is, $W_1$ stands for the mean width of the figure from the beginning point to the end point, while $W_2$ stands for the mean width of the figure from the bend point to the end point and that from the first bend point to the second bend point if the number of bends is 1 and not less than 2, respectively. On the other hand, $W_3$ stands for the mean width of the figure from the second bend point to the end point and that from the second bend point to the third bend point if the number of bends is 2 and 3, respectively, while $W_4$ stands for the mean width of the figure from the third bend point to the end point.

The second blurring parameter calculating unit 433 sets blurring parameters in accordance with the patterns classified as shown in Table 1 and 2 so that the blurring has characteristics as shown in Tables 3 and 4. FIGS. 68 to 87 illustrate examples of blurring when the blurring parameters are set so that the blurring will have characteristics shown in Tables 3 an 4.

TABLE 3

Figure 68:
FIGS. 68 to 87 illustrate examples of blurring for patterns 1 to 20, respectively.
Figure 69:
Figure 70:
Figure 71:
Figure 72:
Figure 73:
Figure 74:
Figure 75:
Figure 76:
Figure 77:

| | position of blurred area | length of blurred area | width of blurred area | manner of blurring | examples |
|---|---|---|---|---|---|
| pattern 1 | mid part | about ⅓ | about ⅓ | intense | FIG. 68 |
| pattern 2 | rear part | about ⅓ | about ½ | intense | FIG. 69 |
| pattern 3 | end part | ⅛ to ⅓ | ½ to 1.0 | partly linear and partly intense | FIG. 70 |
| pattern 4 | rear part | ¼ to ½ | ½ to ¾ | linear | FIG. 71 |
| pattern 5 | near bend point | about ⅓ | 1/3 to ½ | linear | FIG. 72 |
| pattern 6 | near bend point | about ⅜ | ⅓ | linear | FIG. 73 |
| pattern 7 | end part | about ⅓ | 1/3 to ½ | linear | FIG. 74 |
| pattern 8 | end part | about 1/4 | about ½ | partly linear and partly intense | FIG. 75 |
| pattern 9 | near bend point | about ½ × $W_2$ | 1/3 to ⅔ | partly linear and partly intense | FIG. 76 |
| pattern 10 | end part | about ⅔ × $W_2$ | about ½ | intense | FIG. 77 |

TABLE 4

Figure 78:
Figure 79:
Figure 80:
Figure 81:
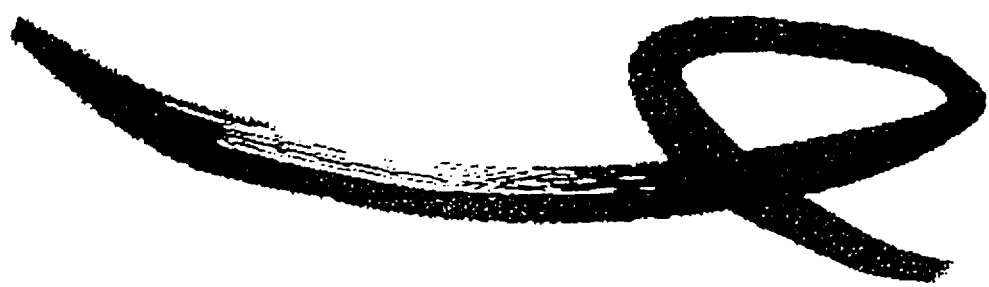

| | position of blurred area | length of blurred area | width of blurred area | manner of blurring | examples |
|---|---|---|---|---|---|
| pattern 11 | end part | about ⅔ × $W_2$ | ⅔ | partly intense and partly linear | FIG. 78 |
| pattern 12 | mid part | about ⅔ × $W_2$ | 1/3 to ½ | partly linear and partly intense | FIG. 79 |
| pattern 13 | end part | about ⅔ × $W_3$ | ½ to ⅔ | linear | FIG. 80 |
| pattern 14 | fore half | about ½ × $W_1$ | about ½ | linear | FIG. 81 |

TABLE 4-continued

Figure 82:
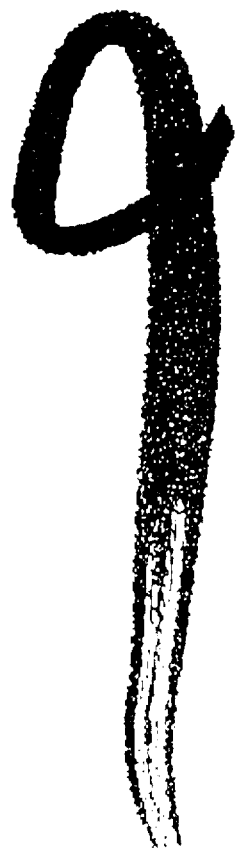
Figure 83:
Figure 84:
Figure 85:
Figure 86:
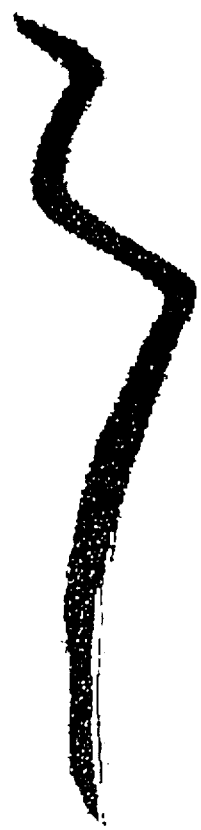

| | position of blurred area | length of blurred area | width of blurred area | manner of blurring | examples |
|---|---|---|---|---|---|
| pattern 15 | end part | about ½ × $W_3$ | 1/3 to ½ | partly linear and partly intense | FIG. 82 |
| pattern 16 | finest portion | about ¼ × $W_1$ | ½ to ⅔ | linear | FIG. 83 |
| pattern 17 | end part | about ¾ × $W_4$ | ½ to ⅔ | linear | FIG. 84 |
| pattern 18 | fore half | about ½ × $W_1$ | about ½ | intense | FIG. 85 |
| pattern 19 | end part | about ½ × $W_4$ | about ½ | linear | FIG. 86 |
| pattern 20 | end part | about 1/4 | ½ to ⅔ | linear | FIG. 87 |

In Tables 3 and 4, the position of the blurred area indicates the position of the blurred area along the figure length. The "fore half" means that the blurring occurs in the start point side region and the "rear half" means that the blurring occurs in the end point side region. The start point side area means a start point side area obtained on bisecting a figure into two equal portions along its length, while an end point side area means an end point side area obtained on bisecting a figure into two equal portions along its length. The start part, mid part and the end part mean the cases in which blurring occurs in the start area, mid area and in the end area, respectively. The starting area means a start point side area obtained on tri-secting a figure into three portions along its length. The mid area and the end area mean a mid point side area and an end point side area obtained on tri-secting the figure into three portions along its length, respectively.

The length of the blurred area means a mean length of the blurred area with respect to the figure length set to 1, while the width of the blurred area means a width of the blurred area with respect to the figure width set to 1. $W_1$, $W_2$ and $W_3$ mean the values of mean width between the bend points and are the same as those shown in Tables 1 and 2.

The manner of blurring means the blurring density. Thus, "intense" means severe blurring in which only little ink is present in the blurred portion, while "linear" means weak blurring in which a considerable amount of ink is present in the blurred portion and "partly intense and partly linear" means the moderate blurring intermediate between the intense blurring and linear blurring in which a certain amount of ink is present in the blurred portion.

(4-4-3) Setting of Ink Density Data by First Ink Density Setting Unit

An illustrative example of ink density data as set by the first ink density setting unit 456 is now explained.

When setting ink density data $Id_p$ on a pixel P on an i'th line segment $l_i$, the first ink density setting unit 456 calculates and sets ink density data $Id_p$, based upon ink density $ID_p$ of writing brush data associated with the drawing trajectory passing thought the pixel P, in accordance with the following equation (4-5):

$$Id_p = ID_p = a \times i \qquad (4-5)$$

where a is a coefficient of a pre-set value for representing the manner in which the ink density becomes gradually lower beginning from the start point. Specifically, it is set to a value on the order of 0.2.

However, if the value of $Id_p$ calculated by the equation (4-5) is lower than a pre-set value, the first ink density setting unit 456 sets the ink density data $Id_p$ to 0. If the ink density becomes lower in this manner than he pre-set value, the figure is no longer drawn so that the blurring drawn is that near the end part of the figure.

On the other hand, the first in density setting unit 456 gradually sequentially modifies the ink density of the writing brush data for taking into account the ink flow within the writing brush during figure drawing. Specifically, if the values of ink density of the writing brush data corresponding to the k'th, (k–1)st and the (k+1)st drawing trajectories are $ID_k$, $ID_{k-1}$ and $ID_{k+1}$, respectively, the first ink density setting unit 456 before setting the ink density data $Id_p$ on a pixel P on the line segment $l_i$ updates the ink density values of the writing brush data in accordance with the equation (4-6):

$$ID_k = ID_k + b \times (ID_{k+1} - ID_k) + b \times (ID_{k-1} - ID_k) \qquad (4-6)$$

where b is a coefficient of pre-set value for representing the ink flow within the writing brush. If $ID_{k-1}$ is not present in the equation (4-6), that is if the ink density is the first ink density, $ID_{k-1}$ is set to $ID_k$ ($ID_{k-1} = ID_k$). If $ID_{k+1}$ is not present in the equation (4-6), that is if the ink density is the last ink density, $ID_{k+1}$ is set to $ID_k$ ($ID_{k+1} = ID_k$). When setting the ink amount data $Iq_p$ on the pixel P on the i'th line segment $l_i$, the first ink quantity setting unit 457 calculates and sets the ink quantity data $Iq_p$, based upon the ink quantity data $IQ_p$ of the writing brush data corresponding to the drawing trajectory passing through the pixel P, in accordance with the equation (4-7):

$$Id_q = IQ_p \times \exp(c \times i) \qquad (4-7)$$

where c is a coefficient of a pre-set value for representing the manner in which the ink quantity becomes gradually thinner from the beginning point. Specifically, it is set to a value on the order of –0.03.

However, if the value of $Id_p$ calculated by the equation (4-7) is lower than a pre-set value, the first ink density setting unit 457 sets the ink density data $Id_p$ to 0. Thus, if the ink density becomes lower than the pre-set value, the figure is no longer drawn so that the blurring drawn is that near the end part of the figure.

On the other hand, the first in quantity setting unit 457 gradually sequentially modifies the ink quantity of the writing brush data for taking into account the ink flow within the writing brush during figure drawing. Specifically, if the values of ink quantity of the writing brush data corresponding to the k'th, (k–1)st and the (k+1)st drawing trajectories are $IQ_k$, $IQ_{k-1}$ and $IQ_{k+1}$, respectively, the first ink quantity setting unit 457 before setting the ink quantity data $Iq_p$ on the pixel P on the line segment $l_i$ updates the ink quantity values of the writing brush data in accordance with the equation (4-8):

$$IQ_k = IQ_k + d \times (IQ_{k+1} - IQ_k) + d \times (IQ_{k-1} - IQ_k) \qquad (4-8)$$

where b is a coefficient of a pre-set value for representing the ink flow within the writing brush. If $IQ_{k-1}$ is not present in the equation (4-8), that is if the ink quantity is the first ink quantity, $IQ_{k-1}$ is set to $IQ_k$ ($IQ_{k-1} = IQ_k$). On the other hand, if $IQ_{k+1}$ is not present in the equation (4-8), that is if the ink quantity is the last ink quantity, $IQ_{k+1}$ is set to $IQ_k$ ($IQ_{k+1} = IQ_k$).

(4-4-5) Setting of Ink Density by Second Ink Density Setting Unit

An illustrative example of ink density data set by the second ink density setting unit 459 is now explained.

When setting ink density data $Id_r$, based upon the ink density data $Id_p$ of the pixel P on the line segment $l_i$, ink density data $Id_q$ of the pixel Q on the line segment $l_i$, the distance PR between pixels Q and R on the line segment $l_i$ and the distance QR between pixels P and Q on the line segment $l_{i+1}$ the second ink density setting unit 458 calculates and sets the ink quantity data $Iq_r$ in accordance with, for example, the equation (4-9):

$$Id_r = Id_p \times (PR/PQ) + Id_q \times (QR/PQ) \qquad (4-9)$$

where PQ stands for the distance between the pixels P and Q.

(4-4-6) Setting of Ink Quantity by Second Ink Quantity Setting Unit

An illustrative example of ink quantity data set by the second ink quantity setting unit 459 is now explained.

When setting ink quantity data $Iq_r$ based upon the ink quantity data $Iq_p$ of the pixel P on the line segment $l_i$, ink quantity data $Iq_q$ of the pixel Q on the line segment $l_{i+1}$, the distance PR between pixels Q and R on the line segment $l_i$ and the distance QR between pixels P and Q on the line segment $l_{i+1}$, the second ink quantity setting unit 459 calculates and sets the ink quantity data $Iq_r$ in accordance with, for example, the equation (4-9):

$$Iq_r = Iq_p \times (PR/PQ) + Iq_q \times (QR/PQ) \qquad (4-10)$$

where PQ stands for the distance between the pixels P and Q.

(4-4-7) Setting of Luminance Data by Luminance Data Setting Unit

An illustrative example of ink density data set by the luminance data setting unit 46 is now explained.

The luminance data setting unit 46 sets luminance I in the pixel P, based upon paper fiber structure data formed by the paper fiber structure data forming processor 30 and picture data set by the first and second picture data setting units 454. That is, the luminance data setting unit 46 calculates and sets luminance I in each pixel in accordance with the equations (4-11) and (4-12):

$$I = 1 - f \times Id_p \times Iq_p \text{(for } M > 6\text{)} \qquad (4-11)$$

$$I = 1 \text{(for } M \leq 6\text{)} \qquad (4-12)$$

where $Id_p$, $Iq_p$ and M stand for the ink density data, ink quantity data and the number of paper fiber structure data in the pixel P, respectively. The value of the luminance ranges from 0 and 1, with the initial value of the luminance I being 1.

In the above equations (4-11) and (4-12), f is a coefficient pre-set to a suitable value. If, in the equation (4-12), the value of I exceeds 1, the value of I is set to 1.

By setting the luminance I in this manner, it becomes possible to take account of the effect of paper fiber structure on blurring and hence to represent a blurred figure more realistically.

In the foregoing description, both the ink density data and the ink quantity data have been set as ink data. However, for simplifying data, only the ink density data or the in quantity data may be set. In such case, the luminance I in the pixel P may be calculated by simply modifying the equation (4-11) to the following equations (4-13) or (4-14):

$$I = 1 - f \times Iq_p \text{(for } M > 6\text{)} \qquad (4-13)$$

$$I = 1 - f \times Id_p \text{(for } M > 6\text{)} \qquad (4-14)$$

(5) Bled Figure Drawing Processor

Referring to FIGS. 88 to 111, a preferred embodiment of the bled figure drawing processor is explained.

If a figure is drawn on a paper sheet with ink, bleeding is produced around a figure. Based upon the modelled bleeding phenomenon, the bled figure drawing processor 50 forms picture data for representing a bled figure from picture data representing a figure which is to undergo bleeding. The picture data of the bled figure thus prepared by the blurred figure processor 50 is fed to the display unit 1 for drawing a bled figure on the display screen of the display device 1.

For modelling the bleeding phenomenon, the information such as ink quantity or density in the figure to undergo bleeding is required. Thus, in preparing picture data of the bled figure in the bled figure drawing processor 50, the picture data of the figure to undergo bleeding includes data as to the ink quantity and ink density in the figure. Such picture data may be exemplified by the picture data formed in the blurred figure drawing processor 40.

(5-1) Modelling the Bleeding Phenomenon

The bleeding generated on drawing a figure on a paper sheet with ink is diffused by the ink flowing in the interstices of the fibers making up the paper sheet. The interstices of the fibers through which flows the ink is referred to hereinafter as the capillary tube. The density of the color in the bled portion of the figure depends upon the ink absorbed by the paper sheet, that is by the quantity or the density of the ink held in the interstices of the fibers making up the paper sheet. Thus, for modelling the bleeding phenomenon, it is necessary to model the manner in which the ink flows and to calculate the quantity and the density of the ink held in the fiber interstices. The modelled ink flow, calculation of the ink quantity held in the fiber interstices and calculation of the density of ink held in the fiber interstices will now be explained.

(5-1-1) Modelling the Manner in which Ink Flows

The modelling of the ink flow is first explained.

Bleeding is diffused by the ink flowing in the capillary tube, as described above. Such ink flow may be modelled by assuming that the paper sheet is made up of plural microsized areas, referred to herein as pixels, the ink flows between the neighboring pixels if these pixels are interconnected by the capillary tube, and that the ink does not flow between the neighboring pixels if these pixels are not interconnected by the capillary tube.

The modelling may be performed by assuming that, when the ink flows into a given pixel, the ink is held in the interstices of the fibers in the pixel and absorbed therein, and that the ink is absorbed such that the ink that has not been absorbed by the pixel flows onto the next pixel interconnected with the firstly stated pixel by the capillary tube.

Thus the bleeding may be represented more realistically by modeling the ink flow by assuming that the ink flows through the capillary tube interconnecting the pixels and is absorbed in the pixel to which flows the ink, with the ink absorbed in the different pixels producing the bleeding.

(5-1-2) Ink Quantity Held in the Fiber Interstices

Referring to the drawings, the quantity of the ink held in the fiber interstices is explained. In the following description, the ink quantity held in the fiber interstices of a given pixel is calculated based upon the assumption that the above-described ink flow model is followed and the paper sheet is made up of plural fibers.

It is assumed that the fibers making up the paper sheet is of a two-dimensional or planar structure and that the quantity of the ink held in the fiber interstices in a given pixel is proportional to the area occupied by the ink held in the fiber interstices of the pixel.

Figure 88:
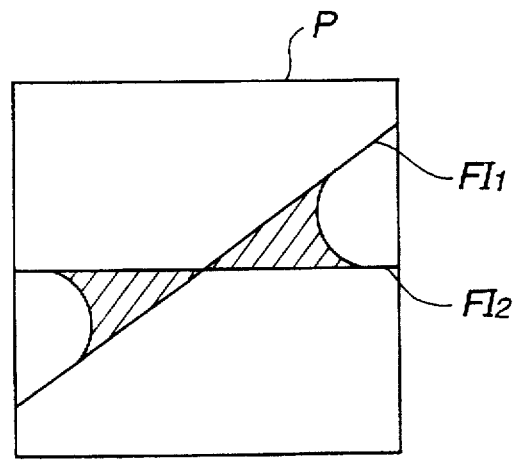
FIG. 88 shows an example of ink held in a gap between two fibers in a pixel.
Figure 89:
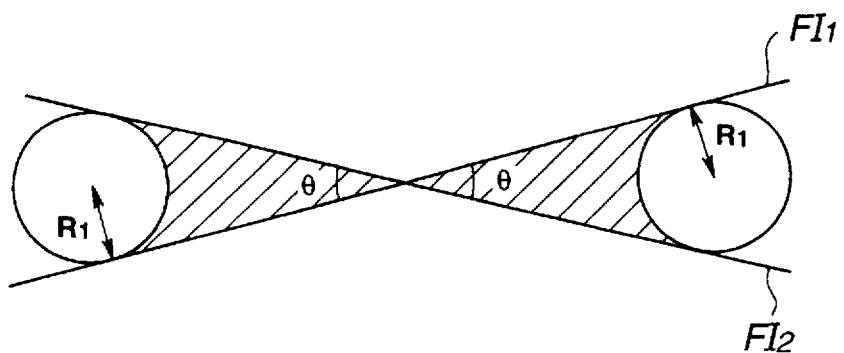
FIG. 89 shows an example of an area occupied by ink held in a gap between two fibers in a pixel.

It is also assumed that there exist two fibers $FI_1$ and $FI_2$ intersecting each other at an angle θ, as shown in FIG. 88.

The surface measure of the area occupied by the ink held in the interstices between the fibers F1 and F2 is considered. The ink held in the interstices between the fibers $FI_1$ and $FI_2$ is captured in an area of intersection between the two fibers $FI_1$ and $FI_2$ as indicated by hatching in FIG. 88. The portion of the ink not contacted with the fibers is bent under the surface tension of the ink.

Thus the area of the ink held in the interstices of the two fibers $FI_1$ and $F_2$ may be approximated by an area surrounded by the two fibers $FI_1$ and $F_2$ and two circles each with a radius $R_1$ inscribing the two fibers $FI_1$ and $F_2$. The radius $R_1$ is a constant which depends upon the surface tension of the ink.

If such approximation is used, the smaller the angle of intersection $\theta$ between the two fibers $FI_1$ and $FI_2$, the larger becomes the area occupied by the ink kept in the interstices between the two fibers $FI_1$ and $FI_2$. However, in effect, if the angle of intersection $\theta$ between the two fibers $FI_1$ and $FI_2$ is smaller than a pre-set value, the area occupied by the ink held in the interstices of the fibers $FI_1$ and $FI_2$ becomes smaller. Thus an approximation is made that, if the angle of intersection $\theta$ between the two fibers $FI_1$ and $FI_2$ is smaller than a pre-set angle $\theta_a$, the area occupied by the ink held in the interstices between the two fibers $FI_1$ and $FI_2$ becomes larger. If the area occupied by the ink captured in the interstices between the two fibers $FI_1$ and $FI_2$ is approximated as described above, the surface measure of an area $s(\theta)$ occupied by the ink captured in the interstices between the two fibers $FI_1$ and $FI_2$ is given as a function of the angle $\theta$ by the equations (5-1) and (5-2):

$$s(\theta) = 2 \times R^2 \times \{\cos(\theta/2)/\sin(\theta/2) + (\theta - \pi)/2\} \quad (\text{for } \theta \geq \theta_a) \quad (5\text{-}1)$$

$$s(\theta) = 2 \times R^2 \times \{\cos(\theta_a/2)/\sin(\theta_a/2) + (\theta_a - \pi)/2\}/\theta \quad (\text{for } \theta < \theta_a) \quad (5\text{-}2)$$

Figure 90:
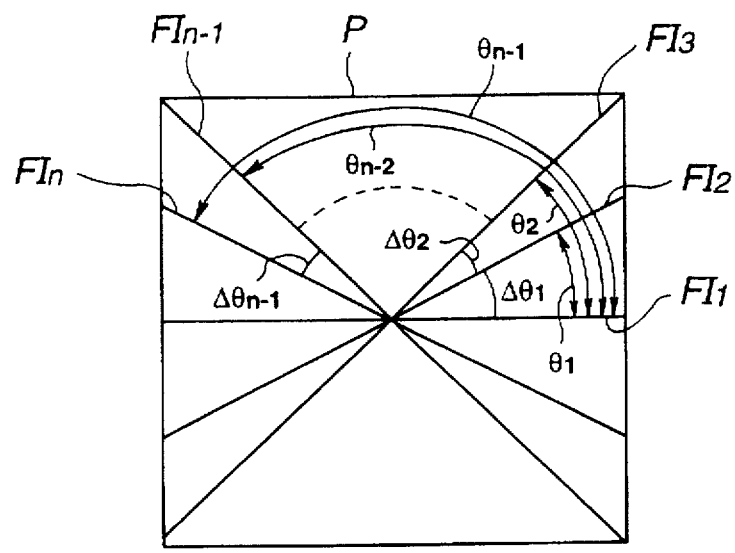
FIG. 90 shows an example of ink held in a gap between a n number of fibers in a pixel.
Figure 91:
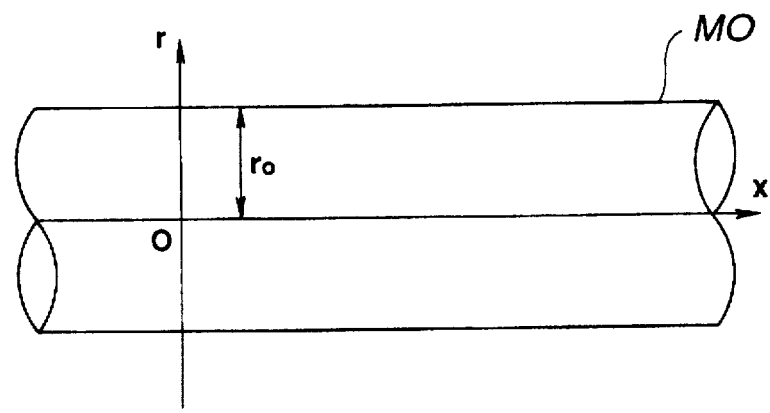
FIG. 91 is a schematic view showing a capillary tube.

If there exist n fibers $FI_1, FI_2, \ldots, FI_{n-1}, FI_n$ in a pixel P, as shown in FIG. 90. The surface measure of the area occupied by the ink captured in the interstices between the n fibers $FI_1, FI_2, \ldots, FI_{n-1}, FI_n$ in the pixel P is found in the following manner. It is assumed that the angles of the n fibers $FI_1, FI_2, \ldots, FI_{n-1}, FI_n$ are $\theta_i$, where i is 1, 2, 3, ..., n−1, with the fiber $FI_1$ as a reference, and the angles of intersection of the neighboring fibers are $\Delta\theta_i$, where i is 1, 2, 3, ..., n−1, as shown for example in FIG. 90. Then, using the function $s(\theta)$ as found by the equations (5-1) and (5-2), the area q(n) occupied by the ink captured in the interstices between the n fibers $FI_1, FI_2, \ldots, FI_{n-1}, FI_n$ in the pixel P is found as the function of $s(\theta)$ by the following equation (5-3):

$$q(n) = \pi^{-n} \times \int_0^\pi \int_0^\pi \ldots \int_0^\pi \sum_{i=1}^{n-1} s(\Delta\theta_i) d\theta_1 d\theta_2 \ldots d\theta_{n-1} \quad (5\text{-}3)$$

Thus the quantity U of the ink absorbed in the pixel having n fibers is given by the equation (5-4)

$$U = \alpha \times q(n) \quad (5\text{-}4)$$

$$U = \alpha \times \pi^{-n} \times \int_0^\pi \int_0^\pi \ldots \int_0^\pi \sum_{i=1}^{n-1} s(\Delta\theta_i) d\theta_1 d\theta_2 \ldots d\theta_{n-1}$$

where $\alpha$ is a proportionality constant of the quantity of ink absorption U and the surface measure q(n) of the area occupied by the ink.

That is, if the quantity of ink absorption U in the pixel is found, it is possible to find the number n of the fibers in the pixel and the angles of intersection $\Delta\theta_i$ between the neighboring fibers.

(5-1-3) Thickness of Ink Captured in Fiber Interstices

Referring to the drawings, the concentration (thickness) of the ink captured in the fiber interstices is explained. In the following explanation, the shape of a capillary tube MO is assumed to be a cylinder through the inside of which the ink flows. The ink flowing direction through the cylinder of the capillary tube MO is indicated as x, the radial direction in the capillary tube MO with the center of the capillary tube MO as an origin is r and the time is t. The radius of the capillary tube MO is $r_0$.

The ink is a dispersion of ink particles in a solvent, such as water, with the ink thickness being set by the number of ink particles. If the ink flows through the inside of the capillary tube, the ink particles become depleted towards the distal end of the flow. That is, when the ink flows through the inside of the capillary tube, the ink flow become thinner towards its distal. For calculating the ink thickness which undergoes fluctuations within the capillary tube, it is sufficient if diffusion of the ink particles in the capillary tube is considered.

If the number of diffused ink particles at time t and a position (x, r) is represented by n(x, r, t), the velocity of the ink flowing in the direction x is v(r) and a constant representing the degree of diffusion in the direction r of the ink particles is $D_0$, the diffusion of the ink particles in the capillary tube may be represented by the following partial differential equation:

$$\frac{\partial n(x, r, t)}{\partial t} = D_0 \times \nabla^2 n(x, r, t) - v(r) \times \nabla n(x, r, t) \quad (5\text{-}5)$$

In the above equation, the ink velocity v(r) is not dependent upon the position in the direction x but is dependent only upon the position in the r direction, such that the ink velocity is faster and slower towards the center and in the vicinity of the wall surface of the capillary tube, respectively. If the velocity at a position of r=0 is vmax, the ink velocity v(r) may be represented by, for example, the following equation (5-6):

$$v(r) = v\max \times \{1 - (r/r_0)^2\} \quad (5\text{-}6)$$

The partial differential equation (5-5) may be converted into the following difference equation (5-7), with a minor variant of t, x and r being $\Delta t$, $\Delta x$ and $\Delta r$:

$$n(x, r, t + \Delta t) = n(x, r, t) - \quad (5\text{-}7)$$

$$\Delta t/\Delta x \times v(r) \times n(x - \Delta x, r, t) +$$

$$\Delta t/\Delta x \times v(r) \times n(x - \Delta x, r, t) +$$

$$D_0 \times \Delta t/\Delta r^2 \times n(x, r + \Delta r, t) +$$

$$D_0 \times \Delta t/\Delta r^2 \times n(x, r - \Delta r, t) -$$

$$2 \times D_0 \times \Delta t/\Delta r^2 \times n(x, r, t)$$

In the equation (5-7), the left side denotes the number of ink particles at time $t+\Delta t$ and at a position (x, r). The first term, second term, third term, fourth term, fifth term and the sixth term of the right side denote the number of ink particles at time t and at a position (x, r), the number of ink particles at time t and at the position (x, r) which flow out at time $t+\Delta t$ in the direction x from the position (x, r), the number of ink particles at time t and at the position (x−$\Delta x$, r) which flow out at time $t+\Delta t$ towards the position (x, r), the number of ink particles at time t and at the position (x, r+$\Delta r$) which are diffused at time $t+\Delta t$ towards the position (x, r), and the number of ink particles at time t and at the position (x, r) which are diffused at time $t+\Delta t$ from the position (x, r) in the direction r, respectively.

If initial conditions are set for the equation (5-7), the numbers of particles n(x, r, t) at time t and at a position (x, r) may be found sequentially. In sequentially calculating the number of ink particles n(x, r, t), it may be assumed that n(x, $r_0$, 0)=0 since the ink particles reaching the wall surface of the capillary tube may be presumed to become affixed to the wall surface of the capillary tube without becoming diffused any further.

The initial conditions for solving the equation (5-7) may be set so that, when the ink starts to flow out, that is at t=0, the ink particles are present only at the position x=0 and are uniformly diffused in the r direction. That is, n(x, r, 0)=0 for x>0 and n(0, r, 0)=$n_0$ where $n_0$ is a constant.

It is noted that the sum of the ink particles in the r direction at the time t and the position x may be represented by the sum of the number of ink particles R(x, t) flowing at time t and position x and the number of the ink particles which have become affixed to the wall surface of the capillary tube at time t and position x, as shown by the equation (5-8):

$$V(x, t) = R(x, y) + Q(x, t) \quad (5\text{-}8)$$

Thus the number of the ink particles R(x, t) flowing at time t and position x may be calculated based upon n(x, r, t), as shown by the equation (5-9):

$$R(x, y) = \int_0^{l_0} 2\pi r \times n(x, r, t) dr \quad (5\text{-}9)$$

On the other hand, the number of ink particles a (x, t) which have become affixed to the wall surface of the capillary tube at time t and position x may be calculated based upon n(x, r, t) and is given by the equation (5-10):

$$Q(x, y) = -2\pi r_0 \times \int_0^t D_0 \frac{\partial}{\partial_r} n(x, r, t) d\tau \quad (5\text{-}10)$$

By the above calculations, it is possible to find the sum V(x, t) in the r direction of the numbers of ink particles at time t and position x. The ink thickness at time t and position x is proportionate to V(x, t). Thus the ink thickness at time t and position x may be represented by multiplying V(x, t) with a suitable coefficient.

(5-2) Stricture of Bed Figure Drawing Processor

An illustrative structure of the bled figure drawing processor 50 for forming picture data of the bled figure is explained.

Figure 92:
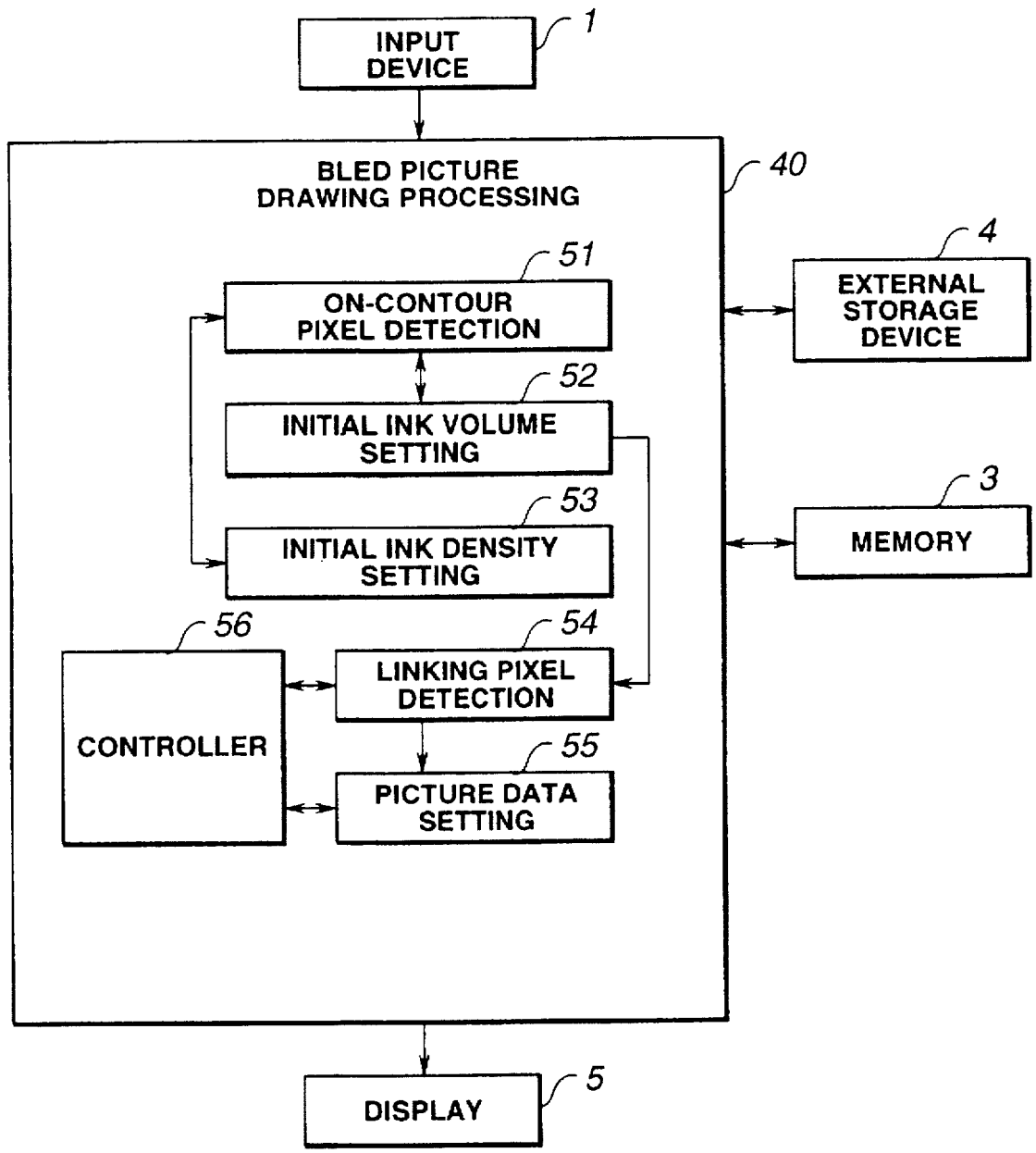
FIG. 92 is a block diagram showing an illustrative construction of a bleeding processor.
Figure 95:
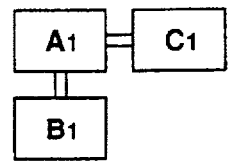
FIG. 95 is a diagrammatic view showing an example of a branched point pixel.

Referring to FIG. 92, the bled figure drawing processor 50 includes a contour pixel detection unit 51 for detecting the pixel P on the contour of a figure yet to be bled, and an initial ink quantity setting unit 52 for pre-setting an initial ink quantity $U_0$ on the pixel P detected by the contour pixel detection unit 51. The bled figure drawing processor 50 also includes an initial in density setting unit 53 for pre-setting an initial ink thickness $V_0$ as picture data on the pixel P on the figure contour, and a linking pixel detection unit 54 for detecting the pixels linked to the pixel P by the capillary tube based upon the number of capillary tubes $S_i$ (i=1, 2, 3, 4, 5, 6, 7, 8) of the paper fiber structure data previously formed by the paper fiber structure data forming processor 30 for the pixel P detected by the contour pixel detection unit 51. The bled figure drawing processor 50 also includes a picture data setting unit 55 for setting data specifying the ink presence for the pixel detected by the linking pixel detection unit 54 as picture data and a controller 56 for controlling the repetition of the operation of the coupling pixel detection unit 54 and the picture data setting unit 55. The figure yet to be bled is e.g., a figure represented by picture data formed by the blurred figure drawing processor 40. That is, the bled figure drawing processor 50 reads out picture data formed by the blurred figure drawing processor 40 and temporarily stored in the memory 3 for performing bled figure drawing processing on the read-out picture data.

Specifically, picture data of a figure to be bled is read from e.g., the input device 1, memory 3 and the external storage device 4 so as to be routed to the on-condor pixel detection unit 51 of the bled figure drawing processor 50.

The contour pixel detection unit 51 detects the pixel P on the contour of the figure based upon picture data of the figure yet to be bled. If there are plural pixels on the contour of the figure, the contour pixel detection unit 51 sequentially detects these pixels. Meanwhile, such picture data of the figure to be bled suffices which permits detection of the contour pixels. That is, the picture data may be such picture data consisting only of the contour information, such as picture data specifying the contour of a stroke of a character or a symbol based upon a font formed by the font forming processor 20.

The initial ink quantity setting unit 52 sets the initial ink quantity $U_0$ as picture data for the pixel P detected by the contour pixel detection unit 51. Similarly, the initial ink density setting unit 53 sets the initial ink density $V_0$ as picture data for the pixel P detected by the contour pixel detection unit 51. The values of the initial ink quantity $U_0$ or the initial ink density $V_0$ may be pre-set values, pre-stored in the external storage device 4 or input values from the input device 1. It is also possible for the information of the initial ink quantity $U_0$ or the initial ink density $V_0$ to be included in advance in picture data of a figure yet to be bled, while it is similarly possible for the initial ink quantity $U_0$ and the initial ink density $V_0$ to be set by the initial ink quantity $U_0$ or the initial ink density setting unit 53 based upon this information. Alternatively, the initial ink quantity $U_0$ or the initial ink density $V_0$ may be pre-set in picture data of the figure yet to be bled without employing the initial ink quantity setting unit 52 or the initial ink density setting unit 52.

The pixel P, which has been detected in this manner by the contour pixel detection unit 51 and which has the initial ink quantity $V_0$ and the initial ink quantity $V_0$ thus set, is supplied from the contour pixel detection unit 51 to the linking pixel detection unit 54.

The linking pixel detection unit 54 detects pixels connected by the capillary tube to the pixel P detected by the contour pixel detection unit 51 based upon the number of capillary tubes $S_i$ (i=1, 2, 3, 4, 5, 6, 7, 8) associated with the pixel. Specifically, the number $S_i$ of the capillary tubes is data included in the paper fiber structure data formed by the paper fiber structure data forming unit 30 and specifically is an integer not less than 0.

If the number $S_i$ of the capillary tubes of the pixel P is not less than 1, the linking pixel detection unit 54 detects the pixels $P_i$ corresponding to the number $S_i$ of the capillary tubes as the pixels linked to the pixel P. Specifically, if the numbers of the capillary tubes $S_1$, $S_3$, $S_5$ of the pixel P associated with directions of the pixels $P_1$, $P_3$ and $P_5$ neighboring to the pixel P are 1 and the numbers of the capillary tubes $S_2$, $S_4$, $S_6$, $S_7$ and $S_8$ of the pixel P associated with directions of the pixels $P_2$, $P_4$, $P_6$, $P_7$ and $P_8$ neighboring to the pixel P are 0, the linking pixel detection unit 54 detects the pixels $P_1$, $P_3$ and $P_5$ as pixels connected by the capillary tubes, as shown in FIG. 93.

Alternatively, if the numbers of the capillary tubes $S_i$ of the pixel P ares not less than 1 and the numbers of the capillary tubes $S_j$ (j=1, 2, 3, 4, 5, 6, 7, 8) of the pixels $P_i$ corresponding to the numbers $S_i$ are not less than 1, the linking pixel detection unit 54 detects the pixel $P_i$ as the pixel linked to the pixel P. Specifically, if the numbers of the capillary tubes $S_1$, $S_3$, $S_5$ of the pixel P associated with directions of the pixels $P_1$, $P_3$ and $P_5$ neighboring to the pixel P are 1, the numbers of the capillary tubes $S_2$, $S_3$, $S_6$, $S_7$ and $S_8$ of the pixel P associated with directions of the pixels $P_2$, $P_4$, $P_6$, $P_7$ and $P_8$ neighboring to the pixel P are 0, the number $S_5$ of the capillary tubes of the pixel $P_1$ corresponding to the direction of the pixel P is 1, the number $S_7$ of the capillary tubes of the pixel $P_3$ corresponding to the direction of the pixel P is 1, and the number $S_1$ of the capillary tubes of the pixel $P_5$ corresponding to the direction of the pixel P is 0, the linking pixel detection unit 54 detects the pixels $P_1$ and $P_3$ as pixels connected to the pixel P by the capillary tubes, as shown in FIG. 94.

The pixels connected to the pixel P by the capillary tubes, thus detected by the linking pixel detection unit 54, are routed from the linking pixel detection unit 54 to the picture data setting unit 55.

The picture data setting unit 55 sets data indicating the presence of the ink for the pixels linked to the pixel P by the capillary tube. If the initial ink quantity $U_0$ set on the pixel P is not more than 0, the picture data setting unit 55 assumes that there is no ink diffused from the pixel P and terminates the bled figure drawing processing for the pixel P without setting data indicating the presence of the ink for the pixel connected to the pixel P by the capillary tube.

In addition, the picture data setting unit 55 calculates, for each pixel for which the data indicating the presence of the ink is set, the quantity U of ink absorbed by the pixel, and sets the quantity U as picture data. If the quantity Q of the absorbed ink exceeds 0, the ink may be assumed to be present, the quantity Q of ink absorption being then simultaneously used for setting the ink presence specifying data. The quantity U of the absorbed ink may be found, as explained in connection with the modelling of the bleeding phenomenon, in accordance with the equation (5-11):

$$U = \alpha \times \pi^{-n} \times \int_0^\pi \int_0^\pi \cdots \int_0^\pi \sum_{i=1}^{n-1} s(\Delta\theta_i) d\theta_1 d\theta_2 \cdots d\theta_{n-1}$$

where, if $\theta \geq \theta_a$, $$s(\Delta\theta) = 2 \times R^2 \times \left( \frac{\cos\left(\frac{\theta}{2}\right)}{\sin\left(\frac{\theta}{2}\right)} + \frac{\theta - \pi}{2} \right)$$

and, if $\theta < \theta_a$, $$s(\Delta\theta) = 2 \times R^2 \times \left( \frac{\cos\left(\frac{\theta_a}{2}\right)}{\sin\left(\frac{\theta_a}{2}\right)} + \frac{\theta_a - \pi}{2} \right) \frac{1}{\theta} \quad (5\text{-}11)$$

In the equation (5-11), n stands for the number of fibers M of the pixel which may be obtained by referring to the paper fiber structure data. The angle $\Delta\theta_i$ is the angle of intersection between two neighboring fibers, that is between the i'th fiber and the (i+1)st fiber neighboring thereto, and is set at random in the picture data setting unit 55 within a range of $0 \leq \Delta\theta_i \leq \pi$ so that the value of $(\Delta\theta_1 + \Delta\theta_2 + \ldots + \Delta\theta_{n-1})$ will be not larger than $\pi$. The value of R, which is a constant derived from the surface tension of the ink, may be pre-set or entered by the input device 1 so as to be freely set by the user. The value of $\alpha$, an optionally set proportionality constant, becomes larger or smaller if the absorbed ink quantity is larger or smaller, respectively. On the other hand, $\theta_a$ is a constant employed in a method for calculating the quantity of ink captured in the fiber interstices and may, for example, be $\pi/4$.

The value of U(n) is previously calculated for n being an integer not less than 0, in accordance with the equation (5-11), and is previously set as a one-dimensional array of n. When calculating the absorbed ink quantity U, the picture data setting unit 55 refers to this pre-set one-dimensional array in order to find the value of the absorbed ink quantity U corresponding to the number M of the fibers of the pixel. This significantly reduces the processing time since there is no longer the necessity of calculating the absorbed ink quantity U in accordance with the equation (5-11) each time the absorbed ink quantity U is set.

The absorbed ink quantity U, calculated in accordance with the equation (5-11), is the maximum ink quantity absorbed by the pixel, that is the maximum absorbed ink quantity Umax. If the quantity of the ink flowing to the pixel is smaller than this maximum absorbed ink quantity Umax, the picture data setting unit 55 naturally sets the quantity of the ink flowing to the pixel, that is the ink quantity smaller than the maximum absorbed ink quantity Umax, in the picture data as the absorbed ink quantity U.

The picture data setting unit 55 also calculates, for each pixel for which the ink presence indicating data has been set, the ink density V in the pixel, and sets the ink density V as the picture data. The ink density V is found in accordance with the equation (5-12):

$$V = V_0 \times V(x, t) \quad (5\text{-}12)$$

by calculating the number of ink particles V(x, t) at the time t and at a position x based upon the simulated bleeding phenomenon described above.

In the above equation, $V_0$ is the initial ink density set for the pixel on the contour of a figure yet to be bled, and x stands for the length of a capillary tube through which the ink flows before reaching the pixel from the figure contour, specifically, the number of a series of pixels interconnected by the capillary tubes and sequentially detected by the linking pixel detection unit 54. On the other hand, t stands for the time elapsed until the ink reaches the pixel from the figure contour, specifically, the number of times of processing operations performed by the linking pixel detection unit 54 and the picture data setting unit 55.

Also, in the above equation, V(x, t) is pre-set as a two-dimensional array of x and t based upon calculation of the equations (5-8) to (5-10) for the case of x and t being integers not less than 0. When finding the ink density V, the picture data setting unit 55 performs the calculations of the equation (5-12) in order to find the value of the ink density V by having reference to the value of V(x, t) among the pre-set two-dimensional array V(x, t) corresponding to the number of times of repetition of the operations of the linking pixel detection unit 54 and the picture data setting unit 55 until finding the number of a series of pixels interconnected by the capillary tubes and sequentially detected by the linking pixel detection unit 54 and the ink density V of the pixels. This significantly reduces the processing time since there is no longer the necessity of calculating V(x, t) in accordance with the equations (5-8) to (5-10) each time the ink density V is set.

The picture data setting unit 55 multiplies the absorbed ink quantity U with the ink density V thus found to find the luminance I of the pixel which is also set as picture data.

The bled figure drawing processor 50 routes the pixel, for which picture data have been set in the picture data setting unit 55, to the linking pixel detection unit 54 as the pixel P detected by the contour pixel detection unit 51 and iterates the operations of the linking pixel detection unit 54 and the picture data setting unit 55 for sequentially setting picture data simulating the gradual spreading apart of ink during bleeding.

During iteration of the operations of the linking pixel detection unit 54 and the picture data setting unit 55, new picture data are not set for a pixel for which picture data have already been set based upon the assumption that no new ink flows to the pixel to which the ink flew previously. That is, no picture data is set by the picture data setting unit 55 for the pixel within an area occupied by the figure yet to be bled or the pixel for which picture data have already been set in the picture data setting unit 55.

The iteration of the operations by the linking pixel detection unit 54 and the picture data setting unit 55 is controlled by the controller 56.

That is, the controller 56 controls the iteration of the operations of the linking pixel detection unit 54 and the picture data setting unit 55 based upon the assumption that bleeding comes to a close when the quantity of the ink diffused by bleeding has reached the initial ink quantity $U_0$ which is the quantity of the ink responsible for bleeding.

Specifically, the controller 56 manages control so that the absorbed ink quantities U, calculated by the picture data setting unit 55, are summed for all pixels detected by the linking pixel detection unit 54, and the iterative operations by the linking pixel detection unit 54 and the picture data setting unit 55 is terminated when the sum value reaches the initial ink quantity $U_0$.

Alternatively, the controller 56 manages control so that the absorbed ink quantities U, calculated by the picture data setting unit 55, is sequentially subtracted from the initial ink quantity $U_0$ set by the initial ink setting unit 52 for each pixel detected by the linking pixel detection unit 54, in order to find sequentially the residual ink quantity $U_{rest}$, this new ink residual quantity $U_{rest}$ is set as the new initial ink quantity $U_0$ in the pixel P detected by the contour pixel setting unit 51, and the iterative operation of the linking pixel detection unit 54 and the picture data setting unit 55 is terminated when the new initial ink quantity $U_0$ becomes not larger than 0.

If the initial ink quantity $U_0$ differs between two neighboring pixels detected by the contour pixel detection unit 51, the controller 56 controls the iterative operation of the linking pixel detection unit 54 and the picture data setting unit 55 after decreasing, for example, the initial ink quantity $U_0$ of the pixel with the larger initial ink quantity $U_0$ and increasing the initial ink quantity $U_0$ of the pixel with the smaller initial ink quantity $U_0$ for taking into account the ink flow on the contour of the figure yet to be bled. Since the ink flows only gradually with lapse of time, the operation of decreasing or increasing the initial ink quantity $U_0$ by the controller 56 as described above is to be carried out gradually at the time of the iterative operation by linking pixel detection unit 54 and the picture data setting unit 55.

In the above-described embodiment, the setting of the ink density V and the luminance I by the picture data setting unit is carried out on the occasion of the iterative operations by the linking pixel detection unit 54 and the picture data setting unit 55. If, however, only the bled figure is displayed on the display device 5, it suffices if the ink density V and the luminance I on termination of ink diffusion by bleeding is known, so that it suffices to set the ink density V and the luminance I at the time of the last iterative operation by the linking pixel detection unit 54 and the picture data setting unit 55.

If only the bled figure is displayed on the display device 5, the routing of picture data from the picture data setting unit 55 to the display device 5 is performed on termination of the iteration of the operation of the linking pixel detection unit 54 and the picture data setting unit 55, that is after the end of formation of picture data by the bled figure drawing processor 50. However, if the manner of spreading apart of ink during bleeding from the figure yet to be bled is sequentially displayed on the display device 5, the picture data setting unit 55 sends the picture data to the display device 5 each time the operation of the linking pixel detection unit 54 and the picture data setting unit 55 is iterated, that is each time picture data is set in the picture data setting unit 5. That is, the picture data setting unit 55 routes the data of luminance I to the display device 5 for each iteration of the operations of the linking pixel detection unit 54 and the picture data setting unit 55 for sequentially displaying the figure derived from the luminance I on the display device 5. Thus the manner of gradual spreading apart of ink during bleeding from the figure yet to be bled may be sequentially displayed on the display device 5.

(5-3) Bled Figure Drawing processing

An illustrative operation of the bled figure drawing processor 50 is now explained. In the following description, the terms used in bled figure drawing and data used in the bled figure drawing processing are first explained and the operation of the bled figure drawing processor 50 is then explained by referring to a flowchart illustrating the operation.

(5-3-1) Terms Used in Bled Figure Drawing processing

In the following description, the pixels corresponding to the contour of a figure are termed "contour pixels". Bleeding is produced by diffusion of the ink from the contour pixels via the pixels interconnected by the capillary tubes. Among the contour pixels, the contour pixel from which originates the bleeding to a pixel $A_1$ lying on the downstream side along the path of ink diffusion, that is the contour pixel reached when the ink flow is followed retrogressively from the pixel $A_1$, is termed "the contour pixel from which originates the bleeding towards the pixel $A_1$", or "bleeding originating pixel with respect to the pixel P".

If, during bled figure drawing processing, two or more downstream side pixels interconnected by the capillary tubes with the pixel $A_1$ are found, the pixel $A_1$ is termed a "branching point pixel". Specifically, if two pixels $B_1$, $C_1$, on the downstream side of the pixel $A_1$ are detected as the pixels interconnected by the capillary tubes, the pixel $A_1$ is termed the branching point pixel.

If the ink flows to the pixel $A_1$, the branching point pixel which is reached when the ink flow path is followed retrogressively from the pixel $A_1$ and from which the ink flows in a direction other than the direction towards the pixel $A_1$, is termed "the ink flow branching point pixel with respect to the pixel $A_1$". A series of pixels interconnected by the capillary tubes and lying on an ink path from the pixel $A_1$ to the ink branching point pixel with respect to the pixel $A_1$, are termed "a series of pixels from the pixel $A_1$ t the ink flow branching point pixel". If, when the ink flow path is retrogressively followed from the pixel $A_1$, there exists no ink flow branching point pixel with respect to the pixel $A_1$, a series of pixels from the pixel $A_1$ to the bleeding originating contour pixel, interconnected by the capillary tube, are termed "a series of pixels from the pixel $A_1$ to the ink flow branching point pixel".

Figure 96:
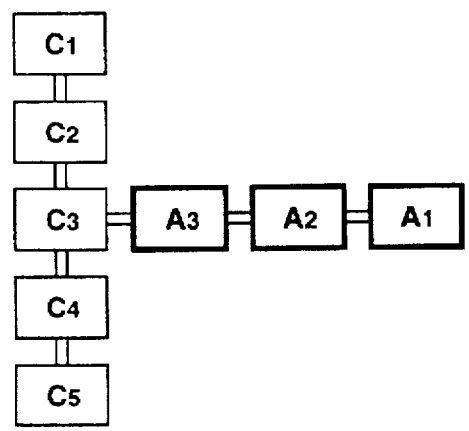
FIG. 96 is a diagrammatic view showing an example of a set of pixels from a pixel $A_i$ to an ink flow branching point pixel.

Thus, if there exist a series of pixels $A_1$, $A_2$ and $A_3$ interconnected by a capillary tube, and a series of pixels $C_1$, $C_2$ and $C_3$ interconnected by the capillary tube, the pixel $A_3$ is connected to the pixel $C_3$ by a capillary tube and the ink flows within the series of the pixels $C_1$ to $C_5$ interconnected by the capillary tube, as shown in FIG. 96, the pixel $C_3$ is the ink flow branching point pixel with respect to the ink flow branching point pixel, while the pixels $A_1$, $A_2$ and $A_3$ are the series of pixels from the pixel $A_1$ to the ink flow branching point pixel.

Figure 97:
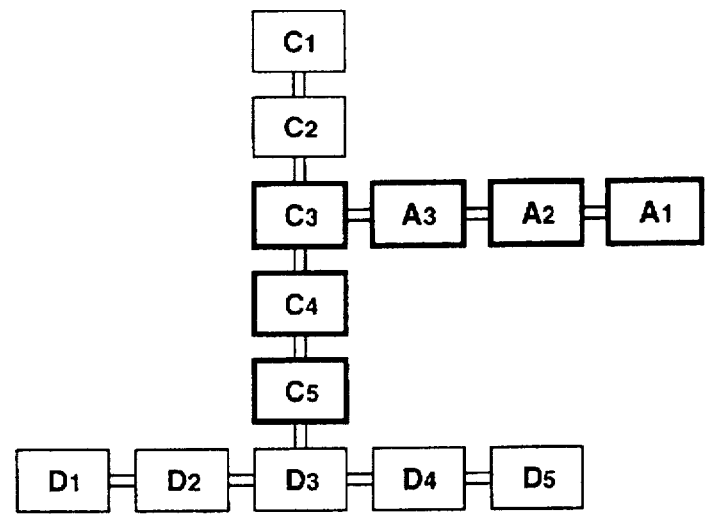
FIG. 97 is a diagrammatic view showing another example of a set of pixels from a pixel $A_i$ to an ink flow branching point pixel.

If there exist a series of pixels $A_1$, $A_2$ and $A_3$ interconnected by a capillary tube, a series of pixels $C_1$, $C_2$, $C_3$, $C_4$ and $C_5$ interconnected by a capillary tube, and a series of pixels $D_1$, $D_2$, $D_3$, $D_4$ and $D_5$ interconnected by a capillary tube, the pixel $A_3$ is connected to the pixel $C_3$ by a capillary tube, the pixel $C_5$ is connected to the pixel $D_3$ by a capillary tube, the ink flow in the pixels $C_1$ and $C_2$ ceases and the ink flows within the series of the pixels $D_1$ to $D_5$ interconnected by the capillary tube, as shown in FIG. 97, the pixel $D_3$ is the ink flow branching point pixel with respect to the pixel $A_1$, while the pixels $A_1$, $A_2$, $A_3$, $C_3$, $C_4$ and $C_5$ are the series of pixels from the pixel $A_1$ to the ink flow branching point pixel.

Figure 98:
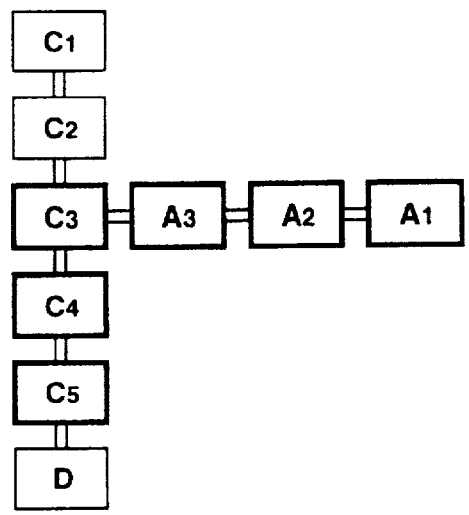
FIG. 98 is a diagrammatic view showing still another example of a set of pixels from a pixel $A_i$ to an ink flow branching point pixel.

Also, if there exist a series of pixels $A_1$, $A_2$ and $A_3$ interconnected by a capillary tube, a series of pixels $C_1$, $C_2$, $C_3$, $C_4$ and $C_5$ interconnected by the capillary tube and a bleeding originating contour pixel D, the pixel $A_3$ is connected to the pixel $C_3$ by a capillary tube and the pixel $C_5$ is connected to the bleeding originating contour pixel D by a capillary tube, with the ink not flowing through the pixels $C_1$ and $C_2$, as shown in FIG. 98, the pixels $A_1$, $A_2$, $A_3$, $C_3$, $C_4$ and $C_5$ are the series of pixels from the pixel $A_1$ to the ink flow branching point pixel.

(5-3-2) Data Employed in Bled Figure Drawing Processing

Figures 99, 100, 101:
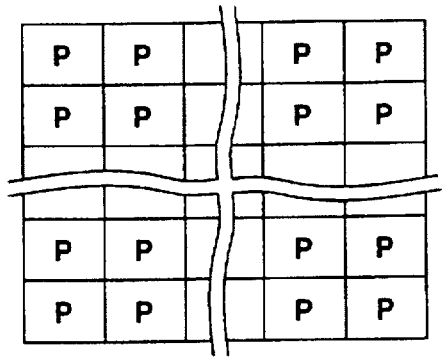
FIG. 99 is a diagrammatic view showing an example of an area for producing bleeding.
FIG. 100 is a diagrammatic view showing an illustrative construction of paper fiber structure data.
FIG. 101 is a diagrammatic view showing an illustrative data construction of contour data.
Figure 106:
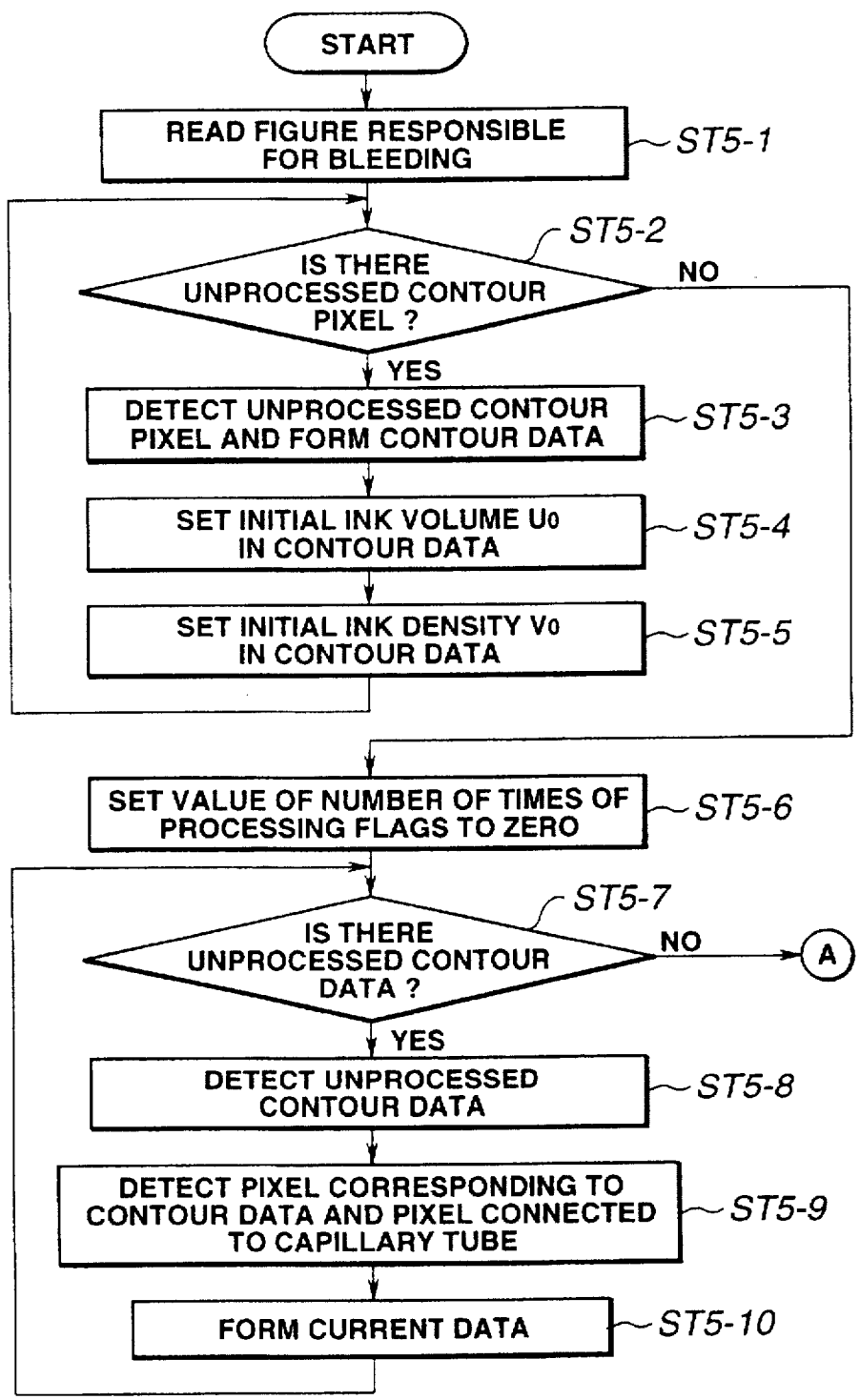
FIG. 106 is a flow chart for illustrating the operation of a bleeding processor.

In the following description, an area for drawing a bled figure is a planar area consisting of plural pixels P, as shown in FIG. 99. The paper fiber structure data employed has at least a number M of fibers and a number of capillary tubes $S_1$, $S_2$, $S_3$, $S_4$, $S_5$, $S_6$, $S_7$ and $S_8$, in association with respective pixels, as shown in FIG. 100.

The bleeding processing by the bled figure drawing processor 50 employs a number of times of processing flag for recording the number of times of processing, contour data set for correspondence to pixels on a contour of a figure (contour pixels) yet to be bled, current data set in association with respective pixels positioned at the forefront of bleeding diffusion at a given time point, next data set in association with respective pixels positioned at the forefront of the bleeding diffusion at a time point next to the time point when the current data is written, bled picture data set in association with respective pixels constituting an area for bled figure drawing and luminance data set in association with respective pixels constituting an area for drawing a bled figure.

The contour data is made up of contour pixel coordinate values, an initial ink quantity $U_0$ of each contour pixel and an initial ink density $V_0$ for the contour ink, as shown for example in FIG. 101. Each contour data has a contour data number.

The current data has a coordinate value of a pixel A at the forefront portion of bleeding diffusion at a given time point, referred to hereinafter as the current leading coordinate value, a coordinate value of a pixel neighboring to the pixel A and operating as an ink originating pixel for the pixel A, referred to hereinafter as the current bleeding originating coordinate value, a contour data number for the contour data for the bleeding originating contour pixel for the pixel A, and the status specifying the ink status in the pixel A, as shown for example in FIG. 102. Each current data has the current data number. Since the current data is the data for a pixel positioned at the foremost portion of bleeding diffusion at a given time point, the current data is sequentially rewritten with progress in the bleeding diffusion.

The next data has a coordinate value of a pixel B positioned at the foremost portion of the bleeding diffusion at a time point next to a time point when data is written in the current data, referred to hereinafter as the next leading coordinate value, a coordinate value of a pixel neighboring to the pixel B and operating as an ink originating pixel for the pixel B, referred to hereinafter as the next bleeding originating coordinate value, a contour data number for the contour data for the bleeding originating contour pixel for the pixel B, and the status specifying the ink status in the pixel B, as shown for example in FIG. 103. Each next data has the next data number. Since the next data is the data for a pixel positioned at the foremost portion of bleeding diffusion at a time point next to the time point when data is written at the current data, the current data is sequentially rewritten with progress in the bleeding diffusion.

Similarly to the paper fiber structure data, the bleeding picture data is associated with each pixel constituting an area for writing a bled figure. The bleeding picture data for a given pixel P has a status specifying the ink status at the pixel P, the number of steps specifying the number of times of processing required since the start of bleeding diffusion until inflow of the ink to the pixel P, the number of steps for ink flow stop specifying the number of times of processing required since the start of bleeding diffusion until the stop of the ink flow to the pixel P, a coordinate value of a pixel neighboring to the pixel P and operating as an ink flow originating pixel for the pixel P, referred to hereinafter as a bleeding originating coordinate value, a contour data number of contour data associated with the bleeding originating contour pixel for the pixel P, an absorbed ink quantity U specifying the quantity of the ink absorbed by the pixel P, and an ink density V specifying int density at the pixel P, as shown for example in FIG. 104.

In the statuses of the current data, next data and the bled picture data, "no ink" specifying the ink absent state as an initial value, "originating" specifying that the pixel P corresponds to a bleeding originating pixel, "flowing" specifying that the ink is flowing to and flowing through the pixel P, and "stop" specifying that the flow to the pixel has ceased, are set.

Similarly to the paper fiber structure data, luminance data corresponds to the pixels constituting an area for drawing a bled figure. The luminance picture data for the pixel P has luminance for the pixel P, as shown for example in FIG. 105.

(5-3-3) Operation of Bled Figure Drawing processor

An illustrative operation of the bed figure drawing processor 50 is now explained by referring to the flowchart of FIGS. 106 to 110.

First, at step ST5-1, picture data of a figure to be bled, for example, picture data formed by the blurred figure drawing processor 40, is read from, for example, the memory 3 or the external storage device 4. The contour pixel detection unit 51 sets the status of bled picture data corresponding to all pixels on the figure to be bled to "originating" based upon picture data of the figure to be bled. The processing then transfers to step ST5-2.

At step ST5-2, the contour pixel detection unit 51 judges whether or not there exists any contour pixel not processed by steps ST5-3 to 5-5. If there is any such pixel (YES), processing transfers to step ST5-3 and, if otherwise (NO), processing transfers to step ST5-56.

At step ST5-3, the contour pixel detection unit 51 detects a contour pixel not processed by steps ST5-3 to 5-5, and forms contour data for the contour pixel. The contour pixel detection unit 51 affixes a contour data number to each contour data, while forming contour data using the coordinate values of the contour pixels as the contour coordinate values.

At step ST5-4, the initial ink quantity setting unit 52 sets an initial ink quantity $U_0$ in the contour data formed at step ST5-3.

At step ST5-5, the initial ink density setting unit 53 sets an initial ink density $V_0$ in the contour data formed at step ST5-3. After step ST5-5, the processing reverts to step ST5-2 to repeat the processing.

By repetition of the steps ST5-2 to ST5-5, contour data corresponding to the contour pixels is formed with a unique contour data number being affixed to each contour data. These contour data may be pre-set in picture data of the figure to be bled such that the bled figure processor 50 simply reads the pre-set contour data without performing the processing by the steps ST5-2 to ST5-5.

At step ST55-6, the controller 56 sets the value of the number of times of processing flag f to 0.

At step ST5-7, the linking pixel detection unit 54 judges whether or not there is any contour data not processed by steps ST5-8 to ST5-10. If there is any such pixel (YES), the processing transfers to step ST5-8 and, if otherwise (NO), the processing transfers to step ST5-11 shown in FIG. 107.

At step ST5-8, the linking pixel detection unit 54 detects a contour data not processed by steps ST5-9 to ST5-10. The contour data detected by this step ST5-8 is referred to hereinafter as "contour data to be processed", while the pixel corresponding to the contour data to be processed is referred to as "contour pixel to be processed". The processing then transfers to step ST5-9.

At step ST5-9, the linking pixel detection unit 54 refers to the paper fiber structure data in order to detect a pixel interconnected to the contour pixel to be processed by a capillary tube. The pixels to be detected are pixels neighboring to the contour pixel being processed, with the number of the detected pixels being 0 to 8. The pixels for which the bleeding data has the status "originating", that is pixels on or inside of the contour of the figure yet to be bled, are not detected. The number of pixels to be detected is eight when there is only one contour pixel. Usually, the number of pixels to be detected is 0 to 7.

At step ST5-10, the linking pixel detection unit 54 forms current data associated with the pixel detected at step ST5-9. Specifically, the linking pixel detection unit 54 forms the current data, with the current data number affixed thereto, so that the status is "flowing", the coordinate value of a pixel detected at step ST5-59 is a leading coordinate value, the coordinate value of a contour pixel of contour data to be processed is an ink flow originating coordinate value and the contour data number affixed to the contour data to be processed is the contour data number. Since the number of the pixels detected at step ST5-9 is 0 to 8, the number of current data formed at step ST5-10 is not limited to 1 but ranges from 0 to 8. The number of pixels detected by step ST5-10 is likely to become eight when there is only one contour data. The number of the current data formed at step ST5-10 is usually 0 to 7. After step ST5-10, the processing reverts to step ST5-7 in order to repeat the processing.

By repetition of the steps ST5-7 to ST5-10, the initial current data is formed with a unique current data number being affixed to each current data.

Figure 107:
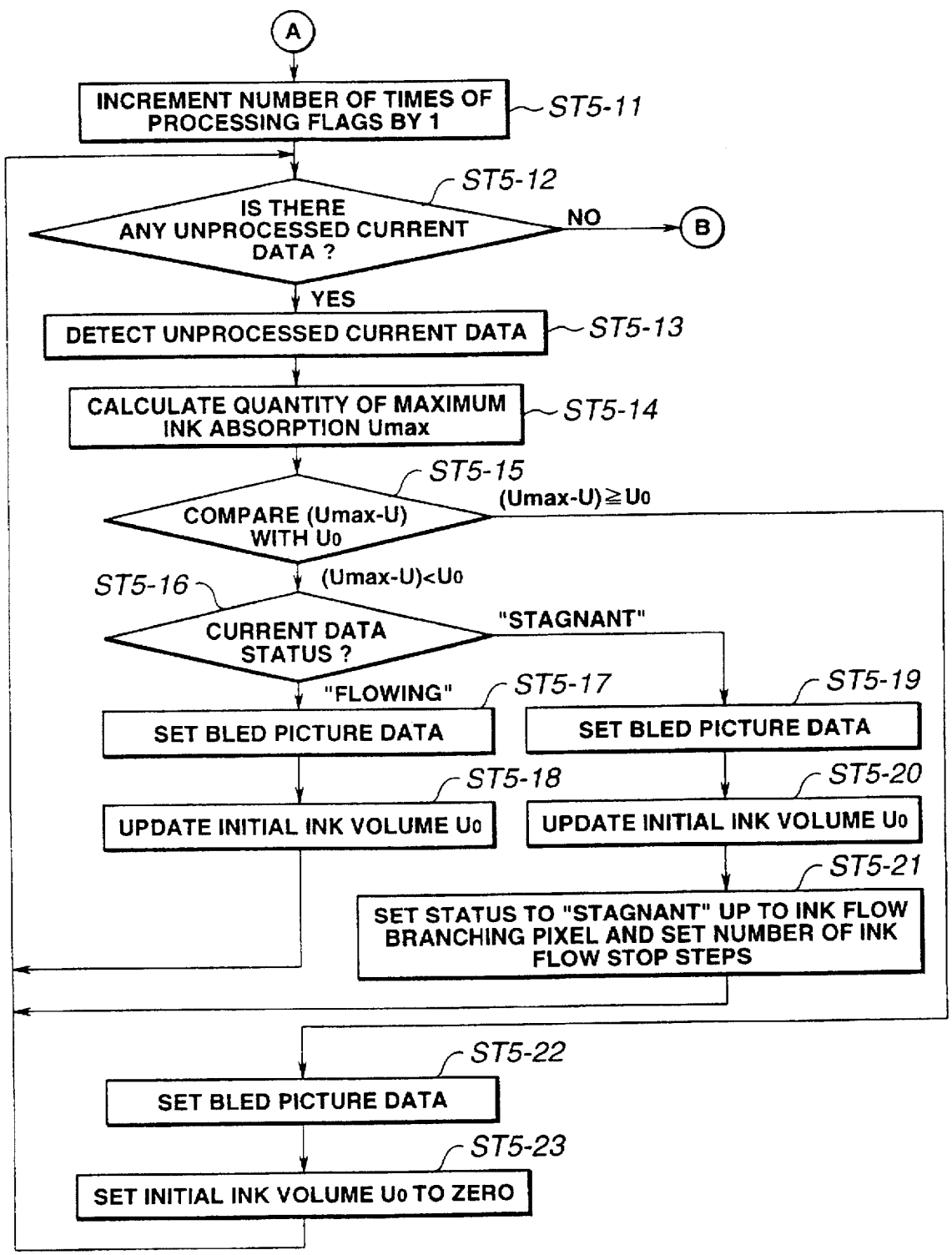
FIG. 107 is a flow chart showing the continuation of the flowchart shown in FIG. 106.

At step ST5-11, shown in FIG. 107, the controller 56 increments the value of the number of times of processing flag f by 1.

At step ST5-12, the picture data setting unit 55 judges whether or not there is any current data not processed by steps ST5-13 to ST5-27. If there is any such current data (YES), the processing transfers to step ST5-13 and, if otherwise (NO), the processing transfers to step ST5-24 shown in FIG. 108.

At step ST5-13, the picture data setting unit 55 detects a contour data not processed by steps ST5-14 to ST5-27. The current data detected by this step ST5-13 is referred to hereinafter as "current data to be processed", while the pixel corresponding to the current data to be processed is referred to as "current pixel to be processed". The processing then transfers to step ST5-14 .

At step ST5-14, the picture data setting unit 55 calculates the maximum absorbed ink quantity Umax of the current pixel to be processed. The processing then transfers to step ST5-15.

At step ST5-15, the picture data setting unit 55 judges, based upon the maximum absorbed ink quantity Umax, calculated at step ST5-14, the absorbed ink quantity U set in the bled picture data corresponding to the current pixel to be processed, and the initial ink quantity $U_0$ of the contour data corresponding to the contour data number of the current data to be processed, whether the ink flows in a quantity exceeding the ink quantity absorbable by the pixel or in a quantity not exceeding the ink quantity absorbable by the pixel. Thus the picture data setting unit 55 transfers to step ST5-16 and to step ST5-22 for (Umax−U)<$U_0$ and for (Umax−U9)≧$U_0$, respectively. If the absorbed ink quantity U is not set in the bled picture data corresponding to the current pixels to be processed, the value of the absorbed ink quantity U is set to 0.

At step ST5-16, the picture data setting unit 55 refers to the status of the current data to be processed. If the status of the current data to be processed is "flowing", the processing transfers to step ST5-17 and, if the status of the current data to be processed is "stop", the processing transfers to step ST5-19.

At step ST5-17, the picture data setting unit 55 sets bled picture data corresponding to the current pixel to be processed. Specifically, the picture data setting unit 55 sets the bled picture data by setting the status, the value of the flag f, the ink flow originating coordinate value of the current data to be processed, the contour data number of the current data to be processed, and the maximum absorbed ink quantity Umax calculated at step ST5-14 less the current absorbed ink quantity of the bled picture data U (Umax−U) to "flowing", the number of steps, the ink flow originating coordinate value, contour data number and to a new absorbed ink quantity U, respectively.

Then, at step ST5-18, the controller 56 sets the current initial ink quantity $U_0$ of the contour data corresponding to the contour data number of the current data to be processed less a value obtained on subtracting the current absorbed ink quantity U of the bled picture data from the maximum absorbed ink quantity Umax calculated by step ST5-14 (Umax−U), or ($U_0$−Umax+U), as the new initial ink quantity $U_0$ of contour data corresponding to the contour data number of the current data to be processed. After step ST5-18, processing reverts to step ST5-12 to repeat the processing.

At step ST5-19, the picture data setting unit 55 sets bled picture data corresponding to the current pixel to be processed. The picture data setting unit 55 sets the status, the value of the flag f, the ink flow originating coordinate value of the current data to be processed, the contour data number of the current data to be processed, and sum of the initial ink quantity $U_0$ of the contour data corresponding to the contour data number of the current data to be processed and the current absorbed ink quantity U of the bled picture data $(U_0+U)$, to "stop", the number of steps, the ink flow originating coordinate value, the contour data number and a new absorbed ink quantity U, respectively.

At step ST5-20, as at step ST5-18, the controller 56 sets the current initial ink quantity $U_0$ of the contour data corresponding to the contour data number of the current data to be processed less a value obtained on subtracting the current absorbed ink quantity U of the bled picture data from the maximum absorbed ink quantity Umax calculated by step ST5-14 (Umax–U), that is ($U_0$–Umax+U), as the new initial ink quantity $U_0$ of contour data corresponding to the contour data number of the current data to be processed.

At step ST5-21, the picture data setting unit 55 sets the statuses of all bled picture data corresponding to a set of pixels from the current pixel to be processed to the ink flow branching point pixel to "stop", while setting the value of the flag f to the number of ink flow stop steps. After step ST5-21, the processing reverts to step ST5-12 to repeat the processing.

At step ST5-22, the picture data setting unit 55 sets bled picture data corresponding to the current pixel to be processed. The picture data setting unit 55 sets the status, the value of the flag f, the ink flow originating coordinate value of the current data to be processed, the contour data number of the current data to be processed, and sum of the initial ink quantity $U_0$ of the contour data corresponding to the contour data number of the current data to be processed and the current absorbed ink quantity U of the bled picture data $(U_0+U)$, to "flowing", the number of steps, the ink flow originating coordinate value, the contour data number and a new absorbed ink quantity U, respectively.

At step ST5-23, the controller 56 sets the value of the initial ink quantity $U_0$ of the contour data corresponding to the contour data number of the current data to be processed to 0. After step ST5-23, the processing reverts to step ST5-12 to repeat the processing.

By repetition of the steps ST5-12 to ST5-23, bled picture data are set on the pixels to which the ink flowed due to bleeding.

Figure 108:
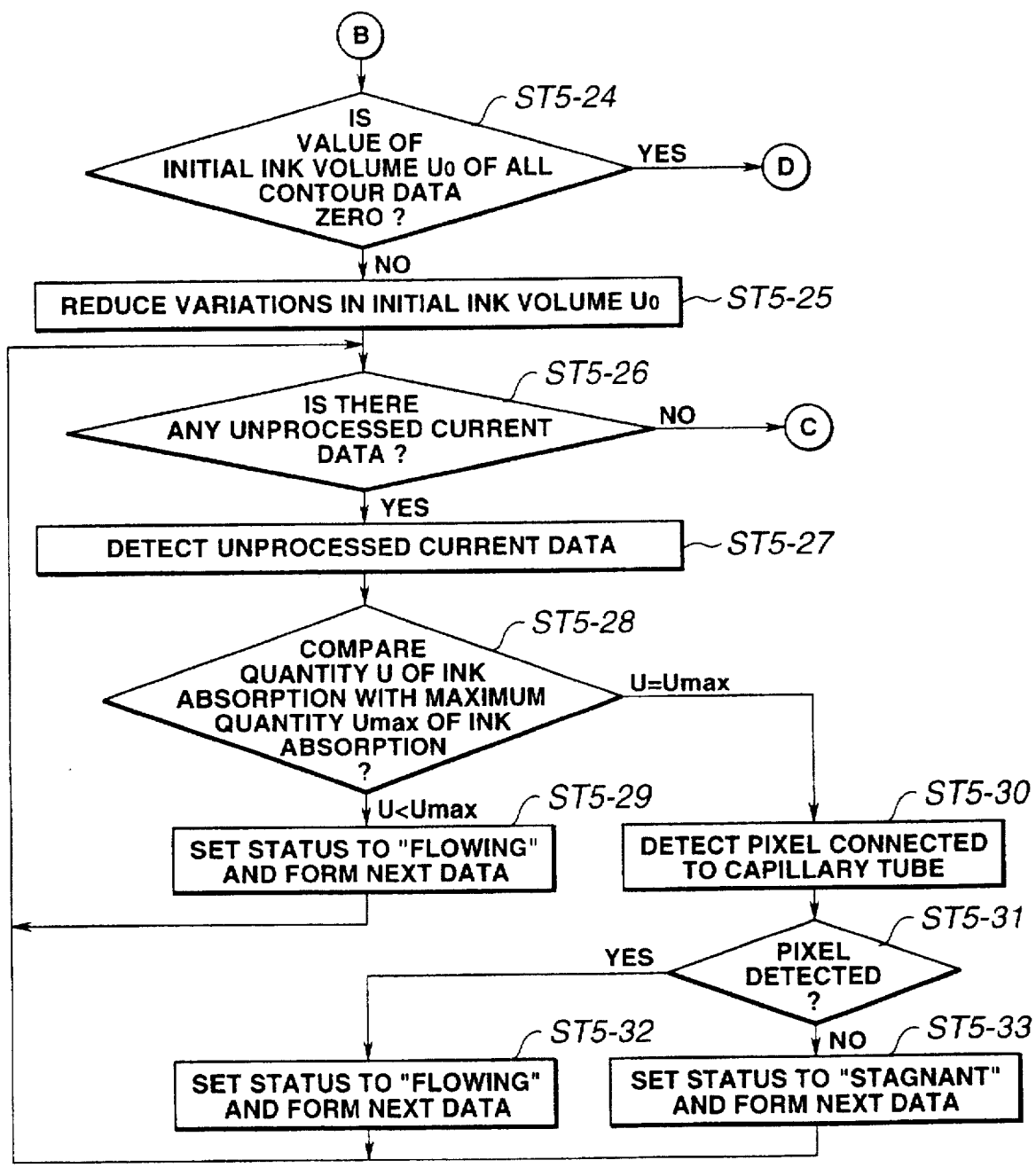
FIG. 108 is a flowchart showing the continuation of the flowcharts shown in FIGS. 106 and 107.

At step ST5-24, shown in FIG. 108, the controller 56 refers to the value of the initial ink quantity $U_0$ of the contour data. If there is still the contour data exceeding the value of the initial ink quantity $U_0$ (NO), the processing transfers to step ST5-25. If the value of the initial ink quantity $U_0$ of all contour data is not more than 0 (YES), the processing transfers to step ST5-38 shown in FIG. 110.

At step ST5-25, the controller 56 diminishes fluctuations in the value of the initial ink quantity $U_0$ of the contour data in order to take into account the ink flow within the contour pixels. That is, if the value of the initial ink quantity $U_0$ of the contour data differs between two neighboring contour pixels, the controller 56 manages control for decreasing the value of the initial ink quantity $U_0$ of the contour data having a larger value of the initial ink quantity $U_0$ and for increasing the value of the initial ink quantity $U_0$ of the contour data having a smaller value of the initial ink quantity $U_0$. In decreasing the initial ink quantity $U_0$, the minimum value of the ink quantity $U_0$ is set to 0.

At step ST5-26, the linking pixel detection unit 54 judges whether there is any current data not processed by steps ST5-27 to ST5-33. If there is such current data (YES), the processing transfers to step ST5-27. If there is no such current data (No), the processing transfers to step ST5-34 shown in FIG. 109.

At step ST5-27, the linking pixel detection unit 54 detects a current data not processed with steps ST5-28 to ST5-33. The processing then transfers to step ST5-28.

At step ST5-28, the linking pixel detection unit 54 refers to the bled picture data set in the pixel corresponding to the current data detected at step ST5-27, in order to compare the absorbed ink quantity U of the bled picture data to the maximum absorbed ink quantity Umax in the pixel. If the ink can be further absorbed, that is if U<Umax, the processing transfers to step ST5-29. If the ink cannot be further absorbed, that is if U=Umax, the processing transfers to step ST5-30.

At step ST5-29, the linking pixel detection unit 54 forms next data based upon the assumption that the pixel corresponding to the current data detected at step ST5-27 is at the forefront portion of the bleeding diffusion. Specifically, the linking pixel detection unit 54 forms the next data, with the next data number affixed thereto, by setting the status, the current coordinate value of the current data detected at step ST5-27 and the current ink flow originating coordinate value of the current data detected at step ST5-27 to "flowing", the next leading coordinate value of the next data, and to the next ink flow originating coordinate value for next data, respectively. After step ST5-29, the processing reverts to step ST5-26 to repeat the processing.

At step ST5-30, the linking pixel detection unit 54 refers to the paper fiber structure data in order to detect the pixel linked via the capillary tube to the pixel corresponding to the current data detected at step ST5-27. The processing the transfers to step ST5-31. The pixels to be detected are seven pixels, specifically, the pixels neighboring to the pixel corresponding to the current data detected by the step ST5-27, excepting the pixel from which the ink flow to the pixel under consideration originated. The number of the pixels detected at step ST5-30 is 0 to 7. However, the pixels whose bled picture data has the status "originating", that is pixels on and inside of the contour of the figure from which originates the bleeding, and the pixels whose bled picture data has the status "flowing" or "stop", that is the pixels to which the ink flowed previously, are excluded from detection.

At step ST5-31, the linking pixel detection unit 54 judges whether or not the pixels have been detected at step ST5-30. If the pixels have been detected (YES), the processing transfers to step ST5-32. If the pixels have not been detected (NO), the processing transfers to step ST5-33.

At step ST5-32, the linking pixel detection unit 54 forms next data, corresponding to the pixel detected at step ST5-30, based upon the assumption that the ink flow is continuing. Specifically, the linking pixel detection unit 54 forms the next data, with the next data number affixed thereto, by setting the status, the coordinate value of the pixel detected at step ST5-30, the current leading coordinate value of the current data detected at step ST5-27 and the contour data number of the current data detected at step ST5-27, to "flowing", next leading coordinate value, next ink flow originating coordinate value and to the contour data number, respectively. Since 0 to 7 pixels are detected at step ST5-30, the number of the next data to be formed at step ST5-32 is not limited to 1, but may range from 0 to 7. After the step ST5-32, the processing reverts to step ST5-26 to repeat the processing.

At step ST5-33, the linking pixel detection unit 54 forms next data based on the assumption that the ink flow has ceased. Specifically, the linking pixel detection unit 54 forms the next data, with the next data number affixed thereto, by setting the status, the coordinate value of the current data detected at step ST5-27, the current ink flow originating coordinate value of the current data detected at step ST5-27 and the contour data number of the current data detected at step ST5-27, to "stop", next leading coordinate value, next ink flow originating coordinate value and to the contour data number, respectively. After the step ST5-33, the processing reverts to step ST5-26 to repeat the processing.

By the repetition of the steps ST5-26 to 5-33, the next data, which is data concerning the pixel positioned at the forefront of bleeding diffusion at a time point next following a time point when data is written in the current data, is formed, with the next data number proper to each next data affixed thereto.

Figure 109:
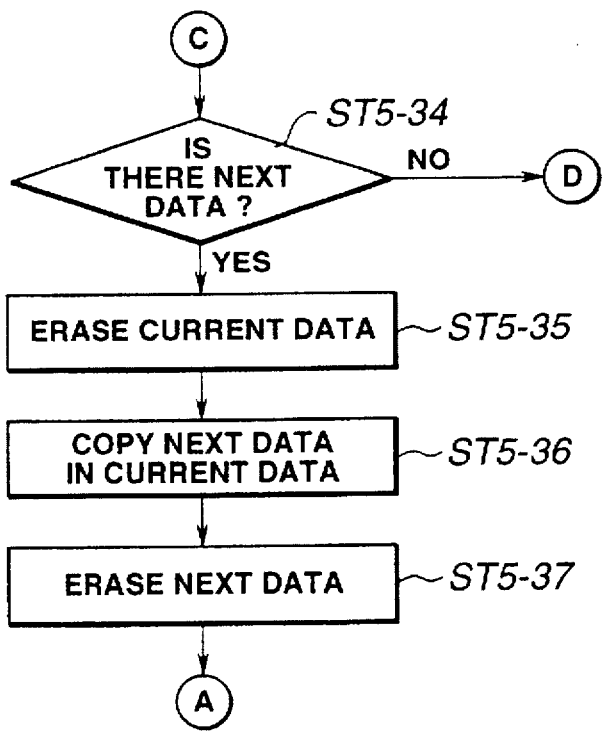
FIG. 109 is a flow chart showing the continuation of the flowcharts shown in FIGS. 106 to 109.
Figure 110:
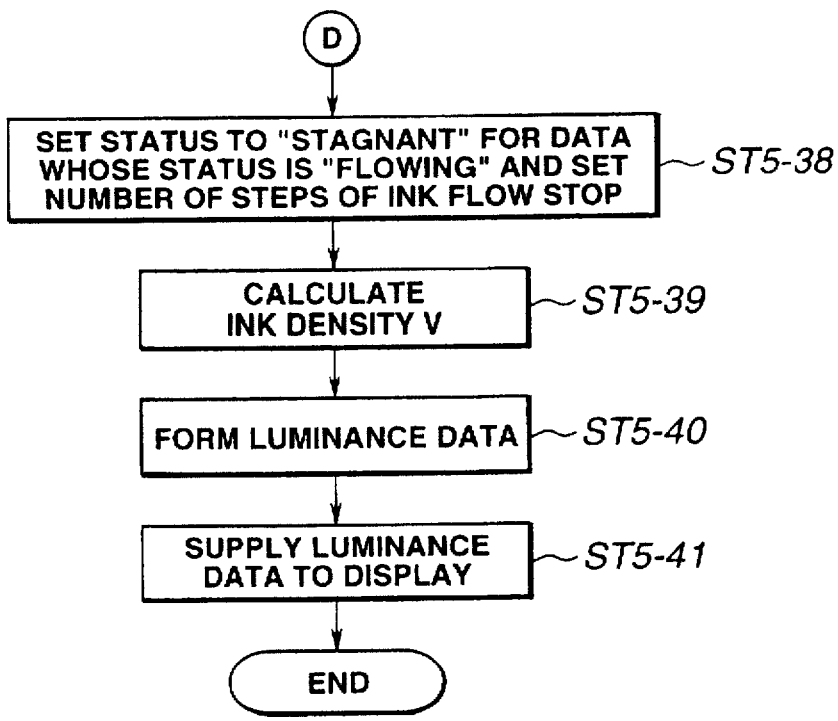
FIG. 110 is a flow chart showing the continuation of the flowcharts shown in FIGS. 106 to 110.

At step ST5-34, shown in FIG. 109, the linking pixel detection unit 54 judges whether or not there is the next data. The presence or absence of the next data specifies the continuation and end of the bleeding diffusion, respectively. If there is the next data (YES), the processing transfers to step ST5-35 and, if otherwise (NO), the processing transfers to step ST5-38.

At steps ST5-35 to ST5-37, the linking pixel detection unit 54 copies next data in the current data to update the forefront portion of the bleeding diffusion. That is, at step ST5-35, the linking pixel detection unit 54 erases al current data. Then, at step ST5-36, the linking pixel detection unit 54 directly copies all current next data in the current data. At step ST5-37, the linking pixel detection unit 54 erases all current next data. After step ST5-37, the linking pixel detection unit 54 transfers to step ST5-11 to repeat the setting of the bled picture data.

On the other hand, at step ST5-38, the picture data setting unit 55 sets the bled picture data based on the assumption that the bleeding diffusion has ceased. That is, the picture data setting unit 55 sets the status of the bled picture data, whose status is previously set to "flowing", to "stop", while setting the number of ink flow stop steps to the value of the flag f.

Then, at step ST5-39, the picture data setting unit 55 calculates the ink density V of a pixel to which flowed the ink, that is a pixel whose bled picture data has the status "stop", based upon the number of ink flow stop steps and the number of steps of the bled picture data of the pixel, and sets the calculated value of the ink density as the ink density V of the bled picture data. Specifically, the picture data setting unit 55 previously calculates the ink density V(x, t) for x and t being an integer of not less than 0, for setting as a two-dimensional array of x and t, in accordance with the equations (5-8) to (5-10). The picture data setting unit 55 refers to the ink density V(x, t) thus set as the two-dimensional array in order to find the ink density V. That is, the picture data setting unit 55 refers to the ink density V(x, t) set as a two-dimensional array, with the number of steps and the number of steps of ink flow stop being x and t, respectively, for finding the ink density at each pixel.

At step ST5-40, the picture data setting unit 55 calculates the luminance value for each pixel, based upon the bled picture data set for each pixel, for setting luminance data. The luminance value of a pixel to which flowed the ink, that is a pixel whose bled picture data has a status "stop", is calculated by multiplying the absorbed ink quantity U at the pixel with the ink density. For calculating the luminance value, the luminance value may be multiplied with a suitable coefficient for normalization. The luminance value of a pixel on a figure yet to be bled, that is a pixel whose bled picture data has the status "originating", is set to a maximum value within the gamut of the luminance value, while the luminance value of a pixel to which no ink flowed, that is a pixel whose bled picture data has the status "stop", is set to "originating", is set to a maximum value within the gamut of the luminance value. It is assumed in the foregoing that the larger the luminance value, the greater become the ink quantity and ink density. However, the processing may naturally be performed on the assumption that the smaller the luminance value, the greater become the ink quantity and ink density.

At step ST5-41, the bled picture drawing unit 50 routes the luminance data set for each pixel at step ST5-40 to the display device 5. Based upon the luminance data, the display device 5 displays the bled figure on the display device 5.

In the above-described bled figure drawing processing, the bled picture data is set on the assumption that no ink flows from a pixel to a given pixel to which the ink previously flowed from another pixel. That is, when detecting the pixel connected by a capillary tube at step ST5-30, any pixel to which the ink previously flowed, that is a pixel the status of the bled picture data of which is "flowing" or "stopped", is excluded from detection.

In effect, however, ink particles are likely to be diffused to a pixel, to which the ink previously flowed from a given pixel, from another pixel interconnected to the pixel by a capillary tube.

Thus the bled picture data may be set on the assumption that, if one or more pixels connected by capillary tubes to the pixel P to which the ink previously flowed exist besides the pixel from which originated the ink flow to the pixel P, and the ink previously flowed to such one or more pixels interconnected by the capillary tubes to the pixel P, that is if the ink flow at the pixel P collides with the ink flow at the one or more pixels connected to the pixel P by the capillary tubes, ink particles become diffused between the pixel P and the one or more pixels, and hence need to be taken into account in setting the bled picture data.

Figure 111:
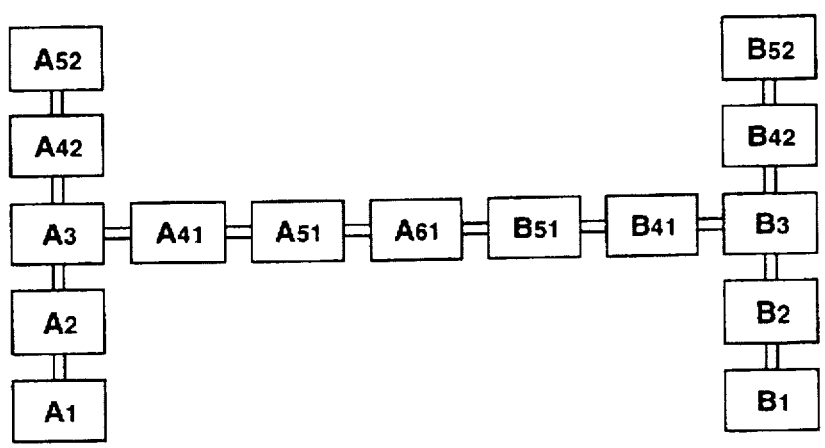
FIG. 111 is a diagrammatic view showing the method for setting bled picture data in consideration of diffusion of ink particles on ink flow collision.

The method for setting the bled picture data for taking into account the diffusion of the ink particles in case of such collision of the ink flows is now explained by referring to FIG. 111.

In an embodiment shown in FIG. 111, there exist a series of pixels $A_1$, $A_2$, $A_{31}$, $A_{42}$, $A_{52}$ interconnected by a capillary tube, a series of pixels $B_1$, $B_2$, $B_3$, $B_{42}$, $B_{52}$ interconnected by a capillary tube, and a series of pixels $A_{41}$, $A_{51}$, $A_{61}$, $B_{51}$, $B_{41}$ interconnected by a capillary tube, the pixels $A_3$ is connected by a capillary tube to the pixel $A_{41}$ and the pixel $A_3$ is connected to the pixel $B_{41}$, the ink flows through the pixels $A_1$, $A_2$, $A_{31}$, $A_{42}$, $A_{52}$, in this order, as a first ink flow, this ink flow is branched at the pixel $A_3$ to flow towards the pixels $A_{41}$, $A_{51}$, $A_{61}$, the ink also flows through the pixels $B_1$, $B_2$, $B_{31}$, $B_{42}$, $B_{52}$, in this order, as a second ink flow and the ink flow is branched at the pixel $B_3$ to flow towards the pixels $B_{51}$ and $B_{41}$.

In such case, the ink flowing to the pixel $A_{61}$ collides against the ink flowing to the pixel $B_{51}$. For setting the bled picture data for respective pixels in such case, it suffices to compare the pressure of the ink flow at a pixel at the branching point to the pixel $A_{61}$, that is at the pixel $A_3$, to the pressure of the ink flow at a pixel at the branching point to the pixel $B_{51}$, that is at the pixel $B_3$, and to assume that, if the two pressures are equal to each other, there is produced no ink particle diffusion, whereas, if the two pressures are not equal to each other, diffusion between the two particles is continuing.

Since the pressures of the two ink flows at two pixels are larger at the initial stage of bleeding diffusion and become smaller as the bleeding diffusion progresses, it suffices to compare the number of steps as set in the bled picture data for the pixel $A_3$ and the number of steps as set in the bled picture data for the pixel $B_3$ for comparing the ink flow pressures at the two pixels.

If the number of steps as set in the bled picture data for the pixel $A_3$ and the number of steps as set in the bled picture data for the pixel $B_3$ are equal to each other, no diffusion of the ink particles occurs at the pixels $A_{41}$, $A_{51}$, $A_{61}$, $B_{51}$, $B_{41}$. Thus, for these pixels $A_{41}$, $A_{51}$, $A_{61}$, $B_{51}$, $B_{41}$, bled picture data are set in accordance with the above-described flowchart.

Conversely, if the number of steps as set in the bled picture data for the pixel $A_3$ is smaller than the number of steps as set in the bled picture data for the pixel $B_3$, diffusion of the ink particles occurs at the pixels $A_{41}$, $A_{51}$, $A_{61}$, $B_{51}$, $B_{41}$ in a direction of from the pixel $A_{41}$ to the pixel $B_{41}$ until the first ink flow ceases. Thus, for the number of ink flow stop steps for the bled picture data of these pixels $A_{41}$, $A_{51}$, $A_{61}$, $B_{51}$, $B_{41}$, the same value as that of the number of the ink flow stop steps for the pixel $A_3$, which is the ink flow branching point pixel for these pixels, is set.

On the other hand, if the number of steps as set in the bled picture data for the pixel $B_3$ is smaller than the number of steps as set in the bled picture data for the pixel $A_3$, diffusion of the ink particles occurs at the pixels $A_{41}$, $A_{51}$, $A_{61}$, $B_{51}$, $B_{41}$ in a direction of from the pixel $B_{41}$ to the pixel $A_{41}$ until the second ink flow ceases. Thus, for the number of ink flow stop steps for the bled picture data of these pixels $A_{41}$, $A_{51}$, $A_{61}$, $B_{51}$, $B_{41}$, the same value as that of the number of the ink flow stop steps for the pixel $A_3$, which is the ink flow branching point pixel for these pixels, is set.

Thus the bled picture data may be set with the diffusion of ink particles in case of collision of different ink streams taken int consideration.

Although the example of two ink streams from two directions has been described in the foregoing, the number of ink flow stop steps for bled picture data in case of collision of three ink streams from three different directions may similarly be set by comparing the number of steps of the bled picture data as set in the ink flow branching point pixels with respect to the pixel at which the ink flow collision has occurred.

(6) Figure Display Example

Figure 112:
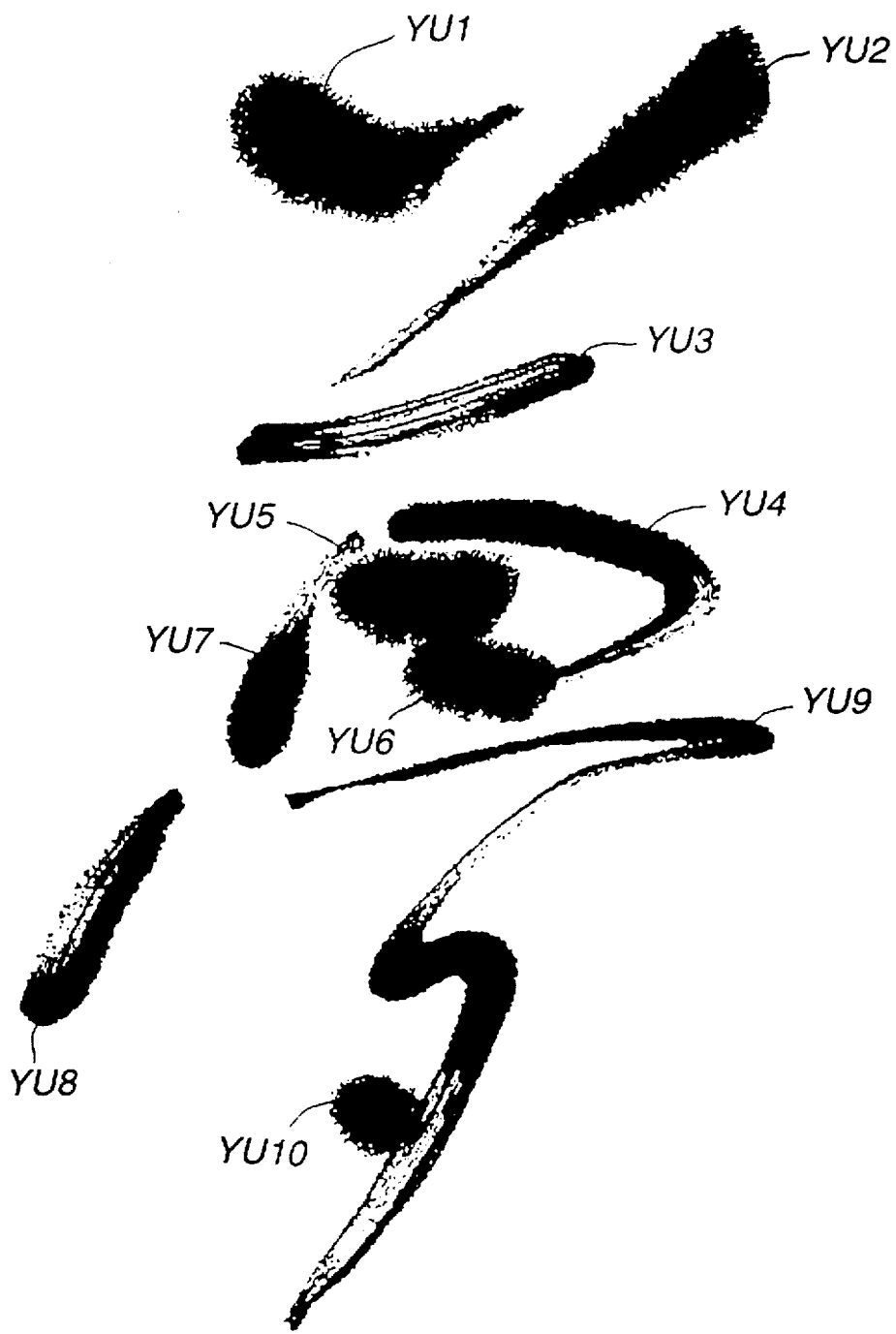
FIG. 112 illustrates an example of a character presenting both blurring and bleeding.

FIG. 112 shows an example in which a Japanese kanji character reading "yume" (meaning "dream"), made up of ten strokes YU1 to YU10, as an example of a blurred and bled figure, is actually displayed in the above-described picture display system.

In the example shown in FIG. 112, the paper fiber structure data forming processor 30 forms paper fiber structure data, while the kanji character "yume" is formed by the font forming processor 30. The font reading "yume" is made up of ten stroke data corresponding to the ten stroke data YU1 to YU10.

The paper fiber structure data formed by the paper fiber structure data forming processor 30 and the font reading "yume" formed by the font forming processor 20 are read into the blurred figure drawing processor 40 which then performs blurred figure drawing processing on the respective strokes YU1 to YU10 on the kanji character based upon these paper fiber structure data and the font of the kanji character in order to set the ink quantity and ink density in the strokes YU1 to YU10 at a time point of drawing of the respective strokes YU1 to YU10.

The ink density and the ink quantity of the writing brush data, which are data representing the state of the writing brush at the time point of writing the respective strokes YU1 to YU10, are assumed to be the same at all points on the writing brush. The ink quantity and the ink density of the writing brush data, associated with the strokes YU1 to YU10, are set as shown in Table 5.

TABLE 5

| strokes | writing brush data | |
|---|---|---|
| | ink quantity | ink density |
| YU1 | 0.50 | 0.45 |
| YU2 | 0.43 | 0.45 |
| YU3 | 0.10 | 0.45 |
| YU4 | 0.15 | 0.45 |
| YU5 | 0.47 | 0.45 |
| YU6 | 0.47 | 0.45 |
| YU7 | 0.15 | 0.45 |
| YU8 | 0.15 | 0.45 |
| YU9 | 0.10 | 0.45 |
| YU10 | 0.30 | 0.45 |

The blurring parameters for the strokes YU1 to YU10 were set as shown in Table 6.

TABLE 6

| strokes | | $c_1$ | $c_2$ | $c_3$ | $c_4$ | $c_5$ | $c_6$ | $c_7$ |
|---|---|---|---|---|---|---|---|---|
| YU1 | no blurred area | 1.00 | 1.00 | 1.00 | 1.00 | 1.00 | 1.00 | 1.00 |
| YU2 | first blurred area | 0.56 | 0.70 | 0.00 | 1½₈ | 0.07 | ⅟₁₀ | 1.00 |
| | second blurred area | ⅘ | 1.00 | 0.00 | ½ | 0.00 | ⅟₁₀ | 0.29 |
| YU3 | first blurred area | ⅓ | 0.63 | 0.00 | 1.00 | 0.13 | ⅙ | ⅓ |
| | second blurred area | ⅔ | 0.76 | 0.00 | ½ | 0.13 | 0.13 | 0.4 |
| YU4 | first blurred area | 0.56 | 0.70 | 0.00 | 1½₈ | 0.07 | ⅟₁₀ | 1.00 |
| | second blurred area | ⅘ | 1.00 | 1.00 | ½ | 0.00 | ⅟₁₀ | 0.29 |
| YU5 | no blurred area | 1.00 | 1.00 | 1.00 | 1.00 | 1.00 | 1.00 | 1.00 |
| YU6 | no blurred area | 1.00 | 1.00 | 1.00 | 1.00 | 1.00 | 1.00 | 1.00 |
| YU7 | first blurred area | 0.17 | ⅓ | 0.00 | 1.00 | 0.13 | 0.13 | 0.86 |
| YU8 | first blurred area | 0.23 | 0.83 | 0.00 | ⅓ | ⅙ | ⅙ | 0.42 |
| | second blurred area | 0.43 | 0.76 | 0.00 | ½ | ⅟₁₀ | 0.13 | 0.38 |
| YU9 | first blurred area | 0.44 | 0.60 | 0.00 | 5/6 | 0.07 | 0.10 | 1.00 |
| | second blurred area | 9/10 | 1.00 | 0.00 | ⅟₁₅ | 0.00 | 0.13 | 1.00 |
| YU10 | no blurred area | 1.00 | 1.00 | 1.00 | 1.00 | 1.00 | 1.00 | 1.00 |

The paper fiber structure data, formed by the paper fiber structure data forming processor 30, and the ink quantity and the ink density in the strokes YU1 to YU10, as set in the blurred figure drawing processor 40, were read into the bled figure processor 50. The bled figure processor 50 performs bled figure processing on the respective strokes YU1 to YU10 of the kanji character for producing bleeding around the strokes YU1 to YU10 for drawing the kanji character reading "yume" which is blurred and bled, as shown in FIG. 112.

Thus it becomes possible with the picture display system of the present invention to express blurring and bleeding which appear as if the character were actually written with a writing brush.

Figure 113:
FIG. 113 illustrates the contour of a figure prior to antialiasing processing.

Meanwhile, it may occur that, when the figure is enlarged and displayed on the display device, the figure contour becomes jagged, as shown in FIG. 113. Thus, in computer graphics, antialiasing is carried out for smoothing the figure contour for displaying the smoothed figure on the display device.

Figure 114:
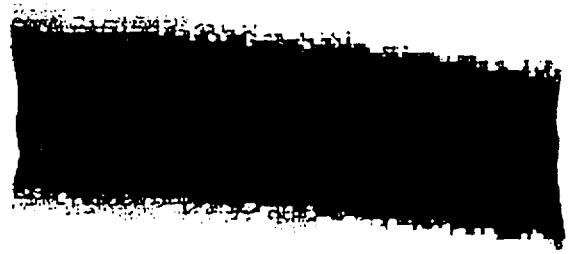
FIG. 114 illustrates the contour of a figure produced by antialiasing by bleeding processing.

The above-described bled figure drawing processing is also effective as such antialiasing processing. That is, by processing the vicinity of the contour potion with bled figure drawing processing, the figure contour may be smoothed, as shown in FIG. 114. In addition, with the antialiasing processing, employing the bled figure drawing processing, the figure contour may be displayed on the display device so that the figure will appear more like a figure actually drawn with a writing brush than a figure drawn with antialiasing capable only of smoothing the figure contour. The reason is that the contour of the figure actually drawn with the writing brush is not perfectly smooth but undergoes some bleeding.

What is claimed is:

1. A method for generating data that models a paper fiber structure, comprising the steps of:

generating fiber data that describes one of the fibers making up a paper sheet;

arraying a plurality of said fiber data in an area formed by a plurality of pixels to generate fiber distribution data that represents the distribution of said plurality of fibers among said plurality of pixels;

determining, for each pixel the number of fibers passing through the pixel based upon said fiber distribution data, wherein for each pixel the number of fibers passing through the pixel are denoted by the letter "M"; and forming paper fiber structure data based upon the number of fibers passing through each pixel.

2. The paper fiber structure data forming method as claimed in claim 1 wherein said fiber data is made up of data specifying the shape, position and the direction of the fibers.

3. The paper fiber structure data forming method as claimed in claim 1 wherein data specifying the shape of the fibers is represented by a part of the cosine function.

4. The paper fiber structure data forming method as claimed in claim 2 wherein, when forming said fiber data, fiber length parameters, specifying the fiber length, are entered from an input device and the data specifying the fiber shape is formed based upon said fiber length parameters.

5. The paper fiber structure data forming method as claimed in claim 1 wherein a plurality of points are placed at random in an area made up of said plural pixels, the positions of said points are rendered uniform by relaxation processing, a plurality of sub-areas each centered about each of the points rendered uniform are formed, and the same number of fiber data as the number of said sub-areas are arrayed at random in said sub-areas for forming said fiber distribution data.

6. The paper fiber structure data forming method as claimed in claim 5 wherein, for forming said fiber distribution data, fiber density parameters specifying the fiber density are entered from an input device, and the number of the fiber data arrayed in said sub-areas is set based upon said fiber density parameters.

7. The paper fiber structure data forming method as claimed in claim 1 wherein the numbers of fibers M1, M2, M3, M4, M5, M6, M7 and M8, passing through a pixel and also respectively passing through eight pixels P1, P2, P3, P4, P5, P6, P7 and P8 are found for each pixel based upon said fiber distribution data, and the paper fiber structure data is formed, said paper fiber structure data being the numbers of fibers M and the numbers of fibers Mi (i=1 to 8).

8. The paper fiber structure data forming method as claimed in claim 7 wherein the numbers of capillary tubes S1, S2, S3, S4, S5, S6, S7 and S8 formed in fiber interstices for extending in directions proceeding from said pixel P towards the respective pixels P1 to P8 is found for each pixel, and the paper fiber structure data is formed, said paper fiber structure data being the numbers M of said fibers, the numbers Mi and the numbers of capillary tubes Si (i=1 to 8).

9. The paper fiber structure data forming method as claimed in claim 8 wherein the numbers of capillary tubes Si are set to 1 and to 0 for the numbers Mi not less than 2 and less than 2, respectively.

10. The paper fiber structure data forming method as claimed in claim 8 wherein the angle of intersection between neighboring ones of Mi fibers extending from said pixel P towards the pixels Pi (i=1 to 8) is set at random, and wherein said numbers Si are set to 1 and 0 for at least one of the set intersection angles being less than a pre-set angle and for all of the set intersection angles being not less than the pre-set angle.

11. The paper fiber structure data forming method as claimed in claim 1 wherein light transmittance I specifying light transmittance at the pixel P is found based upon the numbers M of said fibers, and wherein said light transmittance I is included in the paper fiber structure data for producing the paper fiber structure data.

12. An apparatus for generating data that models a paper fiber structure, comprising:

means for generating fiber data that describes one of the fibers making up a paper sheet;

means for arraying a plurality of said fiber data in an area formed by a plurality of pixels to generate fiber distribution data that represents the distribution of said plurality of fibers among said plurality of pixels;

means for determining, for each pixel, the number of fibers passing through the pixel based upon said fiber distribution data, wherein for each pixel the number of fibers passing through the pixel are denoted by the letter "M"; and means for forming paper fiber structure data based upon the number of fibers passing through each pixel.

13. The paper structure data forming apparatus as claimed in claim 12 wherein the fiber data formed by said fiber data forming means is comprised of data specifying the shape of the fibers, data specifying the position of the fibers and data specifying the direction of the fibers.

14. The paper structure data forming apparatus as claimed in claim 13 wherein the data specifying the shape of the fibers is represented by a part of a cosine function.

15. The paper structure data forming apparatus as claimed in claim 13 further comprising a fiber length parameter input device for entering fiber length parameters specifying the fiber length, said data forming means forming the data specifying the fiber shape based upon the fiber length parameters entered from said fiber length parameter input device.

16. The paper structure data forming apparatus as claimed in claim 12 wherein the fiber distribution data forming means includes means for arraying a plurality of points at random in an area made up of a plurality of said pixels, means for uniforming the positions of the points arrayed by said arraying means by relaxation processing; means for forming a plurality of sub-areas each centered about each point uniformed by said uniforming means, and means for arraying the same number of fiber data in each sub-area formed by said sub-area forming means; said fiber distribution data being the fiber data arrayed by said arraying means.

17. The paper structure data forming apparatus as claimed in claim 16 further comprising means for entering fiber density parameters specifying the fiber density, said arraying means setting the numbers of the fiber data arrayed in said sub-areas based upon the fiber density parameters entered by said fiber density parameter input device.

18. The paper fiber structure data forming apparatus as claimed in claim 12 further comprising means for calculating, on the pixel basis, the numbers of fibers M1, M2, M3, M4, M5, M6, M7 and M8, passing through a pixel P and also respectively passing through eight pixels P1, P2, P3, P4, P5, P6, P7 and P8 neighboring to said pixel P, based upon said fiber distribution data, and forming the paper fiber structure data comprised of the numbers of fibers M calculated by said fiber number calculating means and the numbers of fibers Mi (i=1 to 8) calculated by said neighboring fiber number calculating means.

19. The paper fiber structure data forming apparatus as claimed in claim 18 further comprising means for calculating, on the pixel basis, the numbers of capillary tubes S1, S2, S3, S4, S5, S6, S7 and S8 formed in fiber interstices for extending in directions proceeding from said pixel P towards the respective pixels P1 to P8, and forming the paper fiber structure data comprised of the numbers M of said fibers, the numbers of fibers Mi and the number of capillary tubes Si (i=1 to 8).

20. The paper fiber structure data forming apparatus as claimed in claim 19 wherein the numbers of capillary tubes Si are set to 1 and to 0 for the number Mi not less than 2 and less than 2, respectively.

21. The paper fiber structure data forming apparatus as claimed in claim 19 wherein the intersection angles between neighboring ones of Mi fibers extending from said pixel P towards the pixels Pi (i=1 to 8) are set at random, and wherein said numbers Si are set to 1 and 0 for at least one of the set intersection angles being less than a pre-set angle and for all of the set intersection angles being not less than the pre-set angle.

22. The paper fiber structure data forming apparatus as claimed in claim 12 wherein the light transmittance I specifying light transmittance at the pixel P is found based upon the numbers M of said fibers, and wherein said light transmittance I is included in the paper fiber structure data for producing the paper fiber structure data.

23. Paper fiber structure data which is stored in a record medium, and which is formed by: generating fiber data that describes one of the fibers making up a paper sheet; arraying a plurality of said fiber data in an area formed by a plurality of pixels to generate fiber distribution data that represents the distribution of said plurality of fibers among said plurality of pixels; determining, for each pixel, the number of fibers passing through the pixel based upon said fiber distribution data, wherein for each pixel the number of fibers passing through the pixel are denoted by the letter "M"; and forming the paper fiber structure data based upon the number of fibers passing through each pixel.

24. The paper fiber structure data as claimed in claim 23 comprised of the numbers of the fibers M and the numbers of fibers M1, M2, M3, M4, M5, M6, M7 and M8, passing through a pixel P and also respectively passing through eight pixels P1, P2, P3, P4, P5, P6, P7 and P8 neighboring to said pixel P.

25. The paper fiber structure data as claimed in claim 24 comprised of the pixel-based numbers M of fibers, the pixel-based numbers Mi of fibers and the numbers of capillary tubes S1, S2, S3, S4, S5, S6, S7 and S8 formed in the fiber interstices for the respective pixels P1 to P8 for extending from said pixel P towards the pixels P1 to P8.

26. The paper fiber structure data as claimed in claim 25 wherein the numbers of capillary tubes Si are set to 1 and to 0 for the numbers Mi not less than 2 and less than 2, respectively.

27. The paper fiber structure data as claimed in claim 23 having the pixel-based light transmittance I calculated based upon the numbers of fibers M.

28. A blurred figure drawing method for displaying a picture derived from pixel-based picture data, comprising the steps of:

detecting a pixel P on the contour of a figure yet to be blurred;

detecting pixels connected to said pixel P by capillary tubes, the number of capillary tubes, Si (i=1 to 8), associated with said pixel P being determined through the modeling of a paper fiber structure;

setting ink presence specifying data as picture data in the pixels detected by said step of detecting pixels connected to said pixel P; and substituting one of the pixels having picture data set therein for said pixel P, and repeating the steps of detecting a pixel P; detecting pixels connected to said pixel P; and setting ink presence, wherein said substitution and repetition is performed until each of said pixels having picture data set therein has been substituted for said pixel P.

29. The blurred figure drawing method as claimed in claim 28 wherein, if the numbers of the capillary tubes of the pixel P are not less than 1, the pixels Pi associated with the numbers Si of the capillary tubes are set as the pixels connected to the pixel P.

30. The blurred figure drawing method as claimed in claim 28 wherein, if the numbers of the capillary tubes of the pixel P are not less than 1 and the numbers of capillary tubes Sj of the pixel Pi associated with the numbers of capillary tubes Si (j=1 to 8) are not less than 1, the pixels Pi are set as pixels connected to the pixel P.

31. The blurred figure drawing method as claimed in claim 28 wherein, in said third step, new picture data is not set for a pixel for which said picture data has already been set.

32. The blurred figure drawing method as claimed in claim 28 wherein an initial ink quantity $U_0$ is pre-set as picture data in the pixel P detected in said first step, and wherein, in said third step, no picture data is set for the pixel detected in said second step if the initial ink quantity $U_0$ is not more than 0.

33. The blurred figure drawing method as claimed in claim 32 wherein the absorbed ink quantity U in the pixel detected in said second step is calculated in said third step and wherein the absorbed ink quantity U thus calculated is set as picture data.

34. The blurred figure drawing method as claimed in claim 33 wherein the absorbed ink quantity U is found in accordance with the equation (1):

$$U = \alpha \times \pi^n \times \int_0^\pi \int_0^\pi \ldots \int_0^\pi \sum_{i=1}^{n-1} S(\theta_{i+1} - \theta_i) d\theta_1 d\theta_2 \ldots d\theta_{n-1}$$

where $$s(\mathbf{v}) = 2 \times q \times \{\cos(\mathbf{v}/2)\sin(\mathbf{v}/2) + (\mathbf{v} - \mathbf{v})/2\} \quad (1)$$

where n is the number of fibers M as found by the paper fiber structure data forming method as claimed in claims 8 to 11, q is a constant derived from the surface tension of the ink, $\mathbf{v}_i$ is a constant set at random for representing the direction of the i'th fiber, and = is an optionally set proportionality constant.

35. The blurred figure drawing method as claimed in claim 33 wherein, in said third step, the absorbed ink quantities U are summed for all pixels detected by said second step and wherein, if the sum reaches the initial ink quantity $U_0$, the repetition of said second and third steps is terminated.

36. The blurred figure drawing method as claimed in claim 33 wherein, in said third step, the absorbed ink quantities U are sequentially subtracted from said initial ink quantity $U_0$ at a pixel detected in said second step for sequentially finding the residual ink quantities Urest, said residual ink quantity Urest being set as a new initial ink quantity $U_0$ for the pixel P detected in said first step, and wherein, when the new initial ink quantity $U_0$ becomes not larger than 0, the repetition of said second and third steps is terminated.

37. The blurred figure drawing method as claimed in claim 32 wherein, in said third step, if the initial ink quantities $U_0$ differ between neighboring pixels detected in said first step, the initial ink quantity $U_0$ of the pixel having the larger initial ink quantity is decreased while the initial ink quantity $U_0$ of the pixel having the smaller initial ink quantity is increased.

38. The blurred figure drawing method as claimed in claim 33 wherein the initial ink density $V_0$ is pre-set as picture data in the pixel on the contour of said figure, and wherein, in said third step, the ink density V in said pixel is calculated for each pixel for which the ink presence specifying data is set, luminance data specifying the luminance of said pixel is found based upon the absorbed ink quantity U and the ink density V and said luminance data are set as picture data.

39. The blurred figure drawing method as claimed in claim 38 wherein, in said third step, said ink density V is found based upon a partial differential equation (2):

$$\frac{\partial n(x, r, t)}{\partial t} = D_0 \times \nabla n(x, r, t) - v(r) \times \nabla n(x, r, t) \quad (2)$$

where n(x, r, t) is a function representing the density of ink particles, v(r) is a function representing the diffusion velocity of ink particles, $D_0$ is a diffusion coefficient representing diffusion of ink particles towards the wall surface of a capillary tube, r is the radial position within a capillary tube, x is the position along the flowing direction in the capillary tube and t is time.

40. The blurred figure drawing method as claimed in claim 39 wherein, in said third step, the ink density V is found in accordance with the equation (3):

$$V = V_0 \times V(x, t) \quad (3)$$

where $V_0$ is the initial ink density $V_0$ and V(x, t) is a function of the number of pixels x detected by said second step and the time (t), said function being found based upon the equation (2).

41. A blurred figure drawing apparatus for displaying a picture derived from pixel-based picture data, comprising:
    means for detecting a pixel P on the contour of a figure yet to be blurred;
    means for detecting pixels connected to said pixel P by capillary tubes, the number of capillary tubes, Si (i=1 to 8), associated with said pixel P being determined through the modeling of a paper fiber structure; and
    means for setting ink presence specifying data as picture data in the pixels detected by said means for detecting pixels connected to said pixel P;
        wherein the operations of detecting a pixel P; detecting pixels connected to said pixel P; and setting ink presence are repeated with the pixel having picture data set therein by said means for setting being substituted for the pixel P detected by said means for detecting a pixel P; and wherein said repetition is performed until each of said pixels having picture data set therein has been substituted for said pixel P.

42. The blurred figure drawing apparatus as claimed in claim 41 wherein, if the numbers of the capillary tubes of the pixel P are not less than 1, the pixels Pi associated with the numbers Si of the capillary tubes are set as the pixels connected to the pixel P.

43. The blurred figure drawing apparatus as claimed in claim 41 wherein, if the numbers of the capillary tubes of the pixel P are not less than 1 and the numbers of capillary tubes of the pixels Pi associated with the numbers of capillary tubes Sj (j=1 to 8) are not less than 1, the pixels Pi are set as pixels connected to the pixel P.

44. The blurred figure drawing method as claimed in claim 41 wherein, in said third step, new picture data is not set for a pixel for which said picture data has already been set.

45. The blurred figure drawing apparatus as claimed in claim 41 further comprising an initial ink quantity setting means for setting the initial ink quantity $U_0$ as picture data in the pixel P detected by said contour pixel detection means, said picture data setting means setting no picture data for the pixel detected in said second step if the initial ink quantity $U_0$ is not more than 0.

46. The blurred figure drawing apparatus as claimed in claim 45 wherein the picture data setting means calculates the absorbed ink quantity U in the pixel detected by said linking pixel detection means and wherein the absorbed ink quantity U thus calculated is set as picture data.

47. The blurred figure drawing apparatus as claimed in claim 46 wherein the picture data setting means sets the absorbed ink quantity U in accordance with the equation (4):

$$U = \alpha \times \pi^n \int_0^\pi \int_0^\pi \ldots \int_0^\pi \sum_{i=1}^{n-1} S(\theta_{i+1} - \theta_i) d\theta_1 d\theta_2 \ldots d\theta_{n-1}$$

where $$s(\mathbf{v}) = 2 \times q \times \{\cos(\mathbf{v}/2)\sin(\mathbf{v}/2) + (\mathbf{v} - \mathbf{v})/2\} \quad (4)$$

wherein n is the number of fibers M as found by the paper fiber structure data forming apparatus as claimed in claims 19 to 22, q is a constant derived from the surface tension of the ink, $\mathbf{v}_i$ is a constant set at random for representing the direction of the i'th fiber, and = is an optionally set proportionality constant.

48. The blurred figure drawing apparatus as claimed in claim 46 further comprising: control means for summing the absorbed ink quantities U for all pixels calculated by said picture data setting means and for terminating the repetition of the operations of said initial ink quantity setting means and said picture data setting means if the sum reaches the initial ink quantity $U_0$.

49. The blurred figure drawing apparatus as claimed in claim 46 further comprising control means for sequentially subtracting the absorbed ink quantities U calculated by said picture data setting means from said initial ink quantity $U_0$ set in said initial ink setting means for sequentially finding the residual ink quantities Urest, setting said residual ink quantity Urest as a new initial ink quantity $U_0$ for the pixel P detected by said contour pixel detection means and for terminating the repetition of said second and third steps when the new initial ink quantity $U_0$ becomes not larger than 0.

50. The blurred figure drawing apparatus as claimed in claim 49 further comprising control means for managing control so that, in said third step, if the initial ink quantities $U_0$ differ between neighboring pixels detected by said picture data setting means, the initial ink quantity $U_0$ of the pixel having the larger initial ink quantity is decreased while the initial ink quantity $U_0$ of the pixel having the smaller initial ink quantity is increased.

51. The blurred figure drawing apparatus as claimed in claim 45 further comprising initial ink density setting means for setting the initial ink density $V_0$ as picture data in the pixel on the contour of said figure, said picture data setting means calculating the ink density V in said pixel for each pixel for which the ink presence specifying data is set, finding luminance data specifying the luminance of said pixel based upon the absorbed ink quantity U and the ink density V and setting said luminance data as picture data.

52. The blurred figure drawing apparatus as claimed in claim 11 wherein the picture data setting means finds said ink density V based upon a partial differential equation (5):

$$\frac{\partial n(x, r, t)}{\partial t} = D_0 \times \nabla n(x, r, t) - v(r) \times \nabla n(x, r, t) \tag{5}$$

where n(x, r, t) is a function representing the density of ink particles, v(r) is a function representing the diffusion velocity of ink particles, $D_0$ is a diffusion coefficient representing diffusion of ink particles towards the wall surface of a capillary tube, r is the radial position within a capillary tube, x is the position along the flowing direction in the capillary tube and t is time.

53. The blurred figure drawing apparatus as claimed in claim 12 wherein the picture data setting means finds the ink density V in accordance with the equation (6):

$$V = V_0 \times V(x, t) \tag{6}$$

where $V_0$ is the initial ink density $V_0$ and V(x, t) is a function of the number of pixels x detected by said linking pixel detection means and the time (t), said function being found based upon the equation (5).

* * * * *